(12) United States Patent
Enck et al.

(10) Patent No.: US 11,550,643 B1
(45) Date of Patent: Jan. 10, 2023

(54) AUTOMATED STREAMING DATA MODEL GENERATION WITH PARALLEL PROCESSING CAPABILITY

(71) Applicant: SAS Institute Inc., Cary, NC (US)

(72) Inventors: Steven William Enck, Apex, NC (US); Charles Michael Cavalier, Apex, NC (US); Sarah Jeanette Gauby, Raleigh, NC (US); Scott Joseph Kolodzieski, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/879,893

(22) Filed: Aug. 3, 2022

Related U.S. Application Data

(60) Provisional application No. 63/230,636, filed on Aug. 6, 2021.

(51) Int. Cl.
  *G06F 9/54* (2006.01)
  *G06F 9/48* (2006.01)

(52) U.S. Cl.
  CPC ............ *G06F 9/542* (2013.01); *G06F 9/4887* (2013.01)

(58) Field of Classification Search
  CPC ...... G06F 9/542; H04L 41/06; H04L 41/0604
  USPC ........................................................ 719/318
  See application file for complete search history.

(56) References Cited

U.S. PATENT DOCUMENTS

| | | | |
|---|---|---|---|
| 7,480,640 | B1 | 1/2009 | Elad et al. |
| 7,734,775 | B2 | 6/2010 | Barnett et al. |
| 8,880,524 | B2 * | 11/2014 | Pandey ............... G06F 16/2308 709/224 |
| 9,092,802 | B1 | 7/2015 | Akella |
| 9,432,430 | B1 | 8/2016 | Klenz |
| 10,102,091 | B2 * | 10/2018 | He ........................ H04L 43/50 |
| 10,152,361 | B2 | 12/2018 | Kolodzieski et al. |

(Continued)

FOREIGN PATENT DOCUMENTS

| | | |
|---|---|---|
| CA | 3009354 C | 1/2019 |
| CN | 101207561 A | 6/2008 |

(Continued)

OTHER PUBLICATIONS

International Search Report and Written Opinion mailed in PCT Application No. PCT/US2017/062046, dated Jan. 23, 2018.

(Continued)

*Primary Examiner* — Andy Ho
(74) *Attorney, Agent, or Firm* — Bell & Manning, LLC

(57) ABSTRACT

An event stream processing (ESP) model is read that describes computational processes. (A) An event block object is received. (B) A new measurement value, a timestamp value, and a sensor identifier are extracted. (C) An in-memory data store is updated with the new measurement value, the timestamp value, and the sensor identifier. (A) through (C) are repeated until an output update time is reached. When the output update time is reached, data stored in the in-memory data store is processed and updated using data enrichment windows to define enriched data values that are output. The data enrichment windows include a gate window before each window that uses values computed by more than one window. The gate window sends a trigger to a next window when each value of the more than one window has been computed. The enrichment windows are included in the ESP model.

30 Claims, 14 Drawing Sheets

(56) References Cited

U.S. PATENT DOCUMENTS

| | | |
|---|---|---|
| 10,346,142 B1 | 7/2019 | Cavallier et al. |
| 10,423,469 B2 | 9/2019 | Kolodzieski et al. |
| 10,747,592 B2 | 8/2020 | Kolodzieski et al. |
| 2001/0039581 A1 | 11/2001 | Deng et al. |
| 2011/0023055 A1 | 1/2011 | Thatte et al. |
| 2011/0246528 A1 | 10/2011 | Hsieh et al. |
| 2012/0072455 A1 | 3/2012 | Jain et al. |
| 2014/0032745 A1 | 1/2014 | De Armas et al. |
| 2014/0229628 A1 | 8/2014 | Mandal |
| 2014/0280986 A1 | 9/2014 | Baulier et al. |
| 2016/0071027 A1 | 3/2016 | Brand |
| 2018/0075163 A1* | 3/2018 | Park ............ G06F 16/9024 |
| 2018/0165139 A1 | 6/2018 | Kolodzieski et al. |
| 2019/0050277 A1 | 2/2019 | Kolodzieski et al. |
| 2022/0019462 A1* | 1/2022 | Nishiguchi ............ G06F 9/4881 |

FOREIGN PATENT DOCUMENTS

| | | |
|---|---|---|
| CN | 108419447 B | 2/2020 |
| CN | 111290763 B | 5/2021 |
| EP | 3374890 | 5/2020 |
| EP | 3690640 | 12/2021 |

OTHER PUBLICATIONS

SAS Event Stream Processing 4.2: XML Language Dictionary, Sep. 2016.

Appel, Stefan et al., Modeling and execution of event stream processing in business processes, Information Systems, vol. 46, Apr. 24, 2014, pp. 140-156.

SAS Visual Data Mining and Machine Learning 8.1 Data Mining and Machine Learning Procedures, SAS Institute Inc., Mar. 2017, pp. 1-118.

SAS Event Stream Processing 5.2: Connectors and Adapters, SAS Institute Inc., Jul. 2018, pp. 1-173.

DataFlux Event Stream Processing Engine Primer, DataFlux A SAS Company, Dec. 11, 2012, pp. 1-24.

DataFlux Event Stream Processing Engine User's Guide, DataFlux A SAS Company, Jan. 24, 2013, pp. 1-115.

SAS® Event Stream Processing 5.2: Using SAS® Event Stream Processing Analytics, SAS Institute Inc., Sep. 2018, pp. 1-110.

SAS® Event Stream Processing 5.2: Creating and Using Windows, SAS Institute Inc., Jul. 2018, pp. 1-100.

SAS® Event Stream Processing 5.2: Overview, SAS Institute Inc., Aug. 2018, pp. 1-12.

SAS® Event Stream Processing 5.2: XML Language Dictionary, SAS Institute Inc., Jul. 2018, pp. 1-68.

SAS® Event Stream Processing 4.2: Using the XML Layer, SAS Institute Inc., Sep. 2016, pp. 1-52.

SAS Micro Analytic Service 2.3: Programming and Administration Guide, SAS Institute Inc., Mar. 2017, pp. 1-56.

Kreps, Jay, Putting Apache Kafka to Use: A Practical Guide to Building a Streaming Platform (Part 2), Confluent Stream Processing—io blog, Feb. 25, 2015, pp. 1-7.

Gualtieri, Mike, 15 "True" Streaming Analytics Platforms for Real-time Everything, Forrester Wave: Big Streaming Analytics, Q1, 2016, Apr. 16, 2016, pp. 1-8.

International Search Report and Written Opinion mailed in EP Application No. 19218074.3, dated Jul. 7, 2020.

* cited by examiner

AUTOMATED STREAMING DATA MODEL GENERATION WITH PARALLEL PROCESSING CAPABILITY

CROSS-REFERENCE TO RELATED APPLICATIONS

The present application claims the benefit of 35 U.S.C. § 119(e) to U.S. Provisional Patent Application No. 63/230,636, which was filed Aug. 6, 2021, the entire contents of which are hereby incorporated by reference.

BACKGROUND

An increasing number of distributed applications process continuously flowing data from geographically distributed sources, perform analytics on the streamed data, and provide analysis results to entities that may also be geographically distributed. The continuously flowing data may be generated from sensor measurements that capture real-time data describing current operating characteristics of a remote device. The sensor measurements may derive from multiple different types of sensors installed at various locations (e.g., brakes, engine, steering mechanism, cooling system, passenger ventilation, power source, etc.) on a currently-moving vehicle, aircraft or watercraft, for example.

Event stream processing (ESP) can be used to analyze and understand millions of events per second, while detecting patterns of interest as they occur in real time. While processing with sub-millisecond response times for high-volume throughput, data streams can be assessed with ESP to derive insights and take appropriate actions.

ESP models are developed to perform the streaming analytics on real-time data streams, for example, as part of the Internet of Things (IoT). The ESP models may clean, transform, aggregate, calculate new variable values from, analyze, predict new variable values from, output, generate an alert on, etc. the received streamed data. Existing ESP analytics platforms provide the architecture to support ESP model generation to solve various analytics problems. Analysts and software developers design and develop the source code to implement the ESP model to solve each analytic problem, which requires significant development and testing time before implementation of the ESP model to solve real-world problems.

SUMMARY

In an example embodiment, a computer-readable medium is provided having stored thereon computer-readable instructions that when executed by a first computing device, cause the first computing device to process events. An event stream processing (ESP) model is read. The ESP model describes computational processes to be performed on measurements included in a stream of event block objects. An ESP project is instantiated based on the read ESP model. (A) An event block object is received from a second computing device remote from the first computing device. (B) A new measurement value, a timestamp value, and a sensor identifier are extracted from the received event block object. A sensor associated with the sensor identifier captured the new measurement value at a time indicated by the timestamp value. (C) An in-memory data store is updated with the new measurement value, the timestamp value, and the sensor identifier. (D) (A) through (C) are repeated until an output update time is reached based on a computer clock. Each new measurement value is generated by one of a plurality of sensors. When the output update time is reached, data stored in the in-memory data store is processed and updated using a plurality of data enrichment windows to define a plurality of enriched data values. The plurality of data enrichment windows includes a gate window before each window of the plurality of data enrichment windows that uses values computed by more than one window of the plurality of data enrichment windows. The gate window sends a trigger to a next window of the plurality of data enrichment windows when each value of the more than one window of the plurality of data enrichment windows has been computed. The plurality of data enrichment windows is included in the read ESP model. One or more data values of the plurality of enriched data values are output.

In another example embodiment, the first computing device is provided. The first computing device includes, but is not limited to, a processor and a computer-readable medium operably coupled to the processor. The computer-readable medium has instructions stored thereon that, when executed by the processor, cause the first computing device to process events.

In yet another example embodiment, a method of processing events is provided.

Other principal features of the disclosed subject matter may become apparent to those skilled in the art upon review of the following drawings, the detailed description, and the appended claims.

BRIEF DESCRIPTION OF THE DRAWINGS

Illustrative embodiments of the disclosed subject matter may hereafter be described referring to the accompanying drawings, wherein like numerals denote like elements.

DETAILED DESCRIPTION

Figure 1:
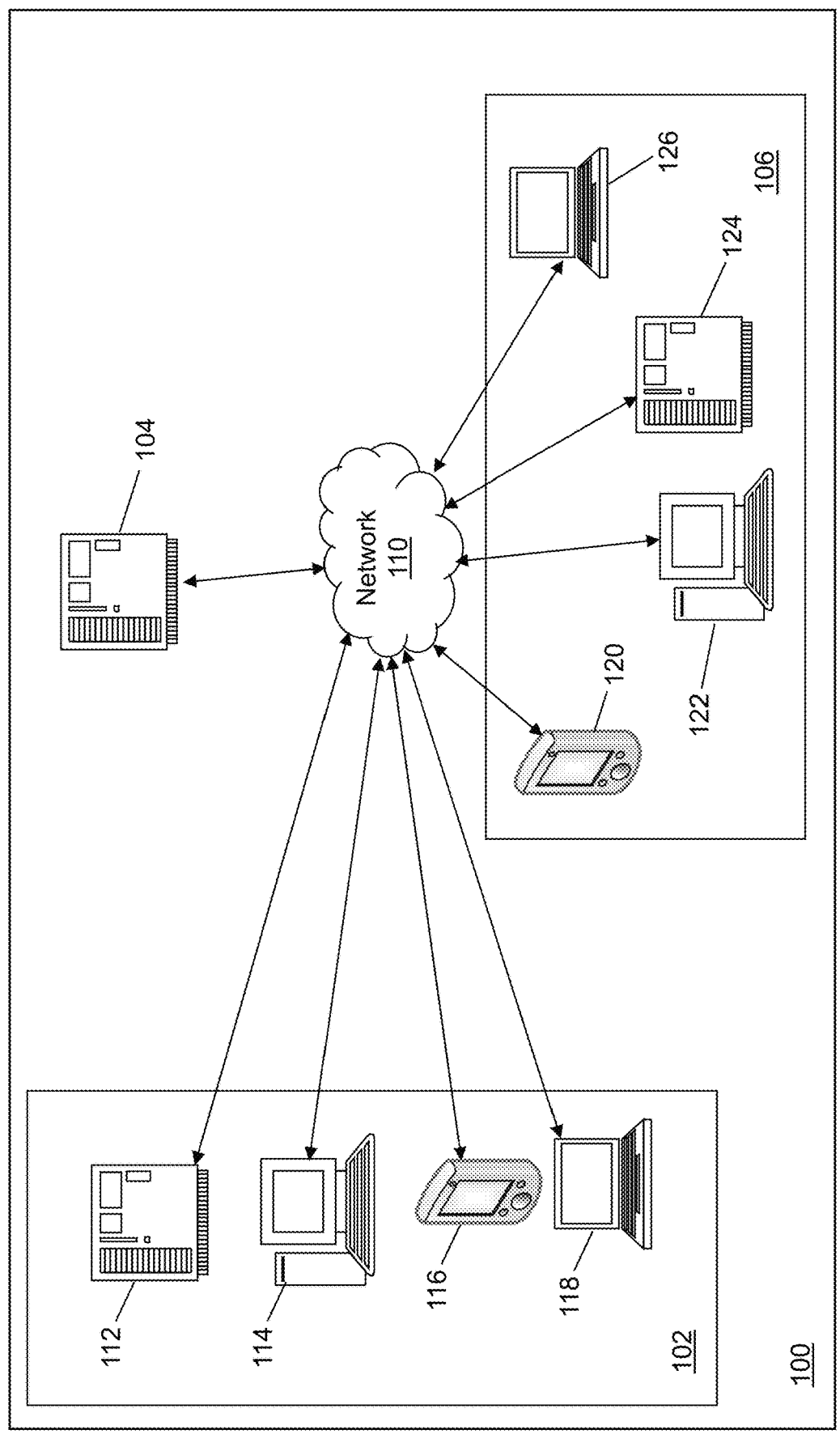
FIG. 1 depicts a block diagram of a stream processing system in accordance with an illustrative embodiment.

Referring to FIG. 1, a block diagram of a stream processing system 100 is shown in accordance with an illustrative embodiment. In an illustrative embodiment, stream processing system 100 may include an event publishing system 102, an event stream processing (ESP) device 104, an event subscribing system 106, and a network 110. Each of event publishing system 102, ESP device 104, and event subscribing system 106 may be composed of one or more discrete devices in communication through network 110.

Event publishing system 102 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a power grid system, a telecommunications system, a fluid (e.g., oil, gas, water, etc.) pipeline, a transportation system, an industrial device, a medical device, an appliance, a vehicle, a computing device, etc. Example sensors include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various devices used as part of the system. The devices themselves may include one or more sensors and/or may be connected to one or more other devices to receive a measurement datum or to send a measurement datum to another device. As another example, a data generation device may be a computing device that generates a measurement data value in response to occurrence of an event such as receipt of a sensor measurement datum. As still another example, a data capture device may be a computing device that receives a measurement data value generated by another device. A computing device of event publishing system 102 may be a data generation device and/or a data capture device.

For example, a truck may be equipped with hundreds of sensors. These sensors stream all types of measurement data that are valuable to both a truck driver and a truck manufacturer. Some events require immediate reactions via edge analytics while others may be sent to and processed in the cloud where more comprehensive and detailed analysis is performed. However, the deployment of analytic tools and models in edge devices and in the cloud that meet the requirements of large scale, geographically distributed, and highly dynamic sensors is challenging. For example, there may be a hierarchy associated with the hundreds or thousands of sensors that make up event publishing system 102. Each measurement may be associated with a device of the event publishing system 102 hierarchy, and devices within the event publishing system 102 hierarchy may be linked to compute additional measurements in edge devices or in the cloud from raw measurements generated by individual sensors. Event publishing system 102 may include one or more devices of the same and/or different type.

Event publishing system 102 publishes a measurement data value to ESP device 104 as an event object also referred to as an event. An event object is a data record stored using a predefined format that includes fields and keys. For illustration, a first field and a second field may represent an operation code (opcode) and a flag. The opcode enables update, upsert, insert, and deletion of an event object. The flag indicates whether the measurement data value and/or other field data has all of the fields filled or only includes updated fields in the case of an update opcode. An upsert opcode updates the event object if a key field already exists; otherwise, the event object is inserted. ESP device 104 receives the event object in an event stream, processes data extracted from one or more fields of the event object, and identifies one or more computing devices of event subscribing system 106 to which the processed data is sent. In some embodiments, the processing may feed the raw stream to the identified one or more computing devices of event subscribing system 106. The one or more computing devices of event subscribing system 106 may store the received, processed events, present one or more of the received, processed events on a display, etc. For example, a computing device of event subscribing system 106 may be a data server.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of communication devices.

The one or more computing devices of event publishing system 102 may include computing devices of any form factor such as a server computer 112, a desktop 114, a smart phone 116, a laptop 118, a personal digital assistant, an integrated messaging device, a tablet computer, a point of sale system, a transaction system, an Internet of Things (IoT) device, etc. Event publishing system 102 can include any number and any combination of form factors of computing devices that may be organized into subnets. The computing devices of event publishing system 102 send and receive signals through network 110 to/from another of the one or more computing devices of event publishing system 102 and/or to/from ESP device 104. The one or more computing devices of event publishing system 102 may communicate using various transmission media that may be wired and/or wireless as understood by those skilled in the art. The one or more computing devices of event publishing system 102 may be geographically dispersed from each other and/or co-located. Each computing device of the one or more computing devices of event publishing system 102 may be executing one or more event publishing applications.

Figure 2:
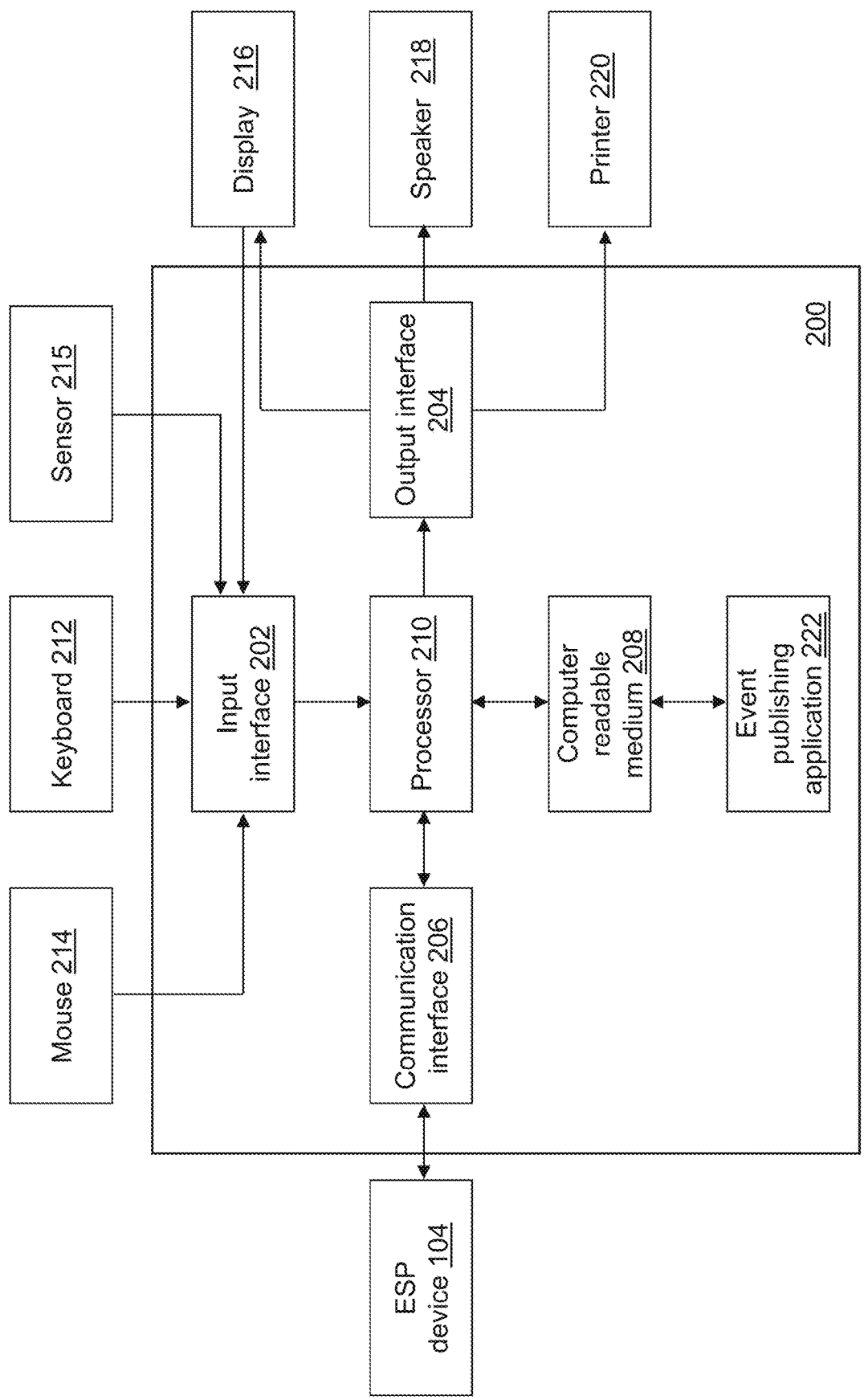
FIG. 2 depicts a block diagram of an event publishing device of an event publishing system of the stream processing system of FIG. 1 in accordance with an illustrative embodiment.

For illustration, referring to FIG. 2, a block diagram of an event publishing device 200 is shown in accordance with an example embodiment. Event publishing device 200 is an example computing device of event publishing system 102. For example, each of server computer 112, desktop 114, smart phone 116, laptop 118, etc. may be an instance of event publishing device 200. Event publishing device 200 may include an input interface 202, an output interface 204, a communication interface 206, a non-transitory computer-readable medium 208, a processor 210, and an event publishing application 222. Each computing device of event publishing system 102 may be executing event publishing application 222 of the same or different type.

Referring again to FIG. 1, the one or more computing devices of event subscribing system 106 may include computers of any form factor such as a smart phone 120, a desktop 122, a server computer 124, a laptop 126, a personal digital assistant, an integrated messaging device, a tablet computer, etc. Event subscribing system 106 can include any number and any combination of form factors of computing devices. The computing devices of event subscribing system 106 send and receive signals through network 110 to/from ESP device 104. The one or more computing devices of event subscribing system 106 may be geographically dispersed from each other and/or co-located. The one or more computing devices of event subscribing system 106 may communicate using various transmission media that may be wired and/or wireless as understood by those skilled in the art. Each computing device of the one or more computing devices of event subscribing system 106 may be executing one or more event subscribing applications.

Figure 5:
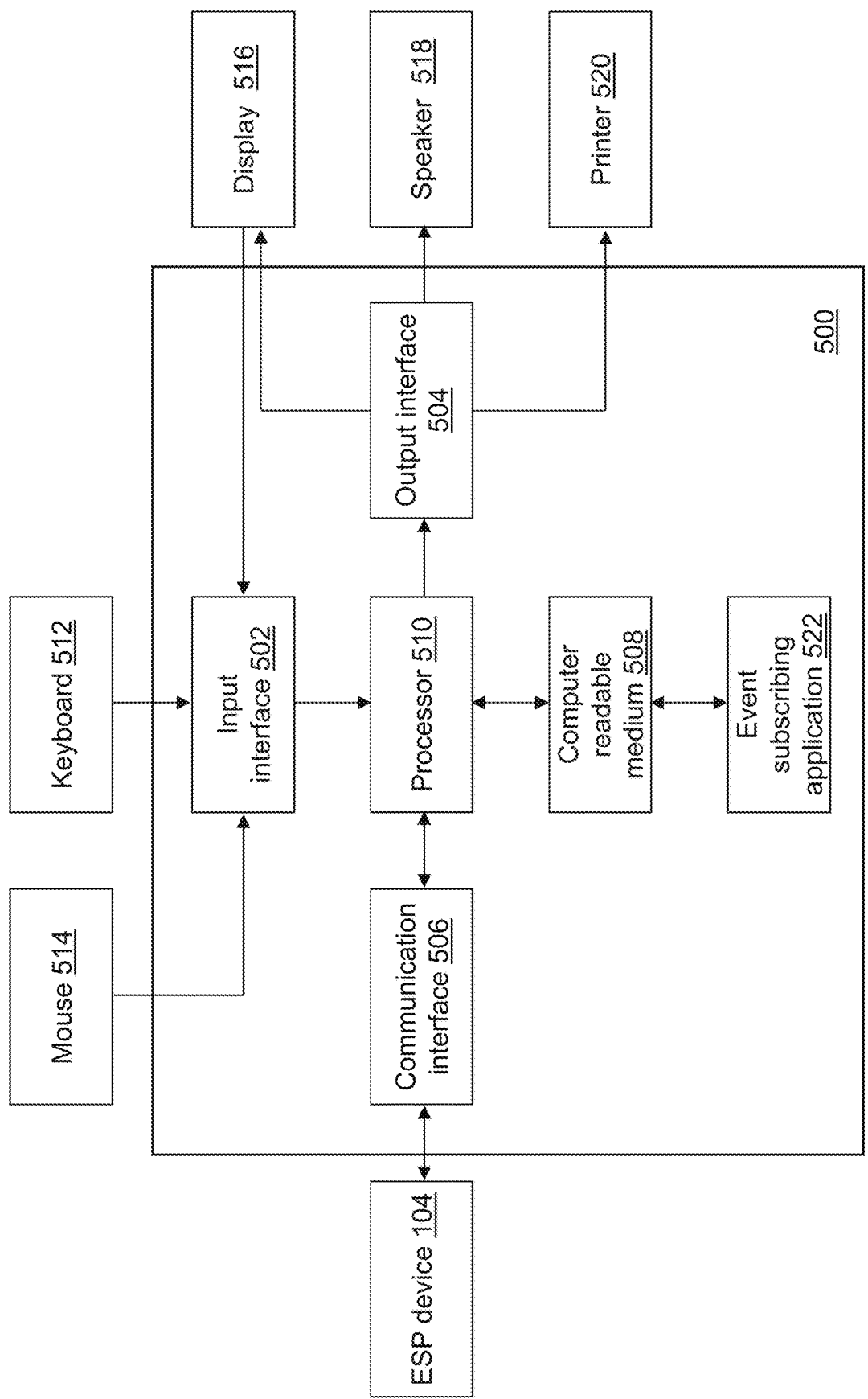
FIG. 5 depicts a block diagram of an event subscribing device of an event subscribing system of the stream processing system of FIG. 1 in accordance with an illustrative embodiment.

For illustration, referring to FIG. 5, a block diagram of an event subscribing device 500 is shown in accordance with an example embodiment. Event subscribing device 500 is an example computing device of event subscribing system 106. For example, each of smart phone 120, desktop 122, server computer 124, laptop 126, etc. may be an instance of event subscribing device 500. Event subscribing device 500 may include a second input interface 502, a second output interface 504, a second communication interface 506, a second non-transitory computer-readable medium 508, a second processor 510, and an event subscribing application 522. Each computing device of event subscribing system 106 may be executing event subscribing application 522 of the same or different type.

Referring again to FIG. 1, ESP device 104 can include any form factor of computing device. For illustration, FIG. 1 represents ESP device 104 as a server computer. In general, a server computer may include faster processors, additional processors, more disk memory, and/or more random-access memory (RAM) than a client computer and support multi-threading as understood by a person of skill in the art. ESP device 104 sends and receives signals through network 110 to/from event publishing system 102 and/or to/from event subscribing system 106. ESP device 104 may communicate using various transmission media that may be wired and/or wireless as understood by those skilled in the art. ESP device 104 may be implemented on a plurality of computing devices of the same or different type. Stream processing system 100 further may include a plurality of ESP devices, for example, configured to support failover stream processing, divided stream processing, and/or split stream processing under control of a routing stream processor. For example, U.S. Pat. No. 10,152,361, that issued Dec. 11, 2018 and is assigned to the assignee of the present application, describes an event stream processing cluster manager.

Figure 7:
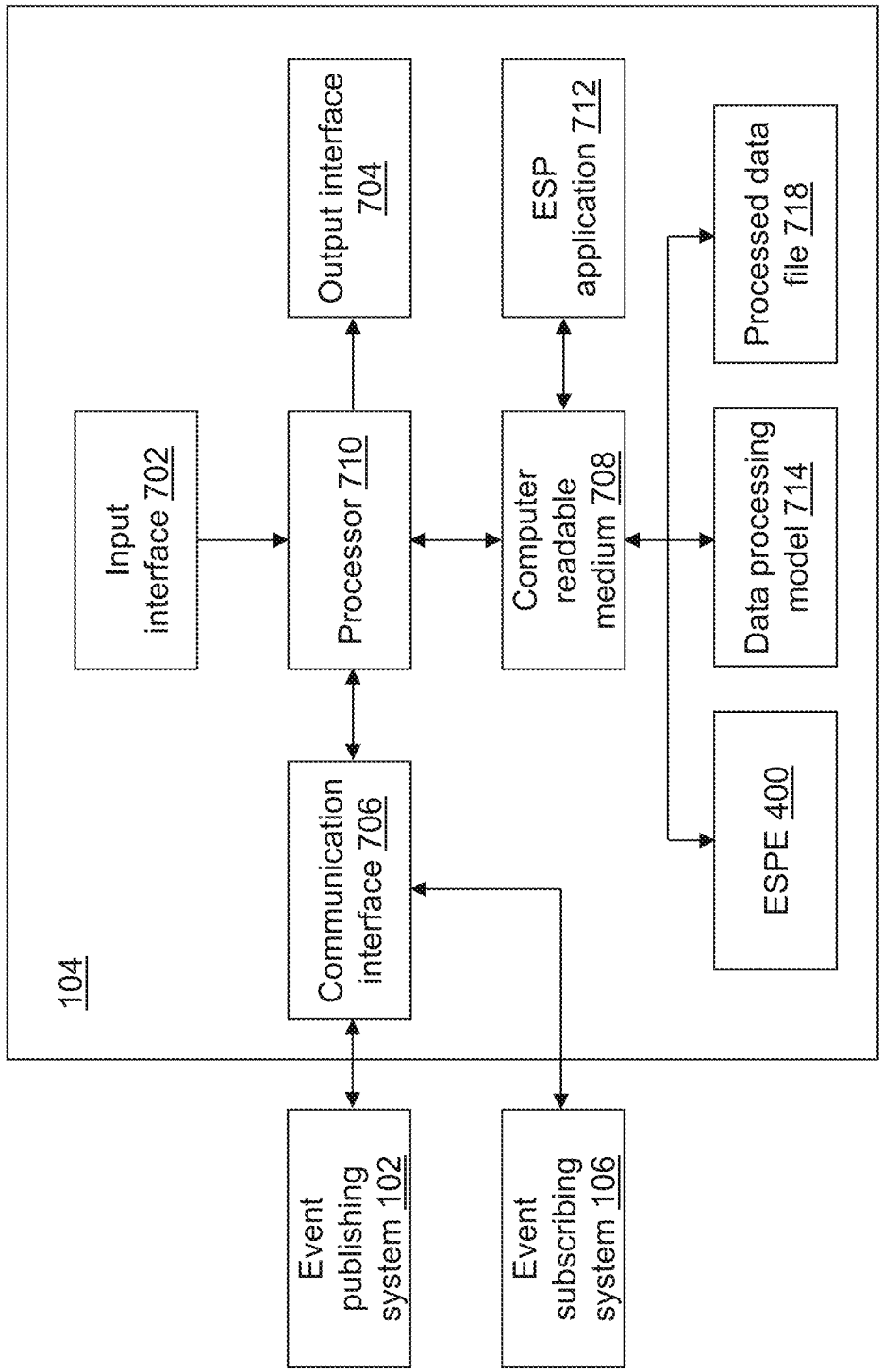
FIG. 7 depicts a block diagram of an ESP device of the stream processing system of FIG. 1 that performs data processing and/or alert processing in accordance with an illustrative embodiment.

For illustration, referring to FIG. 7, a block diagram of ESP device 104 is shown in accordance with an example embodiment. ESP device 104 may include a third input interface 702, a third output interface 704, a third communication interface 706, a third non-transitory computer-readable medium 708, a third processor 710, an ESP application 712, a data processing model 714, and a processed data file 718. Data processing model 714 and processed data file 718 may be comprised of one or more files. In an alternative embodiment, processed data file 718 may be created on event subscribing device 500 and/or on another computing device of stream processing system 100.

Figure 4:
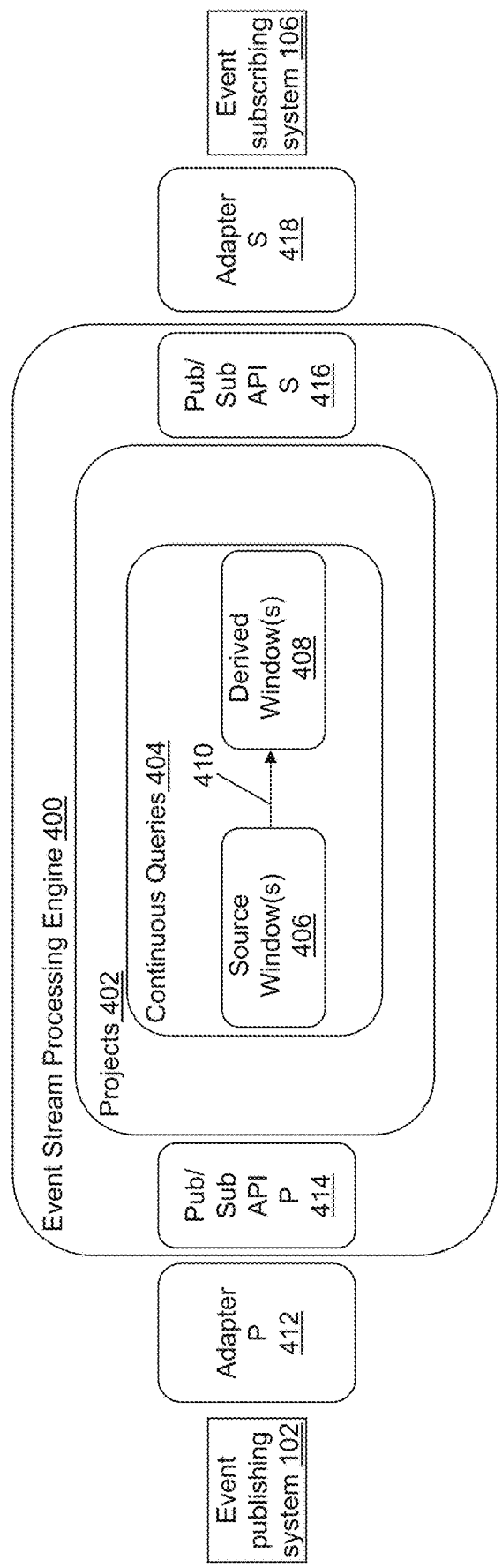
FIG. 4 depicts a block diagram of an event stream processing (ESP) engine executing on an ESP device of the stream processing system of FIG. 1 in accordance with an illustrative embodiment.

ESP device 104 executes ESP application 712 that instantiates an ESP engine (ESPE) 400 (shown referring to FIG. 4 for illustration). ESPE 400 processes data received from event publishing system 102 and may monitor the processed data to evaluate a need to generate an alert. ESPE 400 further streams the processed data to event subscribing system 106. ESP application 712 reads data processing model 714 that defines how ESPE 400 generates processed data file 718 as a result of processing of streamed events from any event publishing device 200. Some or all of processed data file 718 may be sent to event subscribing device 500 of event subscribing system 106 based on event subscribing application 522 and/or parameters defined in data processing model 714.

Data processing model 714 defines the methodology to be executed by ESPE 400 in processing the data streamed from event publishing system 102. For example, data processing model 714 is defined to receive the streaming events, perform data manipulation such as applying lower and upper bounds and time windowing of data included in the streamed events, perform transformations of measurement data included in the streamed events, and create lag, aggregation, and calculation data from the measurement data included in the streamed events using the measurement data included in the streamed events, the transformed measurement data, the lagged measurement data, the aggregated measurement data, and/or the calculation measurement data and output the measurement data included in the streamed events, the transformed measurement data, the lagged measurement data, the aggregated measurement data, and/or the calculation measurement data to various destinations such as a database stored at event subscribing device 500 or at ESP device 104 (processed data file 718). Processed data file 718 includes one or more transposed analytic-ready data sets where each observation may correspond to a single device.

Referring to FIG. 2, each event publishing device 200 of event publishing system 102 may include the same or different components and combinations of components. Fewer, different, and additional components may be incorporated into event publishing device 200. Event publishing device 200 may be part of the IoT, where things (e.g., machines, devices, phones, sensors, smart meters, personal wearable devices, health monitoring devices, autonomous vehicle devices, robotic components, identification devices, environmental monitoring systems, etc.) can be connected to networks and the data from these things collected and processed within the things and/or external to the things. For example, event publishing device 200 can include one or more sensors of the same or different type, and high value analytics can be applied to identify hidden relationships and drive increased efficiencies.

Event publishing device 200 may be referred to as an edge device, and may include edge computing circuitry. Event publishing device 200 may provide a variety of stored or generated data, such as network data or data specific to the network devices themselves.

In one example application, ESP can be employed for predictive maintenance in the trucking industry, which is responsible for moving around 10.5 billion tons of freight over 279 billion miles per year. ESP can be used to predict part failures to keep trucks on the road longer. Trucks may have hundreds of sensors that collect many different types of data, for example, from oil temperatures to engine load to turbo boost. Edge devices on the trucks can allow a trucking company to weed out data that they do not need as close to the source as possible, and can facilitate action to occur on pertinent information in sub-second time frames. This way, the trucking company does not need to move all of their data through network 110 for storage in the cloud. Instead, event streaming system 100 may be implemented in the truck. Also, by monitoring, filtering and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on premises or in the cloud, where the trucking company can be enabled to analyze massive amounts of data across a fleet of trucks. Cross-entity analytics can be performed by aggregating data from all of the IoT gateways that are installed on the trucks in the fleet.

ESP can further enable the trucking company to take what it learned from historical data, train new models, update existing models, and bring new or revised models back to the edge (e.g., the truck). These operations can be performed dynamically (e.g., on the fly) and while the trucks are still on the road. The operations performed by ESP device 104 are captured in data processing model 714 that is created automatically using minimal input from a user as described further below.

As another example, a business may include a plurality of buildings each with various sensors used to monitor an environment in and around the buildings and control, for example, heating and air conditioning systems that themselves are comprised of numerous sensors. Event streaming system 100 may be implemented locally at the business to receive sensor measurement from the sensors distributed around the business campus.

Referring again to FIG. 2, input interface 202 provides an interface for receiving information for entry into event publishing device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into event publishing device 200 or to make selections presented in a user interface displayed on display 216. Input interface 202 further may interface with another device such as a sensor 215 to receive a measurement data value obtained by sensor 215. Input interface 202 further may interface with a plurality of sensors or other devices of the same or different type.

The same interface may support both input interface 202 and output interface 204. For example, display 216 that includes a touch screen both allows user input and presents output to the user. Event publishing device 200 may have one or more input interfaces that use the same or a different input interface technology. The input interface technology further may be accessible by event publishing device 200 through communication interface 206.

Output interface 204 provides an interface for outputting information for review by a user of event publishing device 200 or for storage to an internal or external device of event publishing device 200. For example, output interface 204 may interface with various output technologies including, but not limited to, display 216, a speaker 218, a printer 220, etc. Event publishing device 200 may have one or more output interfaces that use the same or a different interface technology. The output interface technology further may be accessible by event publishing device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Event publishing device 200 may have one or more communication interfaces that use the same or a different communication interface technology. For example, event publishing device 200 may support communication using an Ethernet port, a Bluetooth® antenna, a telephone jack, a USB port, etc. Data and messages may be transferred between event publishing device 200 and ESP device 104 using communication interface 206.

Computer-readable medium 208 is a non-transitory electronic holding place or storage for information, for example, so the information can be accessed by processor 210 as understood by those skilled in the art. Computer-readable medium 208 can include, but is not limited to, any type of RAM, any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Event publishing device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Event publishing device 200 also may have one or more drives that support the loading of a memory media such as a CD or DVD, an external hard drive, etc. One or more external hard drives further may be connected to event publishing device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Event publishing device 200 may include a plurality of processors that use the same or a different processing technology.

Event publishing application 222 performs operations associated with generating, capturing, and/or receiving a measurement data value and publishing the measurement data value in an event stream to ESP device 104. The operations may be implemented using hardware, firmware, software, or any combination of these methods. Referring to the example embodiment of FIG. 2, event publishing application 222 is implemented in software (comprised of computer-readable and/or computer-executable instructions) stored in computer-readable medium 208 and accessible by processor 210 for execution of the instructions that embody the operations of event publishing application 222. Event publishing application 222 may be written one or more programming languages, scripting languages, assembly languages, etc.

Event publishing application 222 may be implemented as a Web application. For example, event publishing application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a URL that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Figure 3:
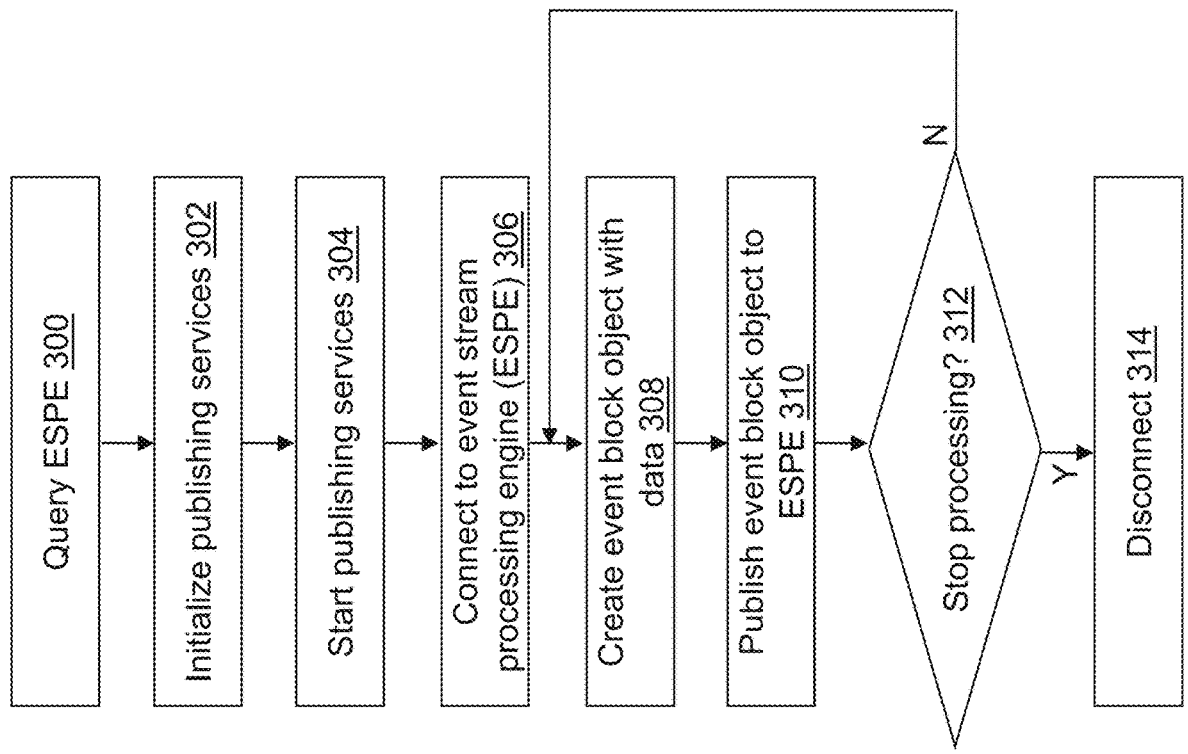
FIG. 3 depicts a flow diagram illustrating examples of operations performed by the event publishing device of FIG. 2 in accordance with an illustrative embodiment.

Referring to FIG. 3, example operations associated with event publishing application 222 are described. Additional, fewer, or different operations may be performed depending on the embodiment. The order of presentation of the operations of FIG. 3 is not intended to be limiting. A user can interact with one or more user interface windows presented to the user in a display under control of event publishing application 222 independently or through a browser application in an order selectable by the user. Although some of the operational flows are presented in sequence, the various operations may be performed in various repetitions, concurrently, and/or in other orders than those that are illustrated. For example, a user may execute event publishing application 222, which causes presentation of a first user interface window, which may include a plurality of menus and selectors such as drop-down menus, buttons, text boxes, hyperlinks, etc. associated with event publishing application 222 as understood by a person of skill in the art. As further understood by a person of skill in the art, various operations may be performed in parallel, for example, using a plurality of threads or a plurality of computing devices such as a grid or a cloud of computing devices.

In an operation 100, ESPE 400 is queried, for example, to discover projects 402, continuous queries 404, windows 406, 408, window schema, and window edges currently running in ESPE 400. For example, referring to FIG. 4, the components of ESPE 400 are shown in accordance with an illustrative embodiment. ESPE 400 may include one or more projects 402. A project may be described as a second-level container in an engine model managed by ESPE 400 where a thread pool size for the project may be defined by a user. A value of one for the thread pool size indicates that writes are single-threaded. Each project of the one or more projects 402 may include one or more continuous queries 404 that contain data flows, which are data transformations of or computations on incoming event streams.

The engine container is the top-level container in a model that manages the resources of the one or more projects 402. In an illustrative embodiment, for example, there is a single ESPE 400 for each instance of an ESP model executed. For illustration, data processing model 714 defines a first ESP model that instantiates ESPE 400. An ESP model specifies how input event streams from event publishing system 102 are transformed and analyzed into meaningful event streams consumed by event subscribing system 106.

Each ESPE 400 has a unique engine name. Additionally, the one or more projects 402 may each have unique project names, and each query may have a unique continuous query name and begin with a uniquely named source window of the one or more source windows 406. Each ESPE 400 may or may not be persistent. Each ESPE 400 is a unique process so the projects/queries/windows need not be uniquely named as between two distinct ESPE 400 that may be executing on ESP device 104. They are distinguished by the unique input streams received on ESPE-specific transmission control protocol (TCP)/internet protocol (IP) connections.

Projects 402 run in a dedicated thread pool whose size is defined as a project attribute. A port can also be specified so that projects 402 can be spread across network interfaces for throughput scalability. Using a pool of threads in a project enables ESPE 400 to use multiple processor cores for more efficient parallel processing.

Continuous query modeling involves defining directed graphs of windows for event stream manipulation and transformation. A window in the context of event stream manipulation and transformation is a processing node in an event stream processing model. A window in a continuous query can perform aggregations, various computations, pattern-matching, scoring, alerting, and other operations on data flowing through the window. A continuous query may be described as a directed graph of source, relational, pattern matching, and calculate windows. The one or more source windows 406 and the one or more derived windows 408 represent continuously executing queries that generate updates to a query result set as new event blocks stream through ESPE 400. A directed graph, for example, is a set of nodes connected by edges, where the edges have a direction associated with them. The one or more source windows 406 are typically connected to one or more of the one or more derived windows 408. One or more of the one or more derived windows 408 can also be connected to another of the one or more derived windows 408. Windows are connected by edges 410 with a defined direction. Connectors publish or subscribe to event streams to and from ESPE 400 and are in-process to ESPE 400.

A publish/subscribe (pub/sub) application programming interface (API) 414 can be used to publish event streams into a source window of ESPE 400. Similarly, a pub/sub API S 416 can be used to subscribe to an event stream window either from the same computing device or from another computing device on network 110.

An adapter is a stand-alone executable program that can be networked and that can be included to interact with ESPE 400. For example, an adapter P 412 uses pub/sub API P 414 to publish event streams to source windows 406 of ESPE 400 from event publishing system 102. An adapter S 418 uses pub/sub API S 416 to subscribe to event streams from any window (the one or more source windows 406 or the one or more derived windows 408) of ESPE 400 and to publish them to event subscribing system 106.

An event object may be described as a packet of data accessible as a collection of fields, with at least one of the fields defined as a key or unique identifier (ID). The event object may be an individual record of an event stream and is a fundamental building block of ESP. An event object includes metadata and field data. The event object may be created using a variety of formats including binary, alphanumeric, XML, etc. Each event object may include one or more fields designated as a primary ID for the event so ESPE 400 can support the opcodes for events including insert, update, upsert, and delete. As a result, events entering a source window of the one or more source windows 406 may be indicated as insert (I), update (U), delete (D), or upsert (P). The event object metadata includes the opcode indicating if the event represents an insert, update, delete, or upsert, a set of flags indicating whether the event object is a normal, partial-update, or a retention-generated event from retention policy management, and a plurality of timestamps. For example, the plurality of timestamps may indicate a sensor data generation time, a data receipt time by event publishing device 200, a data transmit time by event publishing device 200, a data receipt time by ESPE 400, etc.

An event block object may be described as a grouping or package of one or more event objects. An event stream may be described as a flow of event block objects. A continuous query of the one or more continuous queries 404 transforms the incoming event stream made up of streaming event block objects published into ESPE 400 into one or more outgoing event streams using the one or more source windows 406 and the one or more derived windows 408 that define the data flow modeling.

The one or more source windows 406 are at the top of the directed graph and have no windows feeding into them. Event streams are published into the one or more source windows 406, and from there, the event streams are directed to the next connected window(s) as defined by the directed graph. The one or more derived windows 408 are all instantiated windows that are not source windows and that have other windows streaming events into them. The one or more derived windows 408 perform computations or transformations on the incoming event streams. The one or more derived windows 408 transform event streams based on the window type (that is operators such as join, filter, compute, calculate, aggregate, copy, pattern match, calculate, union, etc.) and window settings. As event streams are published into ESPE 400, they are continuously queried, and the resulting sets of derived windows in these queries are continuously updated. The one or more derived windows 408 transform events into zero or more new events that are based on the properties of each derived window. After new events are computed by the one or more derived windows 408, they flow farther down the directed graph to a next level of connected derived windows, where new events are potentially computed.

Referring again to FIG. 3, the engine name and host:port to ESPE 400 may be provided as an input to the query and a list of strings may be returned with the names of the projects 402, of the continuous queries 404, of the windows 406, 408, of the window schema, and/or of the window edges of currently running projects of ESPE 400. The host is associated with a host name or Internet Protocol (IP) address of ESP device 104. The port is the port number provided when a publish/subscribe (pub/sub) capability is initialized by ESPE 400. The engine name is the name of ESPE 400. The engine name of ESPE 400 and host:port to ESP device 104 may be read from a storage location on computer-readable medium 208, may be provided on a command line, or otherwise input to or defined by event publishing application 222 as understood by a person of skill in the art.

In an operation 302, publishing services are initialized.

In an operation 304, the initialized publishing services are started, which may create a publishing client for the instantiated event publishing application 222 such as adapter P 412 and/or pub/sub API P 414. The publishing client performs the various pub/sub activities for the instantiated event publishing application 222. For example, a string representation of a URL to ESPE 400 is passed to a "Start" function. For example, the URL may include the host:port designation of ESPE 400 executing on ESP device 104, a project of the projects 402, a continuous query of the continuous queries 404, and a window of the source windows 406. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 222 is publishing to more than one source window of ESPE 400, the initialized publishing services may be started to each source window using the associated names (project name, continuous query name, source window name).

Pub/sub is a message-oriented interaction paradigm based on indirect addressing. Subscribers (e.g., event subscribing device 500) specify their interest in receiving information from ESPE 400 by subscribing to specific classes of events, while information sources (event publishing device 200) publish events to ESPE 400 without directly addressing the data recipients (subscribers). Stream processing system 100 includes ESPE 400 that receives events from event publishing application 222 executing on each event publishing device 200 of event publishing system 102 and that publishes processed events to event subscribing system 106 based on subscriptions by each event subscribing device 500.

In an operation 306, a connection is made between event publishing application 222 and ESPE 400 for each source window of the source windows 406 to which any measurement data value is published. To make the connection, the pointer to the created publishing client may be passed to a "Connect" function. If event publishing application 222 is publishing to more than one source window of ESPE 400, a connection may be made to each started window using the pointer returned for the respective "Start" function call.

In an operation 308, an event block object is created by event publishing application 222 that includes a measurement data value. The measurement data value may have been received, captured, generated, etc., for example, through communication interface 206 or input interface 202 or by processor 210 of event publishing device 200. The measurement data value may be processed before inclusion in the event block object, for example, to change a unit of measure, convert to a different reference system, etc. The event block object may include a plurality of measurement data values measured at different times and/or by different devices.

In an operation 310, the created event block object is published to ESPE 400, for example, using the pointer returned for the respective "Start" function call to the appropriate source window. Event publishing application 222 passes the created event block object to the created publishing client, where the unique ID field in the event block object has been set by event publishing application 222 possibly after being requested from the created publishing client. In an illustrative embodiment, event publishing application 222 may wait to begin publishing until a "Ready" callback has been received from the created publishing client. The event block object is injected into the source window, continuous query, and project associated with the started publishing client.

In an operation 312, a determination is made concerning whether or not processing is stopped. If processing is not stopped, processing continues in operation 308 to continue creating and publishing event block objects that include measurement data values. If processing is stopped, processing continues in an operation 314.

In operation 314, the connection made between event publishing application 222 and ESPE 400 through the created publishing client may be disconnected, and each started publishing client may be stopped.

Referring to FIG. 5, fewer, different, and additional components may be incorporated into event subscribing device 500. Each event subscribing device 500 of event subscribing system 106 may include the same or different components or combination of components.

Second input interface 502 provides the same or similar functionality as that described with reference to input interface 202 of event publishing device 200 though referring to event subscribing device 500. Second output interface 504 provides the same or similar functionality as that described with reference to output interface 204 of event publishing device 200 though referring to event subscribing device 500. Second communication interface 506 provides the same or similar functionality as that described with reference to communication interface 206 of event publishing device 200 though referring to event subscribing device 500. Data and messages may be transferred between event subscribing device 500 and ESP device 104 using second communication interface 506. Second computer-readable medium 508 provides the same or similar functionality as that described with reference to computer-readable medium 208 of event publishing device 200 though referring to event subscribing device 500. Second processor 510 provides the same or similar functionality as that described with reference to processor 210 of event publishing device 200 though referring to event subscribing device 500.

Figure 6:
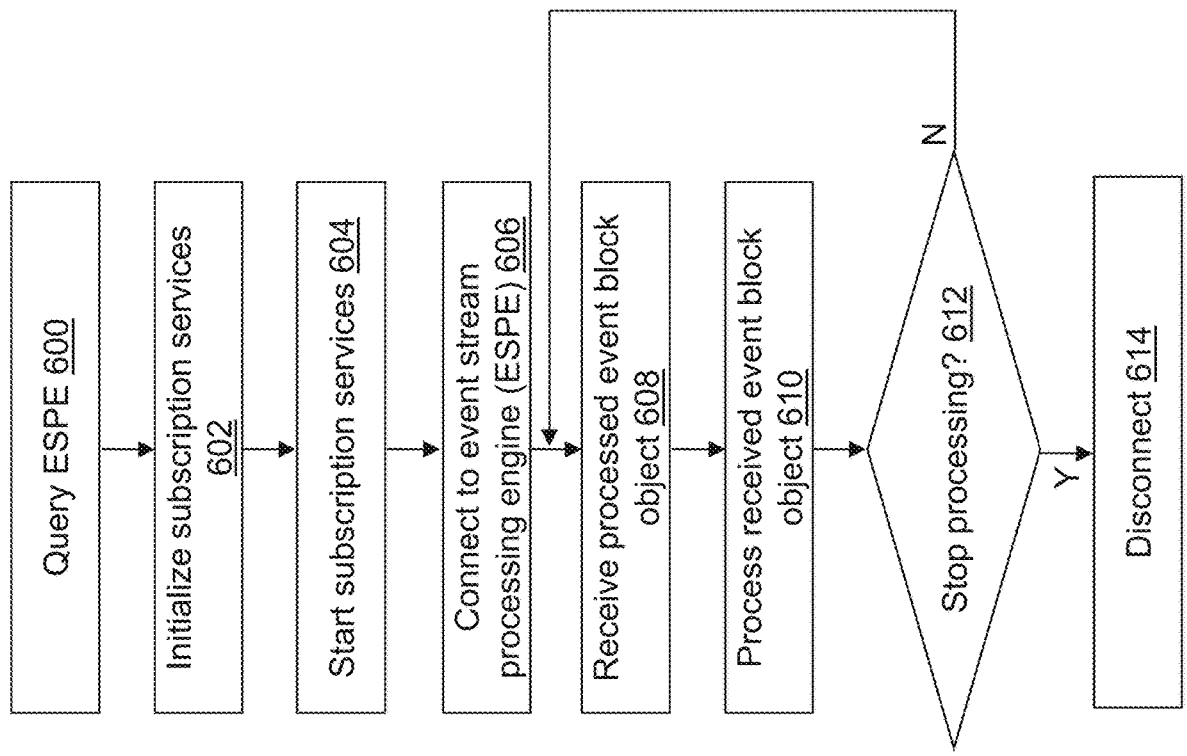
FIG. 6 depicts a flow diagram illustrating examples of operations performed by the event subscribing device of FIG. 5 in accordance with an illustrative embodiment.

Referring to FIG. 6, example operations associated with event subscribing application 512 are described. Additional, fewer, or different operations may be performed depending on the embodiment. The order of presentation of the operations of FIG. 6 is not intended to be limiting.

Event subscribing application 512 performs operations associated with receiving a processed event stream from ESP device 104. Event subscribing application 512 may perform further analysis of the received, processed event stream, may store the received, processed event stream, may issue an alert or alarm based on values in the received, processed event stream, may present values in the received, processed event stream on a second display 516, a second speaker 518, a second printer 520, etc. The operations may be implemented using hardware, firmware, software, or any combination of these methods.

Referring to the example embodiment of FIG. 5, event subscribing application 512 is implemented in software (comprised of computer-readable and/or computer-executable instructions) stored in second computer-readable medium 508 and accessible by second processor 510 for execution of the instructions that embody the operations of event subscribing application 512. Event subscribing application 512 may be written using one or more programming languages, assembly languages, scripting languages, etc. Event subscribing application 512 may be implemented as a Web application.

Similar to operation 300, in an operation 600, ESPE 400 is queried, for example, to discover names of projects 402, of continuous queries 404, of windows 406,608, of window schema, and of window edges currently running in ESPE 400. The host name of the device executing ESPE 400, the engine name of ESPE 400, and the port number opened by ESPE 400 are provided as an input to the query and a list of strings may be returned with the names to the projects 402, continuous queries 404, windows 406,608, window schema, and/or window edges.

In an operation 602, subscription services are initialized.

In an operation 604, the initialized subscription services are started, which may create a subscribing client on behalf of event subscribing application 512 such as adapter S 416 and/or pub/sub API S 418. The subscribing client performs the various pub/sub activities for event subscribing application 512. For example, a URL to ESPE 400 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>", where window name indicates a name of a source window or a derived window from which event subscribing application 512 receives a processed event object.

In an operation 606, a connection may be made between event subscribing application 512 executing on event subscribing device 500 and ESPE 400 through the created subscribing client. To make the connection, the pointer to the created subscribing client may be passed to a "Connect" function and a mostly non-busy wait loop created to wait for receipt of event block objects.

In an operation 608, an event block object is received by event subscribing application 512 executing on event subscribing device 500.

In an operation 610, the received event block object is processed based on the operational functionality provided by event subscribing application 512. For example, event subscribing application 512 may extract data from the received event block object and store the extracted data in a database. In addition, or in the alternative, event subscribing application 512 may extract data from the received event block object and send the extracted data to a system control operator display system, an automatic control system, a notification device, an analytic device, etc. In addition, or in the alternative, event subscribing application 512 may extract data from the received event block object and send the extracted data to a post-incident analysis device to further analyze the data. Event subscribing application 512 may perform any number of different types of actions as a result of extracting data from the received event block object. The action may involve presenting information on second display 516 or second printer 520, presenting information using second speaker 518, storing data in second computer-readable medium 522, sending information to another device using second communication interface 506, etc. A user may further interact with presented information using a second mouse 514 and/or a second keyboard 512.

In an operation 612, a determination is made concerning whether or not processing is stopped. If processing is not stopped, processing continues in operation 608 to continue receiving and processing event block objects. If processing is stopped, processing continues in an operation 614.

In operation 614, the connection made between event subscribing application 512 and ESPE 400 through the subscribing client may be disconnected, and the subscribing client may be stopped.

Referring to FIG. 7, fewer, different, or additional components may be incorporated into ESP device 104. ESP device 104 receives event block objects that include one or more measurement data values from event publishing system 102. Before receiving event block objects, ESPE 400 may be instantiated and executing on ESP device 104. Though not shown, third computer-readable medium 708 may provide an electronic storage medium for the received event block objects as well as values associated with intermediate processing of the event block objects.

Third input interface 702 provides the same or similar functionality as that described with reference to input interface 202 of event publishing device 200 though referring to ESP device 104. Third output interface 704 provides the same or similar functionality as that described with reference to output interface 204 of event publishing device 200 though referring to ESP device 104. Third communication interface 706 provides the same or similar functionality as that described with reference to communication interface 206 of event publishing device 200 though referring to ESP device 104. Data and messages may be transferred between ESP device 104 and event publishing system 102 and/or event subscribing system 106 using third communication interface 706. Third computer-readable medium 708 provides the same or similar functionality as that described with reference to computer-readable medium 208 of event publishing device 200 though referring to ESP device 104. Third processor 710 provides the same or similar functionality as that described with reference to processor 210 of event publishing device 200 though referring to ESP device 104.

ESP application 712 performs operations associated with coordinating event stream flow between event publishing system 102 and event subscribing system 106. The operations may be implemented using hardware, firmware, software, or any combination of these methods. Referring to the example embodiment of FIG. 7, ESP application 712 is implemented in software (comprised of computer-readable and/or computer-executable instructions) stored in third computer-readable medium 708 and accessible by third processor 710 for execution of the instructions that embody the operations of ESP application 712. ESP application 712 may be written using one or more programming languages, assembly languages, scripting languages, etc. ESP application 712 may be implemented as a Web application.

ESP application 712 may be developed, for example, using a modeling API that provides a set of classes with member functions. As an example, the SAS® ESP Engine developed and provided by SAS Institute Inc. of Cary, N.C., USA provides a modeling API that provides a set of classes with member functions. These functions enable ESP application 712 to instantiate ESPE 400 possibly with a dedicated thread pool into its own process space. For illustration, ESP application 712 may use an XML Layer defined for SAS® ESP. The XML Layer enables definition of ESPE 400 using data processing model 714. ESP application 712 parses an XML ESP model and uses the structured model definition to instantiate ESPE 400 to perform the defined query processing.

Data processing model 714 may be designed to perform real-time analytics on streams of events from event publishing system 102 and to provide the results to event subscribing system 106. Illustrative use cases for ESP include, but are not limited to, sensor data monitoring and management, fraud detection and prevention, cyber security analytics, operational systems monitoring and management, capital markets trading systems, etc. Data processing model 714 may be written using one or more programming languages, scripting languages, assembly languages, markup languages, etc. For illustration, data processing model 714 is written using XML and a basic syntax for an XML model defined in data processing model 714 for instantiation in ESPE 400 is shown below where "+" indicates one or more.

```
project name="" pubsub="" threads="">
    <mas-modules>
        +<mas-module language-"" func-names="" module="">
            <code>
                <![CDATA[
                    module code
                ]]>[
            </code>
        </mas-module>
    </mas-modules>
    <contqueries>
        +<contquery name="" index="">
            <windows>
                +<window-type name=""> </window-type>
            </windows>
            <edges>
                +<edge source="" target="" role="">
                </edge>
            </edges>
        </contquery>
    </contqueries>
</project>
```

The project definition is defined between the project start and end tags and defines a project of the one or more projects 402 by identifying code modules and a list of one or more continuous queries 404 of the project. The project start tag may include a project "name" attribute, a "pubsub" mode attribute, a "thread" attribute, etc. The name attribute defines a name for the project. The pubsub mode attribute options may include "none", "auto", and "manual". When "auto" or "manual is specified, the project start tag may include a "pubsub" port number attribute that specifies the port number for the project. The thread attribute defines a thread pool size. For illustration, <project name="qa_real-time" pubsub="auto" threads="20"> may be specified for a project in data processing model 714 where qa_real-time is the project name value, auto is the pubsub mode attribute value, and twenty is the thread attribute value that defines the thread pool size. The project definition further may include a mas-modules definition defined between the mas-modules start and end tags and a continuous query definition defined between the contqueries start and end tags.

The mas-modules start and end tags are a container for a list of zero or more code modules that are published, for example, to a microanalytic service for execution such as the SAS® Micro Analytic Service software provided by SAS Institute Inc. of Cary, N.C., USA. The microanalytic service may be a memory-resident, program execution service that is designed to run inside ESPE 400. Each code module included between the mas-modules start and end tags defines a named block of code that may include one or more functions, methods, or packages such as a predictive model.

A code module definition is included within each pair of mas-module start and end tags. The mas-module start tag may include a "language" attribute, a "func-names" attribute, a "module" attribute, etc. The language attribute defines a language in which the block of code is written. The language options may include "c", "ds2", "py", etc. where c indicates the C programming language, ds2 indicates the datastep 2 (ds2) programming language provided by SAS Institute Inc. of Cary, N.C., USA, and py indicates the python programming language though additional or fewer language options may be supported. The SAS® Micro Analytic Service executes inside an ESP calculate or calculate window enabling continuous queries to process events with analytics and custom logic that is written, for example, in C, DS2, or Python. The func-names attribute defines a name for the function included in the module that is used as a reference as described later. The module attribute defines a name for the module.

For illustration, <mas-module language="ds2" func-names="updateValue" module="P001_measurement"> may be specified for a code block in data processing model 714 where ds2 is the language attribute value, updateValue is the func-names attribute value that defines the function name, and P001_measurement is the module attribute value that defined the module name. The module code itself may be included between the tags <code><![CDATA[module code]]>[</code>. Instead, of including the module code itself, a name of a file that contains the module code may be included between <code-file><Mename>[</code-file>.

The contqueries start and end tags are a container for a list of one or more continuous query elements of the one or more continuous queries 404. A continuous query of the one or more continuous queries 404 of project 402 is included within each pair of contquery start and end tags and includes windows 406, 408 and edges. The contquery start tag may include a "name" attribute, an "index" attribute, etc. The name attribute defines a name for the continuous query. The index attribute options may include pi_RBTREE, pi_HASH, pi_CL_HASH, pi_FW_HASH, pi_LN_HASH, pi_EMPTY, etc., where pi_RBTREE represents a red-black tree index, pi_HASH represents a hash index, pi_CL_HASH represents a closed hash index, pi_FW_HASH represents a forward hash index, pi_LN_HASH represents a linked hash index, pi_EMPTY represents a stateless window, etc. If specified, the index attribute defines a default index type for all windows in the continuous query that do not explicitly specify an index type. The continuous query definition further may include a windows definition defined between the windows start and end tags and a window connectivity definition defined between the edges start and end tags.

The windows start and end tags are a container of one or more window-type elements. A window of the windows 406, 408 is defined within each pair of window-type start and end tags. Illustrative window-type elements may include "aggregate", "calculate", "compute", "copy", "counter", "filter", "functional", "geofence", "join", "notification", "pattern", "calculate", "source", "textCategory", "textContext", "textSentiment", "union", "train", "score", etc. For illustration, the following XML may specify window type elements:
    <windows>
    <window-source name="firstsourcewindowname" . . . </window-source>
    <window-source name="secondsourcewindowname" . . . </window-source>
    <window-join name="joinedInput" . . . </window-join>
    <window-union name="unionedInput" . . . </window-union>
    <window-calculate name="firstcalculatewindowname" . . . </window-calculate>
    </windows>
that include a first source window of the source window type, a second source window of the source window type, a first join window of the join window type, a first union window of the union window type, and a first calculate window of the calculate window type.

Each window-type start tag may include a "name" attribute, an "index" attribute, a "collapse-updates" attribute, a "produces-only-inserts" attribute, an "insert-only" attribute, an "autogen-key" attribute, an "output-insert-only" attribute, etc. The name attribute defines a name for the window. The index attribute options may include pi_RBTREE, pi_HASH, pi_CL_HASH, pi_FW_HASH, pi_LN_HASH, pi_EMPTY, etc. The collapse-updates attribute indicates true when multiple update blocks are collapsed into a single update block. The produces-only-inserts attribute indicates true when the window always produces inserts. The inserts-only attribute is used for a source window type and indicates true when the source window only accepts event objects that include the insert opcode. The autogen-key attribute indicates true when keys are automatically generated by the window. The output-insert-only attribute indicates true when the window only outputs inserts.

A schema definition, an executable module definition, and a connectors definition may be included between each pair of window-type start and end tags as illustrated below:
    <schema>
    <fields>
    <field name=" " type=" " key=" ">
    </fields>
    </schema>
    <mas-map>
    <window-map module=" " function=" " revision=" " source=" ">
    </mas-map>
    <connectors>
    <connector name=" " class=" ">
    <properties>
    <property name=" "< ></property>
    </properties>
    </connector>
    </connectors>

The schema definition is defined between the schema start and end tags and includes a fields definition defined between the fields start and end tags. The fields start and end tags are a container of one or more field tags that define the inputs to the source window. Each field tag may include a "name" attribute, a "type" attribute, a "key" attribute, etc. The name attribute defines a name for the field. The type attribute defines a data type for the field. The key attribute indicates true when the field is used as a key by the window. For illustration, the following provides a schema definition for an illustrative window:
    <schema>
    <fields>
    <field name="key" type="int64" key="true">
    <field name="deviceID" type="string">
    <field name="measurementID" type="string">
    <field name="_msr_timestamp" type="stamp">
    <field name="value" type="string">
    </fields>
    </schema>
five
The executable module definition is defined between the mas-map start and end tags and includes one or more window-map tags that each bind a function to a module defined using a mas-module tag. Each window-map tag may include a "module" attribute, a "revision" attribute, a "source" attribute, a "function" attribute, etc. The model attribute value of the mas-map tag matches a module attribute value of a mas-module tag. The function attribute value of the mas-map tag matches a function attribute value of the mas-module tag. The revision attribute value defines a revision number of the mas module to use. The source attribute value defines a name of the input window for which the function is a handler. For illustration, the following provides a mas-map definition for an illustrative window:

<mas-map>
        <window-map module="P100_ahu_transpose" function="runMain" revision="0" source="ahu_add_trigger"/>
    </mas-map> where a module attribute having the value P100_ahu_transpose and a function attribute having the value runMain are defined by a mas-module tag. Revision zero of the mas module is used and a source attribute having the value ahu_add_trigger is defined by a window-type tag.

The connectors definition is defined between the connectors start and end tags and includes one or more connector definitions for the window where each connector definition is defined between a pair of connector start and end tags. The connector definition defines a connector or an adapter to stream data into or out of the window. Connectors and adapters may use the publish/subscribe API to interface with a variety of communication fabrics, drivers, and clients. Connectors are C++ classes that are instantiated in the same process space as ESPE400; whereas, adapters are standalone executable files possibly built from connector classes.

Each connector start tag may include a "class" attribute, a "name" attribute, etc. The class attribute specifies a connector type of the data source of event publishing system 102 or the data recipient of event subscribing system 106 depending on whether the connector is used to input data to the window or output data from the window. For example, the class attribute may indicate one of "fs", "db", "mq", "project", "smtp", "sol", tdata", "tibrv", "tva", "rmq", "adapter", etc. to indicate which type of connector is used for the connector definition. For illustration, "fs" indicates the data source is a file-socket, "db" indicates the data source is a database, "mq" indicates the data source is an IBM® WebSpheres MQ, "project" indicates the data source is an ESP project, "smtp" indicates the data source is a simple mail transport server, "sol" indicates the data source is a Solace Systems message broker, "tdata" indicates the data source is a TeraData high performance database, "tibrv" indicates the data source is a Tibco Rendezvous message bus, and "tva" indicates the data source is a Tervela messaging fabric, "rmq" indicates the data source is a RabbitMQ message broker, "adapter" indicates the data source is an adapter. A fewer or a greater number of connector types may be used. The provided options are merely for illustration. The name attribute defines a name for the connector. For illustration, the following provides two different connector definitions for an illustrative window:

<connectors>
        <connector name="csv_connector_1" class="fs">
            <properties>
                <property name="type"><pub></property>
                <property name="fsname"><filename></property>
                <property name="fstype"><csv></property>
                <property name="blocksize"><2048></property>
                <property name="growinginputfile"><true></property>
            </properties>
        </connector>
    </connectors>
    <connectors>
        <connector class="adapter" name="ahu_copy_outputdata_to_cas">
            <properties>
                <property name="command">commandline</property>
                <property name="type">sub</property>
                <property name="url">url</property>
            </properties>
        </connector>
    </connectors> where different properties may be included between the properties start and end tags depending on the type of connector defined by the class attribute.

For example, for the connector having class='fs', a property having name='type', a property having name='fsname', a property having name='fstype', a property having name='blocksize', a property having name='growinginputfile', etc. may be defined for the connector The property attribute value for name='type' indicates whether the connector type is publish (pub) or subscribe (sub). The property attribute value for name='fsname' indicates whether the data source is a file or a socket. For example, the value for the property attribute for name='fsname' in the form of "host:port" indicates the data source is a socket. Otherwise, it is a file, and the filename is specified. The property attribute value for name='fstype' indicates a file format type of the filename when the value for the property attribute for name='fsname' indicates the data source is a file and may be selected, for example, from "binary", "csv", "xml", "json", "syslog", "hdat", "cef", etc. where "binary" indicates a binary formatted event, "csv" indicates a comma delimited data event, "xml" indicates an XML formatted event, "json" indicates an JavaScript object notation (JSON) formatted event, "syslog" indicates a system log event, "hdat" indicates an objective analysis package data event, "cef" indicates a common event formatted event. A fewer or a greater number of file-socket types may be used. The provided options are merely for illustration. The property attribute value for name="blocksize" defines a number of events to include in a published event block object received. The property attribute value for name="growinginputfile" indicates whether reading from a growing input file is enabled. When enabled, the connector reads indefinitely from the input file until the connector is stopped or the server drops the connection.

For example, for the connector having class='adapter', a property having name='type', a property having name='command', a property having name='url', etc. may be defined for the connector. The property attribute value for name='type' indicates whether the connector type is publish (pub) or subscribe (sub). The property attribute value for name='command' defines the command and options that are used to run the adapter from the command line. An illustrative command may be defined as "adapterlocation-k sub-H "insert_server.insert_port"-t "ahu"-n "^$@MYUSERID@$^"-l info-m public". The url attribute value for name='url' defines the URL for the adapter connection.

For illustration, the following is a description of illustrative window types that may be defined using the window-type tag:

A "source" type window specifies a source window of a continuous query. Event streams enter continuous queries by being published or injected into a source window.

A "compute" type window defines a compute window, which enables a one-to-one transformation of input events into output events through the computational manipulation of the input event stream fields.

A "copy" type window makes a copy of a parent window, which can be useful to set new event state retention policies. Retention policies can be set in source and copy windows, and events may be deleted when a windows retention policy is exceeded.

An "aggregate" type window is similar to a compute window in that non-key fields are computed. An aggregate window uses a key field or fields for a group-by condition. Unique key field combinations form their own group within the aggregate window such that events with the same key combination are part of the same group.

A "counter" type window counts events streaming through to monitor a number and a rate at which events are being processed.

A "filter" type window specifies a window with a registered Boolean filter function or expression that determines which input events are allowed into the filter window.

A "geofence" type window specifies a virtual perimeter for a real-world geographic area to generate a geofence as a radius around a specific location or a set of specific boundaries used to determine whether the location of an event stream is inside or close to an area of interest.

A "functional" type window specifies different types of functions to manipulate or transform the data in events. Fields in a functional window can be hierarchical, which can be useful for applications such as web analytics.

A "join" type window takes two input windows and a join type. A join window supports equijoins that are one to many, many to one, or many to many. Both inner and outer joins may be supported.

A "notification" type window sends notifications through email, text, or multimedia message. Any number of delivery channels can be specified to send the notifications. A notification window uses the same underlying language and functions as the functional window.

A "pattern" type window enables the detection of events of interest. A pattern defined in this window type is an expression that logically connects declared events of interest. For example, to define a "pattern" window, events of interest are defined and connected using operators such as "AND", "OR", "FBY", "NOT", "NOTOCCUR", and "IS". The operators can accept optional temporal conditions.

A "calculate" type window enables specification of an arbitrary number of input windows and input-handler functions for each input window (that is, event stream) and executes the associated code using the data streamed into the window and outputs an event with any computed values.

A "score" window accepts model events to make predictions for incoming data events and generates score data.

A "textCategory" window enables categorization of a text field in incoming events. The text field could generate zero or more categories with scores.

A "textContext" window enables abstraction of classified terms from an unstructured string field. This window type can be used to analyze a string field from an event's input to find classified terms. Events generated from those terms can be analyzed by other window types. For example, a pattern window could follow a "textContext" window to look for tweet patterns of interest.

A "textSentiment" window determines a sentiment of text in a specified incoming text field and a probability of its occurrence. A sentiment value is "positive," "neutral," or "negative." The probability is a value between 0 and 1.

A "train" window receives data events and publishes model events to a score window. It uses the incoming data to develop and adjust a learning model in real time. The incoming data should contain both the outcome to be predicted and related variables.

A "union" window specifies a simple join that merges one or more streams with the same schema.

For illustration, the following describes inputs that may be defined to characterize a calculate window type named "outputRecords_airHandler":

```
<window-calculate index="pi_EMPTY" collapse-updates="true" output-insert-only
="true" name="outputRecords_airHandler" algorithm=MAS">
    <schema>
      <fields>
        <field name="key" type="int64" key="true"/>
        <field name="deviceID" type="string"/>
        <field name="msr_dttm" type="double"/>
        <field name="fanSpeed" type=" double"/>
        <field name="ductPressure" type=" double"/>
      </fields>
    </schema>
    <mas-map>
          <window-map module="outputRecords_airHandlerModule"
              function="runOutputRecords" revision="0" source="gate0002"/>
    </mas-map>
    <connectors>
     <connector class="adapter" name="fpb_copy_outputdata_to_cas"">
       <properties>
         <property name="command"> command line </property>
         <property name="type">sub</property>
         <property name="url">url</property>
       </properties>
     </connector>
    </connectors>
</window-calculate>
```

The window connectivity definition is defined between the edges start and end tags and includes one or more edge definitions for the continuous query where each edge definition is defined by a pair of edge start and end tags. The window connectivity definition defines the connectivity between windows of the continuous query where each edge defined between the edges start and end tags specifies a connectivity between two windows to define the directed graph flow of ESPE 400. Each edge tag may include a "source" name attribute, a "target" name attribute, and a "role" attribute. Each source name attribute value and target name attribute value define a name that matches a window-type name attribute value. The target name attribute value may define one or more names separated by a space. The role attribute defines a role of the edge. The role attribute options may include "data", "model", "request", "left", "right", "position", "geometry", etc. Edge roles "data", "model", and "request" may be used for edges that connect streaming analytics windows. Edge roles "left" and "right" may be used to define left and right inputs to a Join window. Edge roles "position" and "geometry" identify the type of data streaming from source windows that connect to a Geofence window as either position data events or geometry data events. For illustration, the following XML defines a continuous query flow:

<edges>
<edge source="union_data_sources" target="add_context" role="data"/>
<edge source="addContext" target="subset" role="data"/>
<edge source="subset" target="updateCurrentValue" role="data"/>
<edge source="updateCurrentValue" target="updateHistory" role="data"/>
<edge source="updateHistory" target="consolidateCurrentValue" role="data"/>
<edge source="consolidateCurrentValue" target="enrichDataModelStart"/>
<edge source="enrichDataModelStart" target="computeLagZoneTemp" role="data"/>
<edge source="computeLagZoneTemp" target="gate0001"/>
<edge source="enrichDataModelStart" target="computeLagZoneSetpoint" role="data"/>
<edge source="computeLagZoneSetpoint" target="gate0001"/>
<edge source="gate0001" target="computeLagZoneTempDiff" role="data"/>
<edge source="computeLagZoneTempDiff" target="gate0003"/>
<edge source="enrichDataModelStart" target="computeLagFanSpeed" role="data"/><edge source="computeLagFanSpeed" target="gate0002"/>
<edge source="enrichDataModelStart" target="computeLagDuctPressure" role="data"/>
<edge source="computeLagDuctPressure" target="gate0002"/>
<edge source="gate0002" target="computeLagFanKW" role="data"/>
<edge source="computeLagFanKW" target="gate0003"/>
<edge source="gate0003" target="outputRecords_building" role="data"/>
<edge source="gate0003" target="outputRecords_airHandler" role="data"/>
<edge source="gate0003" target="outputRecords_fanPoweredBox" role="data"/>
<edge source="outputRecords_building" target="gate0004"/>
<edge source="outputRecords_airHandler" target="gate0004"/>
<edge source="outputRecords_fanPoweredBox" target="gate0004"/>
<edge source="gate0004" target="outputCompletion" role="data"/>
</edges>

Execution of ESP application 712 may be triggered using a command line command that may include zero or more command line parameters. Tokens may be included in the ESP model definition that are defined in the environment defined for ESP application 712 or by the zero or more command line parameters. For example, tokens may be indicated using all capital letters and enclosed in "@" signs.

Figure 8:
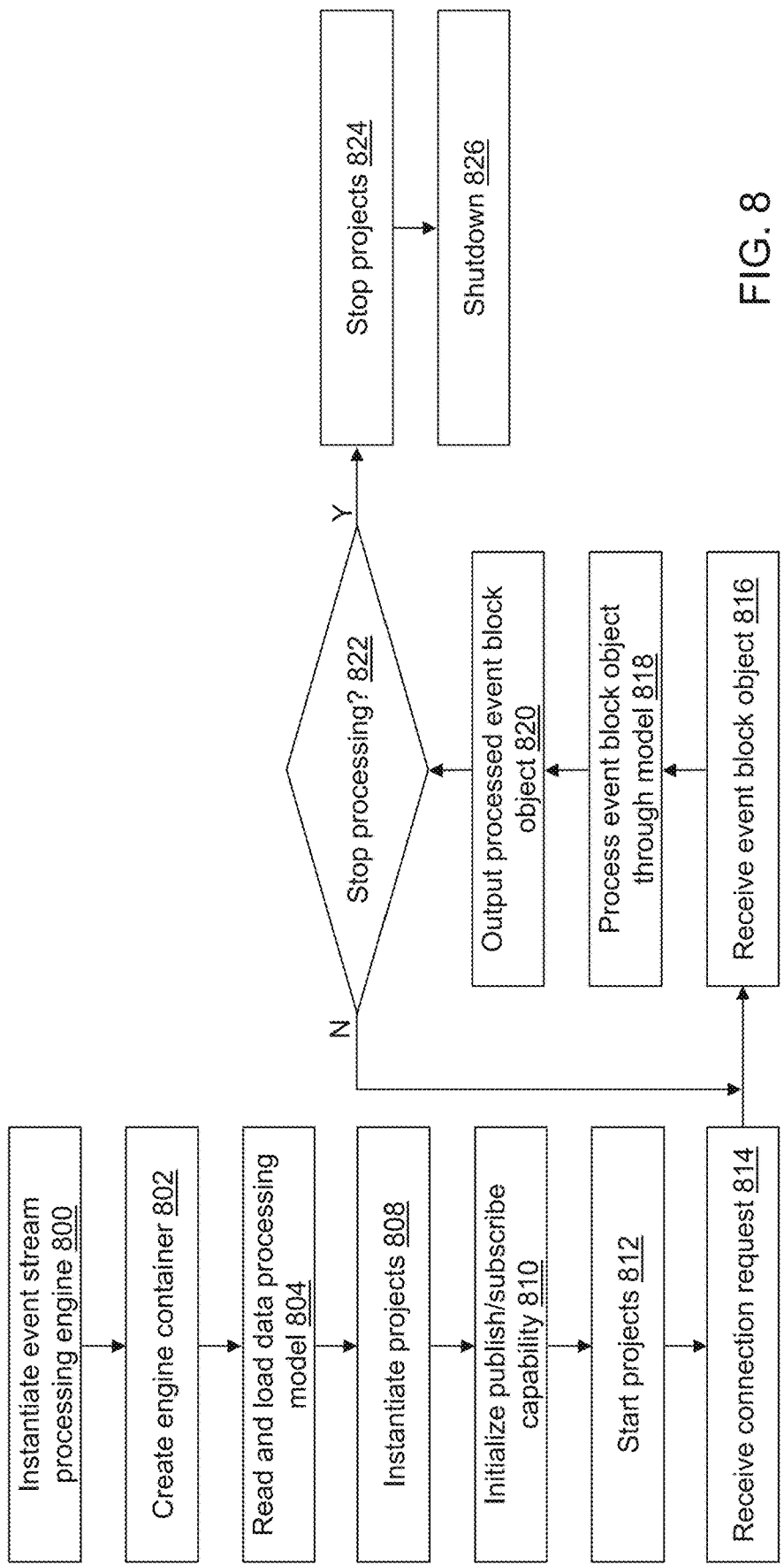
FIG. 8 depicts a flow diagram illustrating examples of operations performed by the ESP device of FIG. 7 in accordance with an illustrative embodiment.

Referring to FIG. 8, example operations associated with ESP application 712 are described. ESP application 712 defines how incoming event streams from event publishing system 102 are transformed into meaningful outgoing event streams consumed by event subscribing system 106. Additional, fewer, or different operations may be performed depending on the embodiment. The order of presentation of the operations of FIG. 8 is not intended to be limiting In an operation 800, ESPE 400 is instantiated at ESP device 104.

In an operation 802, the engine container is created. For illustration, ESPE 400 may be instantiated using a function call that specifies the engine container as a manager for an ESP model. The function call may include the engine name for ESPE 400. Data processing model 714 includes a definition of an ESP model to execute using ESPE 400. For illustration, data processing model 714 may be an XML file that is parsed and may include a program referenced for execution in a derived window 406, 408 by the parsed XML from data processing model 714.

Figure 9:
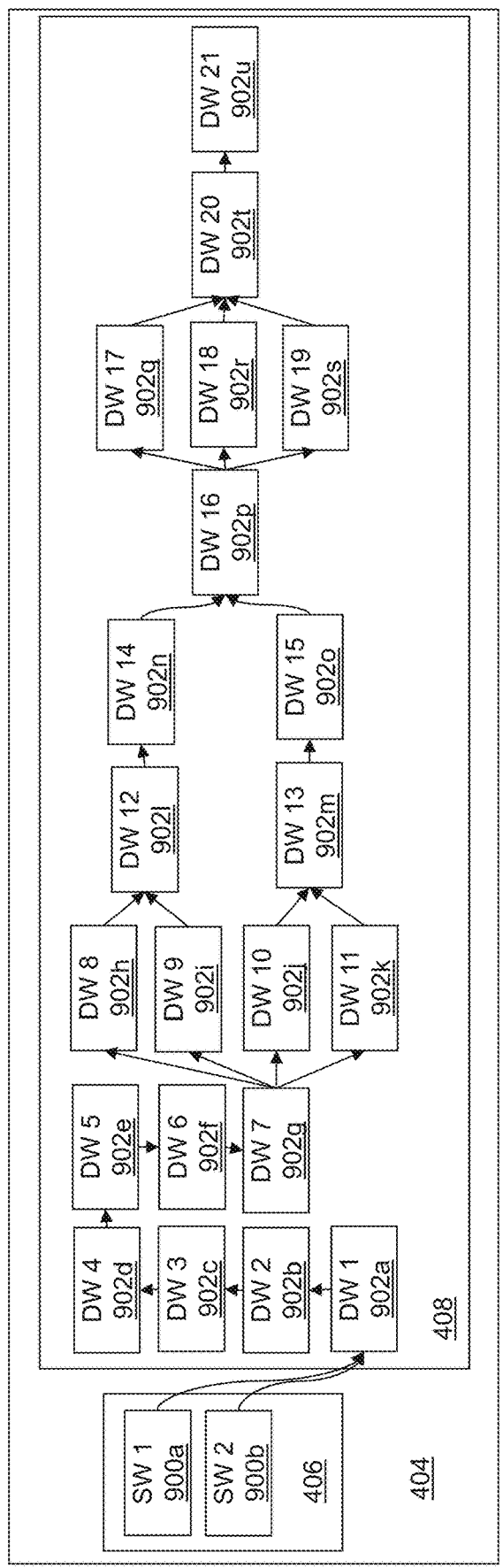
FIG. 9 depicts a directed graph of windows for event stream manipulation and transformation performed by the ESP device of FIG. 7 in accordance with an illustrative embodiment.

Referring to FIG. 9, a graphical representation of a continuous query 404 that could be defined in data processing model 714 is shown in accordance with an illustrative embodiment. The graphical representation indicates that the source windows 406 include a first source window (SW) 1 900a and a second SW 2 900b into which data is published using adapter P 412, pub/sub API P 414, connecters, etc. based on ESP application 712 and/or data read from data processing model 714. SW 1 900a and second SW 2 901a provide input to a derived window (DW) 1 902a. DW 1 902a provides input to a DW 2 902b. DW 2 902b provides input to a DW 3 902c. DW 3 902c provides input to a DW 4 902d. DW 4 902d provides input to a DW 5 902e that provides input to a DW 6 902f that provides input to a DW 7 902g. DW 7 902g provides to a DW 8 902h, to a DW 9 902i, to a DW 10 902j, and to a DW 11 902k. DW 8 902h and DW 9 902i provide input to a DW 12 9021 that provides input to a DW 14 902n. DW 10 902j and DW 11 902k provide input to a DW 13 902m that provides input to a DW 15 902o. DW 14 902n and DW 15 902o provide input to a DW 16 902p. DW 16 902p provides to a DW 17 902q, to a DW 18 902r, and to a DW 19 902s. DW 17 902q, DW 18 902r, and DW 19 902s provide input to a DW 20 902t that provides input to a DW 21 902u.

For illustration, the continuous query flow may define the connectivity between the windows where SW 1 900a is named "real-timeDataSources", SW 2 900b is named "real-timeTrigger", DW 1 902a is named "unionDataSources", DW 2 902b is named "addContext", DW 3 902b is named "subset", DW 4 902d is named "updateCurrentValue", DW 5 902e is named "updateHistory", DW 6 902f is named "consolidateCurrentValue", DW 7 902g is named "enrichDataModelStart", DW 8 902h is named "computeLagZone- Temp", DW 9 902*i* is named "computeLagZoneSetpoint", DW 10 902*j* is named "computeLagFanSpeed", DW 11 902*k* is named "computeLagDuctpressure", DW 12 902*l* is named "gate-computeLagZoneTempDiff", DW 13 902*m* is named "gate-computeLagFanKW", DW 14 902*n* is named "computeLagZoneTempDiff", DW 15 902*o* is named "computeLagFanKW", DW 16 902*p* is named "gate-generateOutput", DW 17 902*q* is named "outputRecords_building", DW 18 902*r* is named "outputRecords_airHandler", DW 19 902*s* is named "outputRecords_fanPoweredBox", DW 20 902*t* is named "gate-outputCompletion", and DW 21 902*u* is named "outputCompletion".

Referring again to FIG. 8, in an operation 808, the one or more projects 402 defined by data processing model 714 are instantiated by ESPE 400. Instantiating the one or more projects 402 also instantiates the one or more continuous queries 404, the one or more source windows 406, and the one or more derived windows 408 defined from data processing model 714. The one or more continuous queries 404 may be instantiated with a dedicated thread pool or pools that generate updates as new event block objects stream through ESPE 400.

In an operation 804, data processing model 714 is read and loaded. ESP application 712 understands the syntax of data processing model 714 that is, for example, an XML model and translates it to something ESPE 400 understands.

In an operation 808, the one or more projects 402 defined in data processing model 714 are instantiated based on the read and loaded data processing model 714.

In an operation 810, the pub/sub capability is initialized for data processing model 714. In an illustrative embodiment, the pub/sub capability is initialized for each project of the one or more projects 402 defined by data processing model 714.

In an operation 812, the one or more projects 402 defined in data processing model 714 are started. For example, one or more connectors, adapter P 412, adapter S 418, etc. may be created to receive or to send event block objects to/from windows as defined in data processing model 714.

In an operation 814, a connection request is received from event publishing device 200 of event publishing system 102 for a source window of the windows-source type (as defined in data processing model 714) of ESPE 400 to which data may be published. A connection request may also be received from event subscribing device 500 of event subscribing system 106 to a source or derived window of ESPE 400 from which event block objects may be received by event subscribing device 500.

In an operation 816, an event block object is received by ESPE 400 through adapter P 412, pub/sub API P 414, connecters, etc. from event publishing device 200. An event block object containing one or more event objects is injected into a source window of the one or more source windows 406 defined in data processing model 714.

In an operation 818, the received event block object is processed through the one or more continuous queries 404 as defined in data processing model 714.

In an operation 820, the processed event block object is routed to event subscribing system 106 based on subscriptions to the windows of data processing model 714. Subscribing devices can correlate a group of subscribed event block objects back to a group of published event block objects by comparing the unique ID of the event block object that a publisher, such as event publishing device 200, attached to the event block object with the event block ID received by a subscribing device, such as event subscribing device 500. The received event block objects further may be stored, for example, in a RAM or cache type memory of third computer-readable medium 708.

In an operation 822, a determination is made concerning whether or not processing is stopped. If processing is not stopped, processing continues in operation 816 to continue receiving the one or more event streams containing event block objects from event publishing system 102. If processing is stopped, processing continues in an operation 824.

In operation 824, the started engines/projects/connectors may be stopped

In an operation 826, ESPE 400 may be shutdown.

Figure 10:
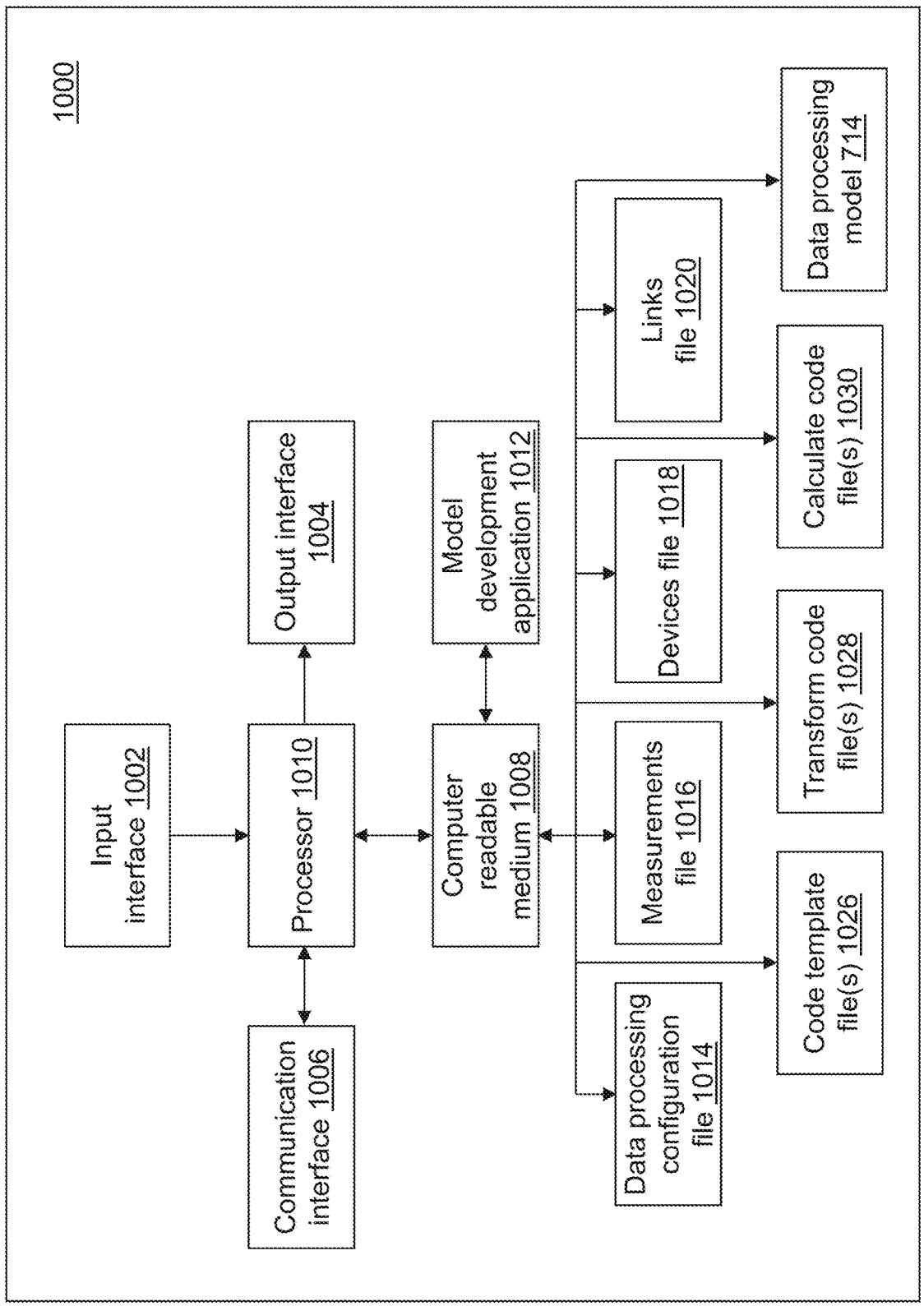
FIG. 10 depicts a block diagram of a data processing model development device in accordance with an illustrative embodiment.

For illustration, referring to FIG. 10, a block diagram of a data model developer device 1000 is shown in accordance with an example embodiment. Data model developer device 1000 creates data processing model 714 that may include one or more files.

Data model developer device 1000 may include a fourth input interface 1002, a fourth output interface 1004, a fourth communication interface 1006, a fourth computer-readable medium 1008, a fourth processor 1010, a model development application 1012, a data processing configuration file 1014, a measurements file 1016, a devices file 1018, a links file 1020, code template files 1026, transform code files 1028, calculate code files 1030, and data processing model 714. Data processing configuration file 1014, measurements file 1016, devices file 1018, links file 1020, code template files 1026, transform code files 1028, and calculate code files 1030 may be integrated into one or more files. Transform code files 1028 and calculate code files 1030 may be comprised of zero or more files.

Referring to FIG. 10, fewer, different, and additional components may be incorporated into data model developer device 1000. Fourth input interface 1002 provides the same or similar functionality as that described with reference to input interface 202 of event publishing device 200 though referring to data model developer device 1000. Fourth output interface 1004 provides the same or similar functionality as that described with reference to output interface 204 of event publishing device 200 though referring to data model developer device 1000. Fourth communication interface 1006 provides the same or similar functionality as that described with reference to communication interface 206 of event publishing device 200 though referring to data model developer device 1000. Data and messages may be transferred to/from data model developer device 1000 using fourth communication interface 1006. Fourth computer-readable medium 1008 provides the same or similar functionality as that described with reference to computer-readable medium 208 of event publishing device 200 though referring to data model developer device 1000. Fourth processor 1010 provides the same or similar functionality as that described with reference to processor 210 of event publishing device 200 though referring to data model developer device 1000.

Model development application 1012 performs operations associated with creating data processing model 714 based on information read from data processing configuration file 1014, measurements file 1016, devices file 1018, links file 1020, code template files 1026, transform code files 1028, and/or calculate code files 1030. The operations may be implemented using hardware, firmware, software, or any combination of these methods. Referring to the example embodiment of FIG. 10, model development application 1012 is implemented in software (comprised of computer-readable and/or computer-executable instructions) stored in fourth computer-readable medium 1008 and accessible by fourth processor 1010 for execution of the instructions that embody the operations of model development application 1012. Model development application 1012 may be written using one or more programming languages, assembly languages, scripting languages, etc. Model development application 1012, for example, may be implemented as a Web application.

Figure 11:
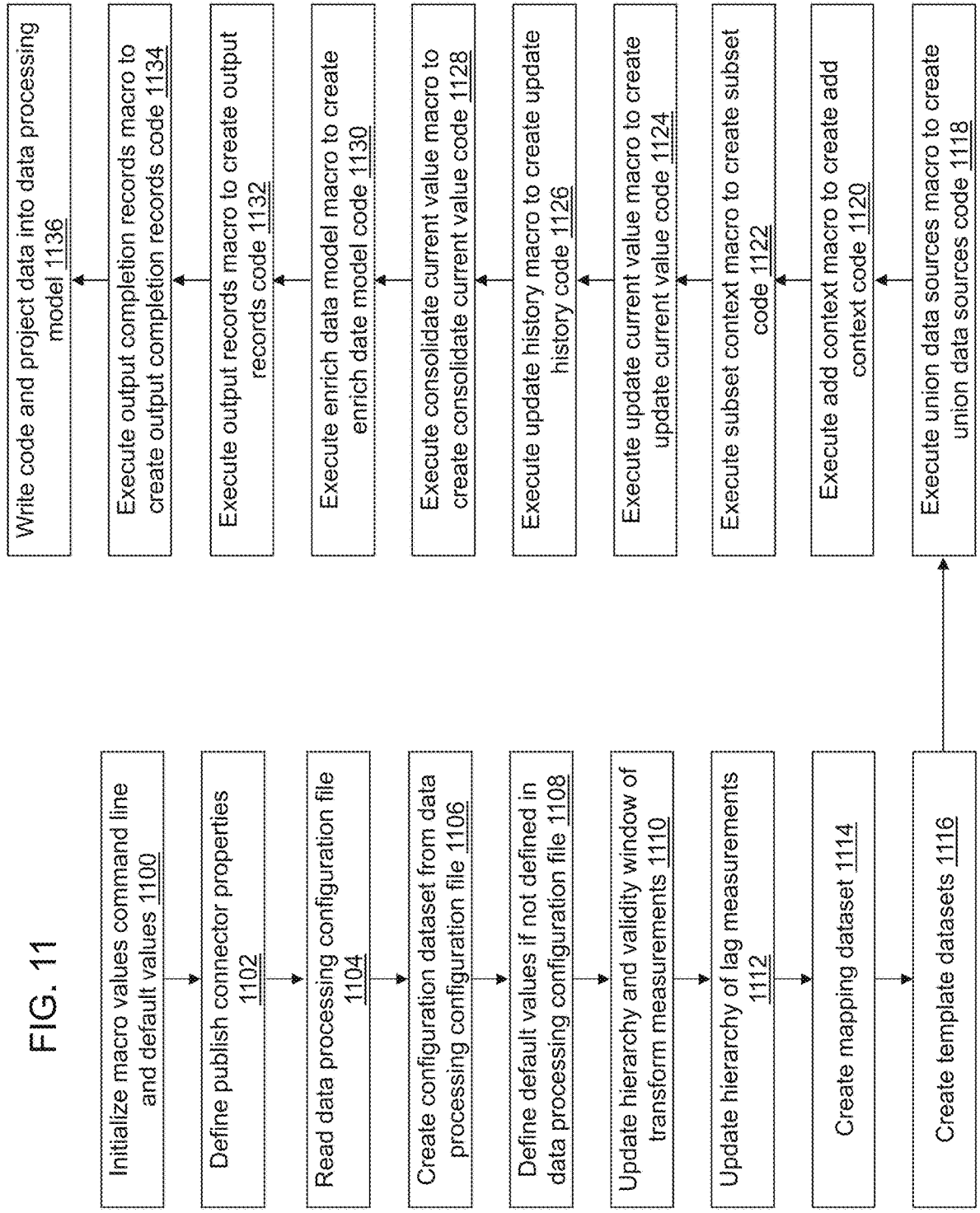
FIG. 11 depicts a flow diagram illustrating examples of operations performed by the data processing model development device of FIG. 10 in accordance with an illustrative embodiment.

Referring to FIG. 11, example operations associated with model development application 1012 are described. Additional, fewer, or different operations may be performed depending on the embodiment. The order of presentation of the operations of FIG. 11 is not intended to be limiting. For illustration, the following macro command may be executed to trigger execution of model development application 1012:

% buildEspProject (
projectname=qa,
projectxmllist=qa,
historyInterval=900,
outputInterval=900);

where the value defined for projectname defines a project name to use for the resulting data processing model 714, the value defined for projectxmllist defines a list of files the data processing configuration file 1014 that may include a plurality of files, the value defined for historyInterval defines how often a current measurement is added to a real time history, the value defined for outputInterval defines how often a record is output.

The parameter values may be provided on a command line to execute model development application 1012 or in the macro that is executed. Additional or fewer parameters may be defined in alternative embodiments. For example, file locations may use default locations using a standardized directory structure or the file location may be an input provided on the command line to execute model development application 1012, in the macro that is executed, or read from a known file and file location that provides default parameter values.

In an operation 1100, macro values used by model development application 1012 are initialized, for example, from the values provided to execute model development application 1012, using default values read from a default input file, and/or defined by the code of model development application 1012.

In an operation 1102, publish connector properties are defined. The publish connector properties may be read from a default publish connector file, from the values provided to execute model development application 1012, and/or defined by the code of model development application 1012. Illustrative publish connector properties include a host IP address, a client ID, a message type, a user ID, a password, a port number, a secure sockets layer (ssl) indicator, a location/filename of an ssl certificate if the ssl indicator indicates true, etc.

In an operation 1104, data processing configuration file 1014 is read. The location and filename for data processing configuration file 1014 may be defined from the projectxmllist parameter or otherwise provided as an input to model development application 1012. Data processing configuration file 1014 defines what datasets should be created, what sensor measurements are included in each dataset, and what additional measurements are computed. In an illustrative embodiment, data processing configuration file 1014 is an XML file though one or more files having various formats may be used in alternative embodiments. The basic structure of the XML schema for data processing configuration file 1014 is shown below for illustration.

```
<?xml version="1.0" encoding="UTF-8"?>
<espModel>
    <modelArea modelAreaID="insert-device-type-for-final-dataset" defaultHierarchy="insert-default-hierarchy">
        <labels>
            <level labelDeviceType=" " labelLevel=" ">1</level>
        </labels>
        <modelMeasurements>
            <!--RAW MEASUREMENTS-->
            <!--TRANSFORM MEASUREMENTS-->
            <!--LAG MEASUREMENTS-->
            <!--AGGREGATION MEASUREMENTS-->
            <!--CALCULATION MEASUREMENTS-->
        </modelMeasurements>
    </modelArea>
</espModel>
```

The ESP model definition used to create data processing model 714 is defined between the espModel start and end tags. The model area definition that defines one or more modeling areas to be processed by data processing model 714 where each modeling area is defined between a pair of modelArea start and end tags. Output datasets created when ESPE 400 is executed with data processing model 714 created from data processing configuration file 1014 contain records that are for the same device level. The model area definition allows specification of what device level dataset to output. This output dataset may have the same name as the device level to which all the fields are related.

The modelArea start tag may include a "modelAreaID" attribute and a "defaultHierarchy" attribute. The modelAreaID attribute is defined for a device type of interest and is used as a name of an output dataset that may be created when ESPE 400 is executed with data processing model 714 created from data processing configuration file 1014. The modelAreaID attribute value matches a device type included in devices file 1018. A separate output dataset is created for each modeling area defined between the espModel start and end tags. The defaultHierarchy attribute defines a default hierarchy to be used for the modeling area and matches a hierarchy name included in links file 1020 and associated with the modelAreaID attribute value. A hierarchy name defined by the defaultHierarchy attribute value indicates a main hierarchy from which the levels and connections may be determined by model development application 1012.

Each model area definition may include a labels definition and a measurements definition. The labels definition provides a context for a device identified using the default hierarchy defined in links file 1020 and includes zero or more level definitions defined between level start and end tags. Each level start tag may include a "labelDeviceType" attribute and a "labelLevel" attribute. The labelDeviceType attribute value defines a device type that matches a device type in devices file 1018 for the associated label level in the hierarchy defined by the defaultHierarchy attribute value. The labelLevel attribute value defines a label to be used in output for the matching device type in devices file 1018. A label level value is defined between the level start and end tags and is a numerical value indicating a level for the matching device type in devices file 1018. In an illustrative embodiment, there may be up to four levels though a greater or a fewer number of levels may be defined in alternative embodiments.

Each level describes a different level of the hierarchy defined by the defaultHierarchy attribute value. The labels definition is used to define a parent-child relationship for a user interface of event subscribing application 522. The number of levels that may be filled when ESPE 400 is executed with data processing model 714 is dependent on the number of levels in the hierarchy. If the hierarchy is at the top level (e.g., a location level that is a building), all of the levels may be empty. Otherwise, the levels follow a parent-child relationship defined using links file 1020 for the hierarchy. As an example, from devices file 1018, it is determined that, in the air hierarchy, a child of the location level (e.g., bldg) is the "hru" level, which is a parent of the "ahu" level. At the lowest level defined, the "labelDeviceType" attribute value has the same device type as the value associated with the modelAreaID attribute value.

The XML provided below shows an illustrative labels definition.

```
<espModel>
    <modelArea                modelAreaID="ahu"
defaultHierarchy="air">
        <labels>
            <level   labelDeviceType="hru"   labelLevel="Heat
                Recovery Unit">1</level>
            <level labelDeviceType="ahu" labelLevel="Air Handler Unit">2</level>
            <level labelDeviceType=" " labelLevel=" ">3</level>
            <level labelDeviceType=" " labelLevel=" ">4</level>
        </labels>
    </modelArea>
</espModel>
```

Multiple model areas can be defined resulting in multiple output datasets. For illustration, the XML below indicates that two output datasets may be created when ESPE 400 is executed with data processing model 714 created from data processing configuration file 1014. Each record of a first dataset named "ahu" contains fields relevant to an individual air handler at a given date/time. Each record of a second dataset named "fpb" contains fields relevant to an individual fan powered box at a given date/time.

```
<espModel>
    <modelArea                modelAreaID="ahu"
        defaultHierarchy="air">
        <!--MODEL AREA: Air Handler-->
    </modelArea>
    <modelArea                modelAreaID="fpb"
        defaultHierarchy="air">
        <!--MODEL AREA: Fan Powered Box-->
    </modelArea>
</espModel>
```

The measurements definition defines one or more measurements that are tracked and created when data processing model 714 is executed using ESPE 400 and are defined between the "modelMeasurements" start and end tags of a modeling area definition. There are five kinds of measurements in the illustrative embodiment: raw measurements (the sensor measurements included in the published event stream), transform measurements, lag measurements, aggregate measurements, and calculated measurements. Each type is defined by zero or more measurement start and end tags except the raw measurements that includes one or more measurement start and end tags. For illustration, the XML below defines an illustrative measurement of each type:

```
<measurement measurementType="raw"
    deviceType=" "
    measurementID=" "
    measurementIDLabel=" "
    validityWindow=" ">
</measurement>
<measurement measurementType="transform"
    deviceType=" "
    measurementID=" "
    measurementIDLabel=" "
    validityWindow=" ">
    <inputMeasurements>
        . . . list measurements required as inputs for this
            combination . . .
    </inputMeasurements>
    <transform Definition>
        . . . details related to the logic needed for this combination . . .
    </transformDefinition>
</measurement>
<measurement measurementType="lag"
    deviceType=" "
    measurementID=" "
    measurementIDLabel=" "
    validityWindow=" ">
    <inputMeasurements>
        inputMeasurement inputDeviceType="ahu"
        inputMeasurementID="ahu_sply_fan_kw"/>
    </inputMeasurements>
    <lagDefinition>
        . . . details related to the logic needed for this combination . . .
    </lagDefinition>
</measurement>
<measurement measurementType="aggregation"
    deviceType=" "
    measurementID=" "
    measurementIDLabel=" "
    validityWindow=" ">
    <inputMeasurements>
        . . . list measurements required as inputs for this
            combination . . .
    </inputMeasurements>
    <aggregationDefinition>
        . . . details related to the logic needed for this combination . . .
    </aggregationDefinition>
</measurement>
<measurement measurementType="calculation"
    deviceType=" "
    measurementID=" "
    measurementIDLabel=" "
    validityWindow=" ">
    <inputMeasurements>
        . . . list measurements required as inputs for this
            combination . . .
    </inputMeasurements>
    <calculationDefinition>
        . . . details related to the logic needed for this combination . . .
    </calculationDefinition>
</measurement>
```

The measurement start tag includes a "measurementType" attribute that is selected from "raw" to indicate a raw measurement, "transform" to indicate a transform measurement, "lag" to indicate a lag measurement, "aggregation" to indicate an aggregation measurement, and "calculation" to indicate a calculation measurement. The measurements of each type are grouped together in data processing configuration file 1014 in the order specified for simplicity of review though this is not required. Transform measurements operate on individual raw measurements as they stream in and therefore can only be based on raw measurements. Any type of measurement except a raw and a transform measurement type can be based on a measurement output from another measurement type including another measurement type of the same type. For example, a lag of an aggregation measurement can be computed by computing a lag value based on an output of an aggregation measurement.

If a computation is dependent on another measurement, those dependencies are specified in the inputMeasurements list. This applies to all derived measurements and facilitates the process of determining the order of calculations and whether certain derived measurements require one or multiple calculations to be completed before proceeding. In some cases, the inputMeasurements list may be able to be determined directly from the transformDefinition, lagDefinition, aggregationDefinition, and calculationDefinition tags.

The specification of all of the measurement types shares the same basic measurement information, but each has additional attributes to accommodate the processing necessary for that specific measurement type. For example, there are ten common attributes for all measurement types. The XML schema below illustrates the definition of the ten common attributes for all measurement types <measurement
    measurementType="raw|transform|lag|aggregation|
       calculation"
    deviceType="insert-device-type-of-raw-measurement"
    measurementID="insert-raw-measurement-id"
    measurementIDLabel="insert-measurement-label-for-vi-
       sualizations"
    measurementDataType="double|char"
    <!--beginning of optional attributes within the measure-
       ments tag-->
    dropVariable="true|false"
    acceptableMin="insert-minimum-acceptable-value"
    acceptableMinLogic="insert-logic-for-minimum-accept-
       able-value"
    acceptableMax="insert-maximum-acceptable-value"
    acceptableMaxLogic="insert-logic-for-maximum-ac-
       ceptable-value"
    <!--end of optional attributes within the measurements
       tag-->

A measurement type is defined using the measurementType attribute value, a device type is defined using the deviceType attribute value, a measurement ID is defined using the measurementID attribute value, a measurement ID label is defined using the measurementIDLabel attribute value, and a measurement data type is defined using the measurementDataType attribute value. When not defined by the measurement tag, default values may be used automatically. For example, the measurementDataType attribute value may default to double if not defined by the measurement tag. Each type of measurement may be defined from an output of any other type of measurement. For example, an aggregation of a calculation based on the lag of a transform may be defined.

The measurement ID describes the associated measurement. If the measurement type selected is raw, the measurement ID matches a measurement ID in measurements file 1016. The measurement ID label provides a description of the sensor measurement that can be displayed in visualization tools. The measurement data type defines a data type of the associated measurement. For example, the measurement data type may be defined as a double data type or a character data type though additional data types may also be selectable.

A measurement type may further be defined using the optional attributes dropVariable, acceptableMin, acceptableMinLogic, acceptableMax, and acceptableMaxLogic. The dropVariable attribute value defines a flag that indicates whether the measurement should be dropped from the output dataset. The dropVariable attribute value may default to false. The acceptableMin attribute value defines a minimum acceptable value. If the value of the measurement is less than the minimum acceptable value, it is set to the minimum acceptable value if acceptableMinLogic is set to limit or is set to missing if acceptableMinLogic is set to missing. The acceptableMax attribute value defines a maximum acceptable value. If the value of the measurement is greater than the maximum acceptable value, it is set to the maximum acceptable value if acceptableMaxLogic is set to limit or is set to missing if acceptableMaxLogic is set to missing.

The first type of measurement is the raw measurement type. The XML schema below defines one or more raw sensor measurements used to monitor the device defined by the modelAreaID attribute value.

<!--RAW MEASUREMENTS-->
    <measurement measurementType="raw"
    deviceType="insert-device-type-of-raw-measurement"
    measurementID="insert-raw-measurement-id"
    measurementIDLabel="insert-measurement-label-for-vi-
       sualizations"
    measurementDataType="double|char"
    <!--beginning of optional attributes within the measure-
       ments tag-->
    dropVariable="true|false"
    acceptableMin="insert-minimum-acceptable-value"
    acceptableMinLogic="insert-logic-for-minimum-accept-
       able-value"
    acceptableMax="insert-maximum-acceptable-value"
    acceptableMaxLogic="insert-logic-for-maximum-ac-
       ceptable-value"
    validityWindow="insert-last-acceptable-timeperiod-for-
       value"
    <!--end of optional attributes within the measurements
       tag-->
    <historicalMeasurementCount>
       insert-number-of-time-periods
    </historicalMeasurementCount>
    </measurement>

The validityWindow attribute of the measurement defines an additional optional attribute for a raw measurement type. The value associated with the validityWindow attribute defines a number of seconds for which a value remains valid. The validityWindow attribute value is used to make sure old values are not retained for the measurement if the sensor goes down or the communication with the sensor is inactive. After the number of seconds specified, ESPE 400 sets the measurement to missing if another sensor reading is not received.

The raw measurement type further includes a historical time period definition defined between the historicalMeasurementCount start and end tags that defines a number of historical periods of the raw measurement to maintain for a lag or a temporal aggregation. The historicalMeasurementCount tag is not an attribute of the measurement tag like the other options for raw measurements. The historicalMeasurementCount tag is a separate tag that occurs within the measurement tag, but outside the initial call. The historicalMeasurementCount tag determines how far back historical data for the measurement is maintained in memory by ESPE 400 to support the calculation of a lag or a temporal aggregation. Typically, this number coordinates with how long a lag the measurement has. If the lag is a lag of one time period, the value defined for the historicalMeasurementCount tag is one to signify that one historical time period of the raw measurement value is kept. One time period is not necessarily one second or one minute. The time period is the frequency with which ESPE 400 outputs measurements. If the output frequency is set to every 15 minutes (900 seconds), the historicalMeasurementCount defined as one time period retains 15 minutes of measurement data for the measurement variable.

The XML below provides six illustrative raw measurements.

```
<!--RAW MEASUREMENTS-->
<measurement measurementType="raw"
deviceType="bldg"
measurementID="wth_tempf"
measurementIDLabel="Temperature (F)"
measurementDataType="double"
validityWindow="3600"
></measurement>
<measurement measurementType="raw"
deviceType="bldg"
measurementID="wth_windspeedkmph"
measurementIDLabel="Windspeed (kmph)"
measurementDataType="double"
></measurement>
<measurement measurementDataType="raw"
deviceType="ahu"
measurementID="ahu_sply_fan_kw"
measurementIDLabel="Supply Fan KW"
measurementDataType="double"
acceptableMin="0"
acceptableMinLogic="limit"
validityWindow="3600"
<historicalMeasurementCount>1</historicalMeasurementCount>
</measurement>
<measurement measurementDataType="raw"
deviceType="ahu"
measurementID="ahu_zohum_act"
measurementIDLabel="Zone Humidity"
measurementDataType="double"
validityWindow="900"
<historicalMeasurementCount>8</historicalMeasurementCount>
></measurement>
<measurement measurementDataType="raw"
deviceType="ahu"
measurementID="ahu_occ_act"
measurementIDLabel="Occupancy"
measurementDataType="double"
validityWindow="7200"
></measurement>
<measurement measurementDataType="raw"
deviceType="fpb"
measurementID="fpb_occ_act"
measurementIDLabel="Supply Fan KW"
measurementDataType="double"
dropVariable="true"
></measurement>
```

The deviceType values for raw measurements do not need to match the deviceType attribute value defined for the modelAreaID attribute. If the deviceType of a measurement is at a lower level in the hierarchy or in a different hierarchy than the deviceType attribute value defined for the modelAreaID attribute, the measurement may be aggregated in the aggregation measurement section. Once the aggregation has been performed, the original raw measurements may no longer be needed. Thus, in this case, the attribute dropVariable may be set to "true". For example, for "deviceType="fpb"" above, fpb is lower on the air hierarchy than ahu, which can be determined from links file 1020. The measurements may no longer be retained after being used for an aggregation. On the other hand, if the deviceType attribute value of the measurement is at a higher level in the hierarchy than the deviceType attribute value defined for the modelAreaID attribute, no additional information may be needed. The value of the raw measurement may be repeated for every relevant device as seen above for "deviceType="bldg"". Bldg is at the location level of the air hierarchy, and thus, is higher in the hierarchy than the ahu device type. The value of the raw measurement may be repeated for every relevant device, but no additional information may be needed. If a deviceType is the same as the deviceType attribute value defined for the modelAreaID attribute, no additional information may be needed.

As seen above for "deviceType="ahu"", if the supply fan kilowatts returned a negative number, the value is reset to zero by ESPE 400. After one hour, if another supply fan measurement is not received by ESPE 400, the measurement may be set to missing.

The second type of measurement is the transform measurement. The XML schema below lists zero or more transform measurements that are each generated based on a single raw measurement.

```
<!--TRANSFORM MEASUREMENTS-->
<measurement measurementType="transform"
deviceType="insert-device-type-of-transform-measurement"
measurementID="insert-transform-measurement-id"
measurementIDLabel="insert-measurement-label-for-visualization"
measurementDataType="double|char"
<!--beginning of optional attributes within the measurements tag-->
dropVariable="true|false"
acceptableMin="insert-minimum-acceptable-value"
acceptableMinLogic="insert-logic-for-minimum-acceptable-value"
acceptableMax="insert-maximum-acceptable-value"
acceptableMaxLogic="insert-logic-for-maximum-acceptable-value"
<!--end of optional attributes within the measurements tag-->
<inputMeasurements>
  <inputMeasurement in putDeviceType="insert-device-type-of-transform-measurement"
  inputMeasurementID="insert-transform-measurement-id"/>
</inputMeasurements>
<transformDefinition>
  <transformTargetMeasurementID>
    insert-transform-measurement-id
  </transformTargetMeasurementID>
</transform Definition>
</measurement>
```

The transform measurement type further includes a transform measurement ID definition defined between the transformTargetMeasurementID start and end tags that defines the measurement ID for the raw measurement on which the transformed measurement is performed. The value associated with the transformTargetMeasurementID tag indicates a raw measurement defined in data processing configuration file 1014 in the raw measurements section. Each transform measurement has an associated transform code file included in transform code files 1026 that contains the code to create the transform measurement. The file is named using the value associated with the transformTargetMeasurementID tag. Transform code files 1028 may be comprised of zero or more code files.

A transform can be any type of calculation on one value. It can contain algebraic expressions, trigonometric expressions, etc. The transform variable is created whenever it's associated raw measurement is observed in the stream. The XML below provides an example of three transform measurements.

```
<!--TRANSFORM MEASUREMENTS-->
<measurement
measurementType="transform"
deviceType="ahu"
measurementID="ahu_fan_active"
measurementIDLabel="Supply Fan Active"
measurementDataType="char"
validityWindow="7200">
    <inputMeasurements>
        <inputMeasurement     inputDeviceType="ahu"
           inputMeasurementID="ahu_sply_fan_kw"/>
    </inputMeasurements>
    <transform Definition>
        <transformTargetMeasurementID>ahu_sply_fan_kw
        </transformTargetMeasurementID>
    </transformDefinition>
</measurement>
<measurement
measurementType="transform"
deviceType="ahu"
measurementID="ahu_sply_fan_kwh"
measurementIDLabel="Supply Fan KWH"
measurementDataType="double"
acceptableMin="0"
acceptableMinLogic="limit">
    <inputMeasurements>
        <inputMeasurement     inputDeviceType="ahu"
           inputMeasurementID="ahu_sply_fan_kw"/>
    </inputMeasurements>
    <transform Definition>
        <transformTargetMeasurementID>ahu_sply_fan_kw
        </transformTargetMeasurementID>
    </transformDefinition>
</measurement>
<measurement
measurementType="transform"
deviceType="ahu"
measurementID="ahu_occ_active"
measurementIDLabel="Occupancy Active"
measurementDataType="char">
    <inputMeasurements>
        <inputMeasurement     inputDeviceType="ahu"
           inputMeasurementID="ahu_occ_act"/>
    </inputMeasurements>
    <transform Definition>
        <transformTargetMeasurementID>ahu_occ_act
        </transformTargetMeasurementID>
    </transformDefinition>
</measurement>
```

A code file named "ahu_fan_active", a code file named "ahu_sply_fan_kwh", and a code file named "ahu_occ_active" include the code to perform each transform, respectively, and are included in transform code files 1028. For illustration, the template below may be used in each transform code file.

```
/*********/
* VARNAME: insert_transform_measurement_measurementID,
* VARTYPE: NUM/8|CHR/insert_length,
/*********/
/* BEGIN CODE */
    insert_logic_to_define_transform
/* END CODE */
```

The "Varname" value matches the name of the file and the value defined by the associated measurementID attribute for the transform measurement. The "Vartype" value defines the data type and length of the transformed measurement. For illustration, the data type can be either NUM or CHR, where the length of the NUM is 8, but the length of the CHR can vary. Other data types and lengths may be used in alternative embodiments. The code to accomplish the transformation replaces the "insert_logic_to_define_transform".

For example, the ahu_fan_active code file included in transform code files 1028 is shown below for illustration.

```
/*********/
* VARNAME: AHU_FAN_ACTIVE;
* VARTYPE: NUM/8;
/*********/
/* BEGIN CODE */
    if measurementDoubleValue gt 0 then
        transformMeasurementCharValue=1;
    else
        transformMeasurementCharValue=0;
/* END CODE */
```

For example, the ahu_sply_fan_kwh code file included in transform code files 1028 is shown below for further illustration.

```
/*********/
* VARNAME: AHU_SPLY_FAN_KWH;
* VARTYPE: NUM/8;
/*********/
/* BEGIN CODE */
    transformMeasurementDoubleValue=measurement DoubleValue/4
/* END CODE */
```

For example, the ahu_occ_active code file included in transform code files 1028 is shown below for further illustration.

```
/*********/
* VARNAME: AHU_OCC_ACTIVE;
* VARTYPE: CHR/5,
/*********/
/* BEGIN CODE */
    if measurementDoubleValue=1 then
        transformMeasurementCharValue='true';
    else
        transformMeasurementCharValue='false';
/* END CODE */
```

Neither of the measurementID attribute value or the transformTargetMeasurementID attribute value is included in the code. The transform differentiates the output measurement from the input measurement. The input data type is that defined for the raw measurement associated with the transformTargetMeasurementID attribute value. The output data type is the measurementDataType attribute value defined for the transform measurement.

The transform measurement allows the user to transform a raw measurement into a new derived measurement. Transform computations are made as their associated raw measurement arrives. For example, unit conversions or measurement data type conversions may be performed. New measurements that use multiple inputs or rely on more complex data enrichment such as lag and aggregation measurements may be specified as calculation measurements.

The third type of measurement is the lag measurement. The XML schema below lists lag measurements that are generated.

```xml
<!--LAG MEASUREMENTS-->
<measurement
measurementType="lag"
deviceType="insert-device-type-of-lag-measurement"
measurementID="insert-lag-measurement-id"
measurementIDLabel="insert-lag-measurement-label-for-visualization"
measurementDataType="double|char"
<!--beginning of optional attributes within the measurements tag-->
dropVariable="true|false"
acceptableMin="insert-minimum-acceptable-value"
acceptableMinLogic="insert-logic-for-minimum-acceptable-value"
acceptableMax="insert-maximum-acceptable-value"
acceptableMaxLogic="insert-logic-for-maximum-acceptable-value"
<!--end of optional attributes within the measurements tag-->
<inputMeasurements>
   <inputMeasurement inputDeviceType="insert-device-type-of-input-measurement"
       inputMeasurementID="insert-measurement-id-of-input-measurement"/>
</inputMeasurements>
<lagDefinition>
   <lagTargetMeasurementID>insert-measurement-id
   </lagTargetMeasurementID>
   <lagValueIndex>insert-number-of-time-periods-of-lag
   </lagValueIndex>
</lagDefinition>
</measurement>
```

The lag measurement type further includes a lag measurement ID definition defined between the lagTargetMeasurementID start and end tags that defines the measurement ID for the measurement on which the lag measurement is performed. The value associated with the lagTargetMeasurementID tag indicates a measurement defined in data processing configuration file 1014 in another measurements section, such as the raw measurements section, the transform measurements section, the aggregation measurements section, or the calculation measurements section, that indicates the measurement value on which the lag is computed.

The lag measurement type further includes a lag value index definition defined between the lagValueIndex start and end tags that defines a number of time periods for the lag. The value associated with lagValueIndex tag is less than or equal to the historicalMeasurementCount attribute value defined for the measurementID attribute associated with the lagTargetMeasurementID. The XML below provides an example of a lag measurement definition.

```xml
<!--LAG MEASUREMENTS-->
<measurement
measurementType="lag"
deviceType="ahu"
measurementID="lag_ahu_zohum_act"
measurementIDLabel="Zone Humidity—One Period Lag"
measurementDataType="double"
validityWindow="7200"
<inputMeasurements>
   <inputMeasurement inputDeviceType="ahu"
       inputMeasurementID="ahu_zohum_act"/>
</inputMeasurements>
<lagDefinition>
   <lagTargetMeasurementID>ahu_zohum_act
   </lagTargetMeasurementID>
   <lagValueIndex>1</lagValueIndex>
</lagDefinition>
</measurement>
<measurement
measurementType="lag"
deviceType="ahu"
measurementID="lag_sply_fan_kwh"
measurementIDLabel="Supply Fan KWH—One Period Lag"
measurementDataType="double"
<inputMeasurements>
   <inputMeasurement inputDeviceType="ahu"
       inputMeasurementID="ahu_sply_fan_kwh"/>
</inputMeasurements>
<lagDefinition>
   <lagTargetMeasurementID>ahu_sply_fan_kwh
   </lagTargetMeasurementID>
   <lagValueIndex>1</lagValueIndex>
</lagDefinition>
</measurement>
```

The lag measurement definition may be similar to the associated measurement definition on which the lag is computed. For example, the deviceType and the measurementDataType may be the same for the lag as it is for the associated measurement definition. The measurementID may be given the same name of the associated measurement definition prepended with "lag_" though other naming conventions may be used.

The fourth type of measurement is the aggregation measurement. The XML schema below provides an example of aggregation measurements.

```xml
<!--AGGREGATION MEASUREMENTS-->
<measurement measurementType="aggregation"
deviceType="insert-device-type-of-lag-measurement"
measurementID="insert-lag-measurement-id"
measurementIDLabel="insert-lag-measurement-label-for-visualization"
measurementDataType="double|char"
<!--beginning of optional attributes within the measurements tag-->
dropVariable="true|false"
acceptableMin="insert-minimum-acceptable-value"
acceptableMinLogic="insert-logic-for-minimum-acceptable-value"
acceptableMax="insert-maximum-acceptable-value"
acceptableMaxLogic="insert-logic-for-maximum-acceptable-value"
<!--end of optional attributes within the measurements tag-->
<inputMeasurements>
   <inputMeasurement inputDeviceType="insert-device-type-of-input-measurement"
       inputMeasurementID="insert-measurement-id-of-input-measurement"/>
</inputMeasurements>
<aggregationDefinition
   aggregationType="relational|temporal">
   <aggregationTargetMeasurementID>insert-measurement-id
   </aggregationTargetMeasurementID>
   <aggregationFunction>avg|max|min|sum
   </aggregationFunction>
   <!--Additional options dependent on relational vs temporal-->
</aggregationDefinition>
</measurement>
```

The aggregation measurement type further includes an aggregation definition defined between aggregationDefinition start and end tags. The aggregation definition includes an "aggregationType" attribute, aggregationTargetMeasurementID start and end tags, and aggregationTargetMeasurementID start and end tags. The aggregationType attribute defines what type of aggregation is performed. The value associated with the aggregationType attribute may be either relational or temporal. A relational aggregation performs an aggregation on one measurement across like devices that have the same device type defined in devices file 1018. A temporal aggregation performs an aggregation on one measurement across a specified period of time.

Each type of aggregation requires a different set of attributes. Two of these attributes are common to both aggregation types. An aggregation measurement ID definition defined between the aggregationTargetMeasurementID start and end tags defines the measurement ID for the measurement on which the aggregation measurement is performed. The value associated with the aggregationTargetMeasurementID tags indicates another measurement defined in data processing configuration file 1014 in the raw measurements section, the transform measurements section, the lag measurements section, the calculation measurements section, or aggregation measurements section.

An aggregation function definition defined between the aggregationFunction start and end tags defines a mathematical type of aggregation to perform and may be selected from "avg" to compute an average of the defined measurement, "max" to compute a maximum value of the defined measurement, "min" to compute a minimum value of the defined measurement, and "sum" to compute a sum value of the defined measurement on which the aggregation may be performed though other mathematical types of aggregation may be defined in alternative embodiments.

A temporal aggregation maintains a specified number of time periods of data of the defined measurement. For illustration, the XML schema below further defines a temporal aggregation.

```
<aggregationDefinition aggregationType="temporal">
<aggregationTargetMeasurementID>insert-measure-
    ment-id
</aggregationTargetMeasurementID>
<aggregationFunction>avg|max|min|sum
</aggregationFunction>
<!--beginning of temporal attributes-->
<aggregationValues
    temporalAggregationMethod="leading|trailing|
    list|range">
    <!--Additional options dependent temporalAggrega-
        tionMethod-->
</aggregationValues>
<!--end of temporal attributes-->
</aggregationDefinition>
```

For temporal aggregations, an aggregation values definition is defined between the aggregationValues start and end tags. The aggregation values definition defines which values of the defined measurement are used in the temporal aggregation computation. The "temporalAggregationMethod" attribute defined between the aggregationValues start and end tags defines the method for selecting the values. The value for the temporalAggregationMethod attribute may be selected from leading, trailing, a list, or a range though other methods may be defined. The value "leading" defines an aggregation over a certain number of time periods just prior to and including a most recent time period. The value "trailing" defines an aggregation over a certain number of time periods starting with the oldest time period maintained. The value "list" defines a list of time periods over which to aggregate the defined measurement. The value "range" defines a range of time periods over which to aggregate the defined measurement.

The first two types of temporal aggregation, leading and trailing aggregation, may have the same the XML schema as shown below for illustration.

```
<!--beginning of temporal attributes-->
<aggregationValues
temporalAggregationMethod="leading|trailing">
    <aggregationIndexCount>insert-number-of-time-peri-
        ods-to-index
    </aggregationIndexCount>
</aggregationValues>
<!--end of temporal attributes-->
```

As a result, when the value for the temporalAggregationMethod attribute is selected as leading or trailing, an aggregation time period count is defined between the aggregationIndexCount start and end tags. The value defined for the aggregationIndexCount tags defines a number of time periods over which to perform the temporal aggregation. For example, for a leading temporal aggregation with the value associated with the aggregationIndexCount tags defined as "4", the four most recent time periods of data may be aggregated including the most recent time period of data. For a trailing temporal aggregation with the value associated with the aggregationIndexCount tag defined as "4", the four oldest time periods of data that have been maintained may be aggregated. If the output frequency is set to every 15 minutes, the data maintained over four time periods is an hour's worth of data. A leading temporal aggregation selects the most recent four time periods, and a trailing temporal aggregation selects the oldest four time periods.

The range type of temporal aggregation has the XML schema shown below.

```
<!--beginning of temporal attributes-->
<aggregationValues
temporalAggregationMethod="range">
    <aggregationStartIndex>insert-time-period-to-start-index
    </aggregationStartIndex>
    <aggregationStopIndex>insert-time-period-to-stop-index
        </aggregationStopIndex> </aggregationValues>
<!--end of temporal attributes-->
```

As a result, when the value for the temporalAggregationMethod attribute is selected as range, an aggregation start period is defined between the aggregationStartIndex start and end tags, and an aggregation stop period is defined between the aggregationStopIndex start and end tags. The value defined for the aggregationStartIndex tags defines a start time period and the value defined for the aggregationStopIndex tags defines a stop time period over which to perform the temporal aggregation.

The list type of temporal aggregation has the XML schema shown below.

```
<!--beginning of temporal attributes-->
<aggregationValues
temporalAggregationMethod="list">
    <aggregationPointIndex>
        insert-time-period-to-be-included-in-aggregation
    </aggregationPointIndex>
<!--end of temporal attributes-->
```

When the value for the temporalAggregationMethod attribute is selected as list, a time period list is defined by specifying each time period to use between a pair of aggregationPointIndex start and end tags. One or more aggregationPointIndex start and end tags may be defined to define a list of time periods. The value of each pair of aggregation- PointIndex tags defines a time period to include in the aggregation. For example, the XML below selects the first, fifth, and ninth time periods to include in the aggregation for the raw measurement.

<!--beginning of temporal attributes-->
<aggregationValues temporalAggregationMethod="list">
<aggregationPointIndex>1</aggregationPointIndex>
<aggregationPointIndex>5</aggregationPointIndex>
<aggregationPointIndex>9</aggregationPointIndex>
</aggregationValues>
<!--end of temporal attributes-->

All four types of temporal aggregation require the target measurement to maintain as many or more historical time periods than used by the temporal aggregation measurement as defined using the historicalMeasurementCount attribute for each defined measurement.

The XML below provides an example of temporal aggregation.

```
<measurement
    measurementType="aggregation"
    deviceType="ahu"
    measurementID="ahu_zohum_act_trl8"
    measurementIDLabel=" Average Zone Humidity - Trailing 8 Periods"
    measurementDataType="double">
    <inputMeasurements>
        <inputMeasurement inputDeviceType="ahu"
        inputMeasurementID="ahu_zohum_act"/>
    </inputMeasurements>
    <aggregationDefinition aggregationType="temporal">
        <aggregationTargetMeasurementID>ahu_zohum_act
        </aggregationTargetMeasurementID>
        <aggregationValues temporalAggregationMethod=" trailing" >
            <aggregationIndexCount>8</aggregationIndexCount>
        </aggregationValues>
        <aggregationFunction>avg</aggregationFunction>
    </aggregationDefinition>
</measurement>
```

The XML schema below defines a relational aggregation for illustration.

<aggregationDefinition aggregationType="relational">
<aggregationTargetMeasurementID>insert-measurement-id
</aggregationTargetMeasurementID>
<aggregationFunction>avg|max|min|sum</aggregationFunction>
<!--beginning of relational attributes-->
<relationshipHeight>
degree-of-separation-between-measurement-and-target
</relationshipHeight>
<aggregationHierarchy>
hierarchy-across-which-aggregation-should-occur
</aggregationHierarchy>
<inclusive>true|false</inclusive>
<!--end of relational attributes-->
</aggregationDefinition>

For relational aggregations, a degree of separation between the aggregated measurement and the measurement defined between the aggregationTargetMeasurementID start end tags is defined between the relationshipHeight start and end tags. A value of one defined between the relationshipHeight start and end tags indicates the same level, which means that the device types are equal for the aggregated measurement and the defined measurement as defined in devices file 1018. Otherwise, the value defined between the relationshipHeight start and end tags is a difference between the level of the aggregated measurement and the level of the defined measurement. For example, assuming the device type of the aggregated measurement is "ahu" and the device type of the defined measurement is "fpb", when "ahu" is a parent of "fpb", the relationshipHeight is −1. In contrast, assuming the device type of the aggregated measurement is "ahu" and the device type of the defined measurement is "fpb", when "ahu" is a child of "fpb", the relationshipHeight is 1.

For relational aggregations, a hierarchy across which the aggregation is performed is defined between the aggregationHierarchy start and end tags. The hierarchy across which the aggregation is performed is defined in links file 1020. The defined hierarchy is used to determine the relationship height. If not specified between the aggregationHierarchy start and end tags, the hierarchy used is the default hierarchy defined by the defaultHierarchy attribute defined as part of the modelArea start tag.

For relational aggregations, an inclusive flag is defined between the inclusive start and end tags. The inclusive flag is used when the value of the degree of separation is one. When the value of the inclusive flag is true, the defined measurement is included in the aggregation. When the value of the inclusive flag is false, the defined measurement is not included in the aggregation.

An illustrative relational aggregation aggregates a defined measurement up a number of levels of the default hierarchy. The XML below provides an example of an illustrative relational aggregation.

<measurement measurementType="aggregation"
deviceType="ahu"
measurementID="avg_fpb_occ_act"
measurementIDLabel="Occupancy (based on VAVs)"
<inputMeasurements>
<inputMeasurement inputDeviceType="fpb"
inputMeasurementID="fpb_occ_act"/>
</inputMeasurements>
<aggregationDefinition aggregationType="relational">
<aggregationTargetMeasurementID>fpb_occ_act
</aggregationTargetMeasurementID>
<aggregationFunction>avg</aggregationFunction>
<!--beginning of relational attributes-->
<relationshipHeight>−1</relationshipHeight>
<!--end of relational attributes-->
</aggregationDefinition>
</measurement>

When no aggregationHierarchy tags are included, the value defined for the default Hierarchy attribute defined by the modelArea start tag is used. The degree of separation is −1; therefore, ESPE 400 may summarize the fpb_occ_act measurement from a child level ("fpb") to a parent level ("ahu"), whose relationship is defined based on the hierarchies described in links file 1020 described further below. The relationship is based on the distance between the device types defined for the measurement from which the aggregation is computed and the aggregated measurement.

Figure 12:
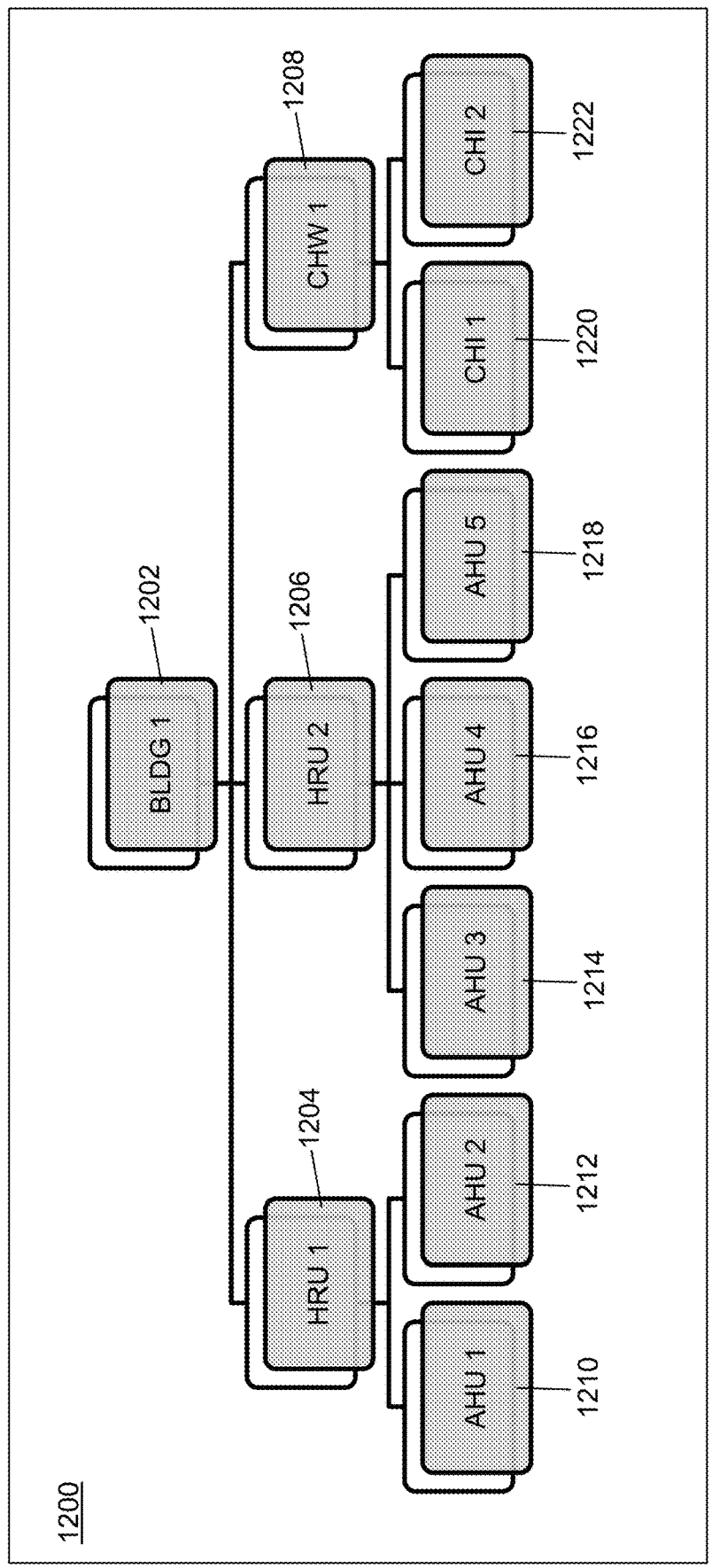
FIG. 12 depicts a system device hierarchy in accordance with an illustrative embodiment.

For illustration, referring to FIG. 12, a graphical representation of linked devices is shown that can be described in links file 1020 for a first hierarchy 1200. First hierarchy 1200 includes a root parent 1202, for example, having the device type "bldg" and the unique device ID "bldg 1". Root parent 1202 has a first child device 1204, a second child device 1206, and a third child device 1208. First child device 1204 has a first child device 1210 and a second child device 1212. Second child device 1206 has a first child device 1214, a second child device 1216, and a third child device 1218. Third child device 1208 has a first child device 1220 and a second child device 1222. For illustration, Table I below provides links file 1020 entries for first hierarchy 1200.

TABLE I

| Hierarchy name | Parent device type | Parent unique device ID | Child device type | Child unique device ID |
|---|---|---|---|---|
| bldg | bldg | bldg1 | hru | hru1 |
| bldg | bldg | bldg1 | hru | hru2 |
| bldg | bldg | bldg1 | chw | chw1 |
| bldg | hru | hru1 | ahu | ahu1 |
| bldg | hru | hru1 | ahu | ahu2 |
| bldg | hru | hru2 | ahu | ahu3 |
| bldg | hru | hru2 | ahu | ahu4 |
| bldg | hru | hru2 | ahu | ahu5 |
| bldg | chw | chw1 | chi | chi1 |
| bldg | chw | chw1 | chi | chi1 |

In an alternative embodiment, first hierarchy 1200 could be divided into a plurality of hierarchies based on the parent-child relationships defined in links file 1020. For example, first hierarchy 1200 could include two hierarchies that share a common device, bldg.

As shown in FIG. 12, the air handlers (ahu) are children of the heat recovery units (hru) meaning that ahu is one level below hru. Therefore, if a defined measurement having the device type "ahu" were to be relationally aggregated to the hru device type level, the degree of separation would be −1. The air handlers are also two levels below the building (bldg) device type level. Therefore, if an ahu measurement were to be aggregated to the bldg level, the degree of separation would be −2. These two examples result in negative relationship heights because a lower level is being aggregated to a higher level.

When aggregating across the hierarchy, the degree of separation is positive. The degree of separation signifies both how far up the hierarchy to walk and how far to walk back down to aggregate. A positive number represents how many levels up the hierarchy the aggregation should occur meaning that it summarizes all of the devices the same number of levels down. The XML below provides an example of a positive degree of separation.

<measurement
    measurementType="aggregation"
    deviceType="ahu"
    measurementID="avg_ahu_sply_fan_kwh_excl"
    measurementIDLabel="Avg Supply Fan kW—Exclusive"
    <inputMeasurements>
      <inputMeasurement inputDeviceType="ahu"
        inputMeasurementID="ahu_sply_fan_kwh"/>
    </inputMeasurements>
    <aggregationDefinition aggregationType="relational">
      <aggregationTargetMeasurementID>ahu_sply_fan_kwh
      </aggregationTargetMeasurementID>
      <aggregationFunction>avg</aggregationFunction>
      <!--beginning of relational attributes-->
      <relationshipHeight>1</relationshipHeight>
      <inclusive>false</inclusive>
      <!--end of relational attributes-->
    </aggregationDefinition>
    </measurement>

Referring again FIG. 12, the aggregation may walk one level up the air hierarchy (the default hierarchy in this case) to the hru level and summarize the air handlers below it. If AHU 1 (first child device 1210 of first child device 1204 of root parent 1202) is the device of interest, the aggregation may walk up to HRU 1 (first child device 1204 of root parent 1202) and average the ahu_sply_fan_kwh"s of AHU 2 (second child device 1212 of first child device 1204 of root parent 1202) because it is one level below HRU 1 in the air hierarchy. AHU 1 is not included in the average because the inclusive flag is set to false meaning that the device of interest is not included in the average computation.

If AHU 3 is the device of interest, the first example may return the average of the ahu_sply_fan_kwh"s of AHU 4 (second child device 1216 of second child device 1206 of root parent 1202) and AHU 5 (third child device 1218 of second child device 1206 of root parent 1202) as they are one level below HRU 2 (second child device 1206 of root parent 1202), which is one level above AHU 3. AHU 3 is not included in the average because the inclusive flag is set to false meaning that the device of interest is not included in the average computation. The aggregated measurement, avg_ahu_sply_fan_kwh_excl, may have the same device type as the device of interest, one of the AHU's in this example.

When the value defined for the relationshipHeight tags is positive, the aggregation is across measurements that are on the same level as the device type of the aggregated measurement. Use of a negative value for the relationshipHeight tags may be a more efficient use of computer processing time by aggregating a higher level and letting that value repeat for all devices.

The fifth type of measurement is the calculation measurement. The XML schema below provides an example of calculation measurements.

<!--CALCULATION MEASUREMENTS-->
    <measurement
    measurementType="calculation"
    deviceType="insert-device-type-of-calculation-measurement"
    measurementID="insert-calculation-measurement-id"
    measurementIDLabel="insert-measurement-label-for-visualization"
    measurementDataType="double|char"
    <!beginning of optional attributes within the measurements tag>
    dropVariable="true|false"
    acceptableMin="insert-minimum-acceptable-value"
    acceptableMinLogic="insert-logic-for-minimum-acceptable-value"
    acceptableMax="insert-maximum-acceptable-value"
    acceptableMaxLogic="insert-logic-for-maximum-acceptable-value"
    <!--end of optional attributes within the measurements tag-->
    <inputMeasurements>
      <inputMeasurement inputDeviceType="insert-device-type-of-input-measurement"
        inputMeasurementID="insert-measurement-id-of-input-measurement"/>
    </inputMeasurements>
    <calculationDefinition
      aggregationType="relational|temporal">
      <retain>true|false</retain>
    </calculationDefinition>
    </measurement>

Additional computed measurements can be calculated using the "calculation" measurement type based on other raw, transform, lag, aggregate, and/or calculation measurements. The calculation measurement includes one additional attribute defined between the calculationDefinition start and end tags. The retain attribute value defines a retain flag that indicates whether the calculation is retained in memory for a subsequent calculation measurement computation. For illustration, the retain attribute may be set to true if the goal was to compute a running tally of how much energy was used. The retain attribute would allow the previous value of the sum to be retained and the calculation code could add the current energy use to that variable.

A calculate code file named by the value defined for the measurementID attribute is included in calculate code files 1030 that contains the code to create the calculation measurement. The template below is used for each calculate code file of the calculate code files 1030.

```
/*********/
* VARNAME: insert_calculated_measurement_measurementID,
* VARTYPE: NUM/8|CHR/insert_length;
* REQUIRED MEASUREMENTS: insert_measurement_required_for_calculation,
/*********/
/* BEGIN CODE */
    insert_logic_to_define_calculation
/* END CODE */
```

The "Varname" value matches the name of the file and the value defined by the associated measurementID attribute for the calculation measurement. The "Vartype" value defines the data type and length of the calculation measurement. For illustration, the data type can either be NUM or CHR, where the length of the NUM is 8, but the length of the CHR can vary and is specified by the insert_length value. Other data types and lengths may be used in alternative embodiments. The "Required Measurements" value defines the measurements that are used to calculate the calculation measurement. When there are multiple required measurements, the measurementID of each required measurement is included in a list separated by spaces. The code to accomplish the calculation replaces "insert_logic_to_define_calculation".

The XML below provides example calculation measurements.

```
<!--CALCULATION MEASUREMENTS-->
<measurement
measurementType="calculation"
deviceType="ahu"
measurementID="ahu_type"
measurementIDLabel="Air Handler Type"
measurementDataType="char">
  <inputMeasurements>
  </inputMeasurements>
  <calculationDefinition>
     <retain>false</retain>
  </calculationDefinition>
</measurement>
<measurement
measurementType="calculation"
deviceType="ahu"
measurementID="weekday"
measurementIDLabel="Weekday Indicator"
measurementDataType="double">
  <inputMeasurements>
  </inputMeasurements>
  <calculationDefinition>
     <retain>false</retain>
  </calculationDefinition>
</measurement>
<measurement
measurementType="calculation"
deviceType="ahu"
measurementID="holiday"
measurementIDLabel="Holiday Indicator"
measurementDataType="double">
  <inputMeasurements>
  </inputMeasurements>
  <calculationDefinition>
     <retain>false</retain>
  </calculationDefinition>
</measurement>
<measurement
measurementType="calculation"
deviceType="ahu"
measurementID="workhours"
measurementIDLabel="Workhours Indicator"
measurementDataType="double">
  <inputMeasurements>
     <inputMeasurement inputDeviceType="ahu"
        inputMeasurementID="weekday"/>
     <inputMeasurement inputDeviceType="ahu"
        inputMeasurementID="holiday"/>
  </inputMeasurements>
  <calculationDefinition>
     <retain>false</retain>
  </calculationDefinition>
</measurement>
```

The first example calculation measurement determines an air handler type. A code file named "ahu_type" is included in calculate code files 1030. The Air Handler Type is created using the deviceID, which already exists in the event stream automatically as part of the event object. An illustrative code file named "ahu_type" is shown below to determine the air handler type.

```
/*********/
* VARNAME: AHU_TYPE;
* VARTYPE: CHR/15,
* REQUIRED MEASUREMENTS:
/*********/
/* BEGIN CODE */
    if deviceID in ('AH_1C' 'AH_1D' 'AH_1F' 'AH_1G' 'AH_GA' 'AH_GB' 'AH_GG')
    then
        ahu_type='Single Zone';
    else
        ahu_type='Multi Zone';
    end;
    end;
/* END CODE */
```

The second example calculation creates a Holiday Indicator, which is a basic indicator for whether or not the day is a holiday. The Holiday Indicator is created using the date, which already exists in the event stream automatically as part of the event object.

The third example calculation creates a Weekday Indicator, which is a basic indicator for whether or not the day is a weekday. The Weekday Indicator is created using the date, which again already exists in the event stream.

The fourth example calculation measurement creates a Workhours Indicator, which is a basic indicator of whether or not the time period is during work hours. To determine this characteristic, whether or not the date is a weekday and/or holiday needs to be determined first. Therefore, creation of the Workhours Indicator is dependent on both the weekday calculation and the holiday calculation. Those dependencies are listed inside the <inputMeasurements>tag. The model development application 1012 utilizes these dependencies between measurements to determine the proper order of computations. Because of the dependency on the weekday and holiday variables, the workhours variable would be computed after both the weekday calculation and the holiday calculation.

A code file named "workhours" is included in calculate code files 1030. An illustrative code file named "workhours" is shown below to create a "workhours" calculation measurement from the "weekday" and "holiday" measurements.

```
/*********/
* VARNAME: workhours;
* VARTYPE: NUM/8;
* REQUIRED MEASUREMENTS: weekday holiday;
/*********/
/* BEGIN CODE */
    workhours=0;
    if (weekday=1 and holiday=0) and (hour(timepart
(msr_dttm)) ge 6 and
    hour(timepart(msr_dttm)) le 18) then workhours=1;
/* END CODE */
```

In the example, the "workhours" measurement has a binary value, which is classified as a numeric in the vartype. Calculate code files 1030, which may refer to one or more calculate code files may include a file named "workhours" that includes the recited code. The variable msr_dttm is a date time variable value that is automatically created for an event by ESPE 400.

In an operation 1106, a configuration dataset is created from the values read from data processing configuration file 1014. The configuration dataset organizes the provided data into tables for access when creating data processing model 714. For example, the configuration dataset is created by joining the XML configuration information into a single source table. Subsequent processing can query the configuration dataset for specific information.

In an operation 1108, default values are defined for values for which a value may be needed but was not defined from data processing configuration file 1014.

In an operation 1110, hierarchy and validity window information are updated for transform measurements assuming that the transformed measurements have the same hierarchy and validity window as the associated raw measurement, if defined.

In an operation 1112, hierarchy information is updated for lag measurements assuming that the lagged measurements have the same hierarchy as the associated measurement, if defined.

Figure 13:
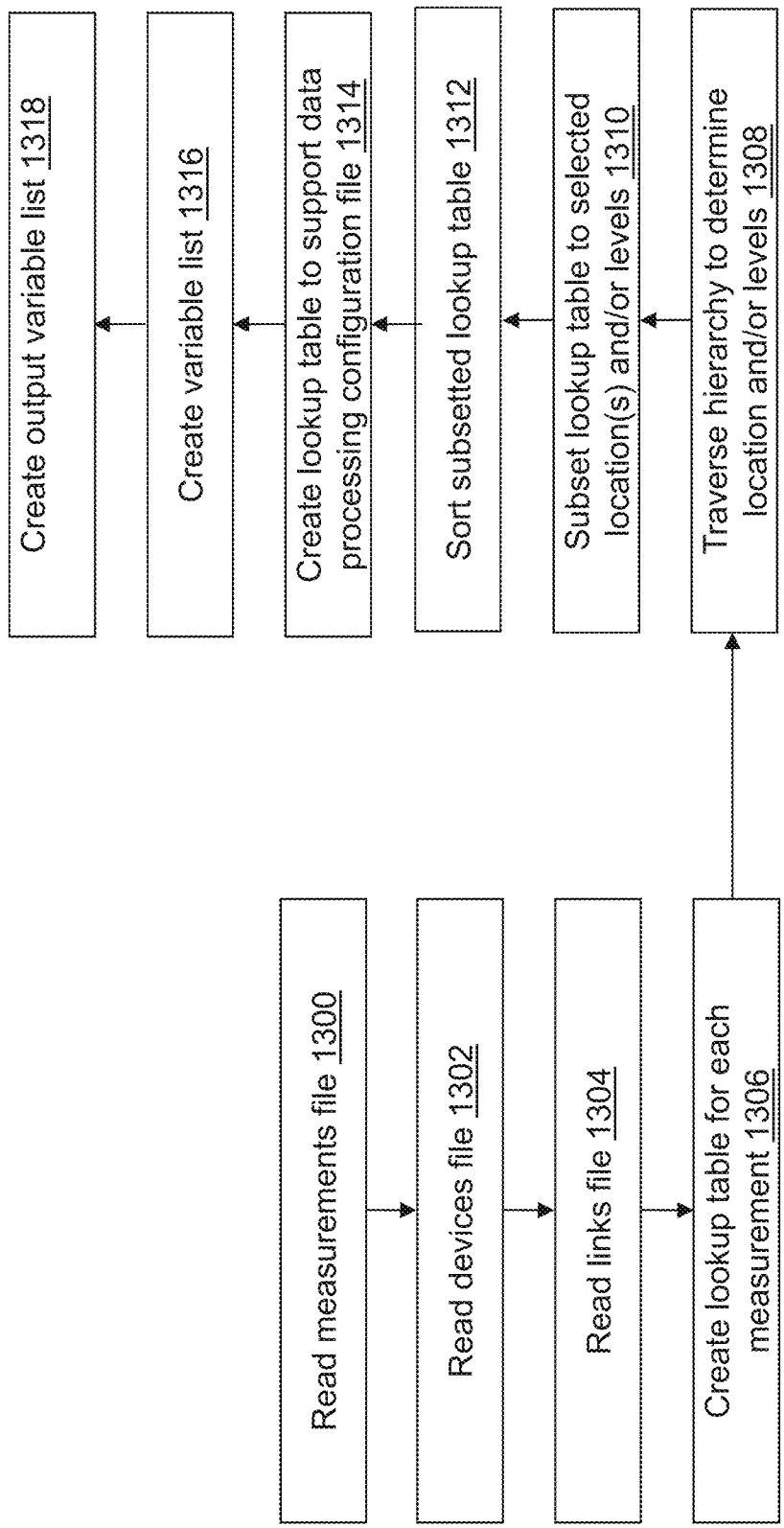
FIG. 13 depicts a flow diagram illustrating additional examples of operations performed by the data processing model development device of FIG. 10 in accordance with an illustrative embodiment.

In an operation 1114, a mapping dataset is created. For illustration, referring to FIG. 13, example operations associated with creating the mapping dataset are described. Additional, fewer, or different operations may be performed depending on the embodiment. The order of presentation of the operations of FIG. 13 is not intended to be limiting.

In an operation 1300, measurements file 1016 is read. For illustration, each row in measurements file 1016 maps the raw fields sent in the source window to the unique device ID and standardized measurement ID to which it belongs. For illustration, each row includes columns that correspond to the raw fields sent in the source windows as well as columns that indicate the unique device ID and standardized measurement ID with which to associate that raw sensor reading. In some applications, only a measurement identifier may be received in an event record by ESPE 400 when data processing model 714 is used while in others both the measurement identifier and the unique device identifier may be received in a raw event record. If only a measurement identifier is received, the measurement identifier contains information that uniquely identifies the measurement and the mapping file associates that measurement identified with a device ID and a standardized measurement ID. If both a measurement identifier and device identifier are received from the raw source, the measurements file may be used to map those raw identifiers to a unique device ID and standardized measurement ID. Whether both a measurement identifier and a device identifier or only a measurement identifier are received may be defined at the measurement level such that some entries of measurements file 1016 may include only a measurement identifier while others include both a device identifier and a measurement identifier. In any case, the measurements file 1016 serves to map the raw sensor measurements received in the source windows to a unique device ID and a standardized measurement ID.

In cases where only a unique measurement identifier is received, the measurement identifier is used as a key to lookup measurement information about the unique device ID and the standardized measurement ID. When both a measurement identifier and a device identifier are received, both are used as a combined key to lookup the unique device ID standardized measurement ID.

The standardized measurement ID may be a character string that describes the measurement. The standardized measurement ID is defined consistently across all devices. For example, an air handler fan speed should not be specified in different ways such as by ahu_fan_spd, by ahu-_fan_speed, and by ahufnspd in measurements file 1016. If so, model development application 1012 may not recognize that these all reference the same type of measurement. The air handler fan speed should instead be consistently represented such as using ahu_fan_spd for the measurement ID.

In an operation 1302, devices file 1018 is read. For illustration, each row in devices file 1018 defines a device. Devices file 1018 defines information about the device using a device type, the unique device ID, and a device label. The device type is an abbreviation for the device type such as ahu for an air handler unit. Each unique device ID included in devices file 1018 may match a unique device ID included in measurements file 1016. The device label is a ready-for-display device ID. The device type should be the same across like devices because it is used to group devices and add context to the devices both with labels and links to other devices.

In an operation 1304, links file 1020 is read. For illustration, each row in links file 1020 defines how devices are connected. Links file 1020 defines a series of parent-child relationships. From measurements file 1016, information about all of the sensors that exist in a system is described. From devices file 1018, information about all of the devices that exist in the system is described. Links file 1020 describes how the devices that include sensors that generate measurements are related to one another so that information from the system as a whole can be determined as discussed further below.

Links file 1020 includes a hierarchy name, a parent unique device ID, and a child unique device ID. The system may include a plurality of hierarchies of devices. The hierarchy name is a description of the associated hierarchy. For example, in an environmental system there may be an air hierarchy, a power hierarchy, a physical hierarchy, etc. Respective hierarchy names could be "air", "power" and "physical". The parent unique device ID matches the unique device ID of a first device in devices file 1018. The child unique device ID matches the unique device ID of a second device in devices file 1018. The first device is the parent and the second device is the child to form a parent-child relationship between the first device and the second device.

Each record included in links file 1020 contains a unique combination of first and second devices. Each first (parent) device can have one or more second (child) devices in the same or different hierarchies. Additionally, each second (child) device can have one or more first (parent) devices in different hierarchies. Each second (child) device has a single first (parent) device when included in the same hierarchy.

In an operation 1306, a lookup table may be created for each measurement defined in measurements file 1016 that also includes the associated information from devices file 1018 and links file 1020.

In an operation 1308, the hierarchy may be traversed to define each level defined between the labels start and end tags of data processing configuration file 1014 using the created configuration dataset. If a physical hierarchy exists, the physical location of each device could be determined similarly.

In an operation 1310, the created lookup table may be divided into subsets based on the location(s), label(s), or other desired device groupings selected in data processing configuration file 1014.

In an operation 1312, the subsetted lookup table may be sorted by the customer location device type, measurement ID, or any other relevant fields.

In an operation 1314, a lookup table may be created that contains the information needed to support the data processing configuration file 1014.

In an operation 1316, a variable list that includes each raw, transform, lag, aggregation, and calculation measurement may be created. A plurality of variable lists may be created. For example, a list of raw measurements may be included in a raw variable list, a list of transform measurements may be included in a transform variable list, a list of lag measurements may be included in a lag variable list, a list of aggregation measurements may be included in an aggregation variable list, a list of calculation measurements may be included in a calculation variable list, etc. The variable list(s) may be indexed by modeling area ID.

In an operation 1318, an output variable list may be created. The output variable list may include each variable from the other created lists. A plurality of output variable lists may be created. For example, an output variable list may be created for each model area defined in the created configuration dataset from data processing configuration file 1014. The output variable list(s) may be indexed by modeling area ID.

The mapping dataset includes the subsetted lookup table, the modeling area lookup table, the variable list(s), the model variable list(s), and the output variable list(s), etc. The mapping dataset joins information from data processing configuration file 1014, measurements file 1016, devices file 1018, and links file 1020 into a source table so that subsequent processing can query the mapping dataset for specific information.

Referring again to FIG. 11, in an operation 1116, a templates dataset is created by reading code template files 1026 into memory to define a union data sources template dataset, an add context template dataset, a subset template dataset, an update current value template dataset, an update history template dataset, a consolidate current value template dataset, an enrich template dataset, a transform template dataset, a lag template dataset, an aggregation template dataset, a calculation template dataset, a gate template dataset, an output records template dataset, an output completion template dataset, etc.

In an operation 1118, a union data sources macro is executed to create union data sources code using the union data sources template dataset included in the templates dataset. The union data sources macro includes union data sources macro code to execute with the created configuration dataset and the created mapping dataset to define internal macros defined in the union data sources template dataset. Execution of the union data sources macro creates union data sources code included as code or as a reference to a code file between mas-module start and end tags in data processing model 714 for execution in a derived window having the calculate type by ESPE 400 as described further below. The union data sources template dataset defines code, for example, written as a DS2 package with one or more methods, that is configured to combine data from a plurality of data sources. The created union data sources code is associated with a source window, such as SW 1 900*a*, and a derived window, such as DW 1 902*a*. The source window receives events in real-time and creates and sends a record to the derived window that combines (unions) the real-time records and creates and sends a record to an add context calculate window as described further below. The plurality of data sources may be unioned together for subsequent processing as a result of application of the created union data sources code when data processing model 714 processes data. For illustration, source data may include heating, ventilation and air conditioning (HVAC) data queried from building equipment as well as weather data queried from a weather API.

To ensure that history can be maintained and output records generated at consistent time intervals (for example, every minute), an additional real-time trigger source window, such as SW 2 900*b*, is created by the union data sources code. In this real-time trigger source window, trigger records are generated at a regular time interval using a clock timer based on the historyInterval and outputInterval specified in the data processing configuration file 1014 or in model development application 1012. For illustration, if history should be maintained every minute, a history trigger record is issued each minute to the derived window, such as DW 1 902*a*. If output should be performed every five minutes, an output trigger record is issued every five minutes to the derived window, such as DW 1 902*a*. The trigger records are used by the code from operations 1126 through 1134 to orchestrate when those operations should occur.

In an operation 1120, an add context macro is executed to create add context code using an add context template dataset included in the templates dataset. The add context macro includes add context macro code to execute with the created configuration dataset and the created mapping dataset to define internal macros defined in the add context template dataset. Execution of the add context macro creates add context code included as code or as a reference to a code file between mas-module start and end tags in data processing model 714 for execution in a derived window having the calculate type by ESPE 400 as described further below. The add context template dataset defines code, for example, written as a DS2 package with one or more methods, that is configured to look up relevant information such as the unique device ID and a standardized measurement ID from the mapping dataset created from measurements file 1016, to add the relevant information to the incoming streaming data elements that only contain device and/or measurement identifiers and a timestamp value when each measurement is received in the event stream when data processing model 714 is used to define ESPE 400 execution. The timestamp value may include a date value and a time value that may be combined into a single datetime value from which the date value and the time value can be extracted.

As described previously, the measurement identifier is used as a key to lookup measurement information about the unique device ID and the standardized measurement ID when only the measurement identifier is received. For those measurements, the device ID and the standardized measurement ID are added to the incoming streaming data elements. As described previously, when both a measurement identifier and a device identifier are received, both are used as a combined key to lookup a unique device ID and standardized measurement ID associated with the raw sensor reading. The unique device ID and the standardized measurement ID are added for all raw measurements defined in the data processing configuration file 1014 for all modeling areas and locations. As a result, add context template dataset, for example, includes a placeholder ˆ$@MYRVARDCL@$ˆ. When the add context macro is executed, it replaces the placeholder ˆ$@MYRVARDCL@$ˆ with the raw variable list created as part of the mapping dataset. The created add context code creates and sends a record to a subset calculate window as described further below when data processing model 714 processes data.

For illustration, the created add context code (referred to as package addcontext_pts) includes an initialization method (referred to as "init") and an add context measurements method (referred to as "addcontextPoints") defined from the add context template dataset. An illustrative initialization method is provided below where arrow containing "_measurementGuid_=" to "points.add( );" is created for each measurement:

```
method ink( );
points=_new_hash(10,");
points.multidata('yes');
points.defineKey('_deviceGuid_');
points.defineKey('_measurementGuid_');
points.defineData('_deviceGuid_');
points.defineData('_measurementGuid_');
points.defineData('_deviceType_');
points.defineData('_deviceID_');
points.defineData('_measurementID_');
points.defineData('arrayVal');
points.defineDone( );
_deviceGuid_='null',
_measurementGuid_='add181d5-6b86-46ba-84b4-
   db8d35cc8d8f',
_deviceType_='bldg';
_measurementID_='wth_humidity',
arrayVal=1;
points.add( );
. . .
end;
```

An illustrative add context measurements method is provided below: method addContextPoints(
```
  bigint keyraw,
  char(250) deviceGuid,
  char(50) measurementGuid,
  double msr_date,
  double msr_time,
  char(50) value,
  in_out double key[ˆ$@ARRAYVAL@$ˆ],
  in_out double key2[ˆ$@ARRAYVAL@$ˆ],
  in_out varchar deviceType[ˆ$@ARRAYVAL@$ˆ],
  in_out varchar deviceID[ˆ$@ARRAYVAL@$ˆ],
  in_out varchar measurementID[ˆ$@ARRAYVAL@$ˆ],
  in_out double msr_dttm[ˆ$@ARRAYVAL@$ˆ],
  in_out varchar_value[ˆ$@ARRAYVAL@$ˆ],
  in_out varchar_outOpcodeArray[ˆ$@ARRAYVAL@$ˆ]
);
. . .
/* RANGESMAP RAW MEASUREMENT GUIDS TO UNIQUE DEVICEID AND STANDARDIZED MEASUREMENTID */
end;
```

In general, the add context measurements method may be used in an "add context" window to add the "in_out" variables above to the raw device globally unique identifier (GUID) and measurement GUID to provide context. The ARRAYVAL placeholder is calculated by the add context macro and is used to define an array output because a single raw measurement coming from the event stream may be used multiple times as different measurements. As one measurement arrives at the add context window, an output event is created for each. The value for the ARRAYVAL placeholder is a maximum number of times a single source measurement may be used as an output device ID and measurement ID.

In an operation 1122, a subset macro is executed to create subset code using a subset template dataset included in the templates dataset. The subset macro includes subset macro code to execute with the created configuration dataset and the created mapping dataset to define internal macros defined in the subset template dataset. Execution of the subset macro creates subset code included as code or as a reference to a code file between mas-module start and end tags in data processing model 714 for execution in a derived window having the calculate type by ESPE 400 as described further below. The subset template dataset defines code, for example, written as a DS2 package with one or more methods, that is configured to split the incoming raw measurements received from an "addContext" window to the measurements needed and to apply the upper and lower limits defined by the acceptableMax/acceptableMaxLogic attribute values and/or the acceptableMin/acceptableMinLogic attribute values, if any, defined for each raw measurement when data processing model 714 is used to define ESPE 400 execution. As a result, the subset template dataset includes a placeholder ˆ$@MYSUBSETLIST@$ˆ. When the processing macro is executed, it replaces the placeholder ˆ$@MYSUBSETLIST@$ˆ with the variable list created as part of the mapping dataset that includes measurements associated with each modeling area and the values defined for the acceptableMax attribute value and/or the acceptableMin attribute value. The created subset code creates and sends a record to an updateCurrent Value calculate window as described further below.

For illustration, the created subset code includes an initialization method (referred to as "init") and a subset measurements method (referred to as "subsetPoints") defined from the subset template dataset. An illustrative initialization method is provided below where a "measurementSubset.add( );" is created for each measurement defined by the macro ˆ$@MYSUBSETLIST@$ˆ:

```
method ink( );
measurementSubset=_new_hash(8,");
measurementSubset.multidata('no');
measurementSubset.defineKey('_deviceType_');
measurementSubset.defineKey('_measurementID_');
measurementSubset.defineData('_lowerLimit_');
measurementSubset.defineData('_upperLimit_');
measurementSubset.defineDone( );
_deviceType_='ahu';
_measurementID_='ahu_area_htg';
_lowerLimit_=.;
_upperLimit_=.;
```

```
measurementSubset.add( );
_deviceType_='ahu';
_measurementID_='ahu_sply_fan_kw';
_lowerLimit_=0.000000;
_upperLimit_=.;
measurementSubset.add( );
_deviceType_='ahu';
_measurementID_='ahu_sply_fan_spd';
_lowerLimit_=0.000000;
_upperLimit_=100.000000;
measurementSubset.add( );
. . .
end;
```

An illustrative subset measurements method is provided below:

```
method subsetPoints (
varchar(75) deviceType,
varchar(75) deviceID,
varchar(50) measurementID,
double_msr_dttm_,
double_msr_date_,
double_msr_time_,
varchar(50)_value,
in_out varchar_customerGuid_,
in_out varchar_value_,
in_out varchar_outOpcode
);
. . .
rc=measurementSubset.find( );
if rc=0 then do;
    if ^missing(_lowerLimit_) then do;
        _valueDouble_=putn(_value,16.6);
        if_valueDouble_<_lowerLimit_then
            _valueDouble_=_lowerLimit_,
            _value_=strip(put(_valueDouble_,16.6));
    end;
    if ^missing(_upperLimit_) then do;
        _valueDouble_=putn(_value,16.6);
        if_valueDouble_>_upperLimit_then
            _valueDouble_=_upperLimit_;
            _value_=strip(put(_valueDouble_,16.6));
    end;
    _outOpcode='insert';
end;
else
    _outOpcode='delete';
end;
``` where measurementSubset.find determines whether the measurement received in the event stream matches a device type and a measurement ID of a measurement added as part of execution of the initialization method. If found, the operation code is set to insert; otherwise, the operation code is set to delete. When an upper limit and/or a lower limit is stored for the measurement, the limits are applied to the measurement value. In general, the subset measurements method may be used in an "subset" window to identify measurements for continued processing.

In an operation 1124, an update current value macro is executed to create update current value code using an update current value template dataset included in the templates dataset. The update current value macro includes update current value macro code to execute with the created configuration dataset and the created mapping dataset to define internal macros defined in the update current value template dataset. Execution of the update current value macro creates update current value code included as code or as a reference to a code file between mas-module start and end tags in data processing model 714 for execution in a derived window having the calculate type by ESPE 400 as described further below. The updateCurrentValue window updates an in-memory data store (IDS) that is shared across all of the threads to include the measurement's current value and its timestamp value continually updated by replacement so that only the most recent value is stored.

The update current value code further maintains an "A" or a "B" status that indicates which of two possible values for each measurement is replaced when new measurement values are received. The updateCurrentValue window toggles the status between "A" and "B" periodically when the output trigger record is received. For example, if the value associated with the outputInterval parameter indicates 60 seconds or every minute, the status may be 'A' for minute 3:02 pm and switch to a status of '13' when the clock reaches 3:03 pm. As measurements needed for each device type flow in and after applying any upper and lower limits for the values, if the status is A, the variable value-A is updated. When the status switches to B, the variable value-B is updated. The timestamp is further associated with the variable value-A update and the variable value-B update to indicate the time of the most recent measurement. By toggling between "A" and "B", a queue of records does not build up and new measurements can continue to be processed while further computations, such as data enrichment, are performed at the specified output interval. When the status is B, each variable value-A is effectively locked without locking and can be utilized for data enrichment steps without concern for multiple processes trying to access the same value. New values are written to the respective variable value-B table location and continue to be overwritten as new measurements are received and processed until the status is switched from B to A. When the status is A, each variable value-B is effectively locked without locking and can be utilized for data enrichment steps without concern for multiple processes trying to access the same value. New values are written to the respective variable value-A table location and continue to be overwritten as new measurements are received and processed until the status is switched from A to B again. Each variable value may be updated at different rates, for example, based on the type of sensor.

The update current value code further executes all transform variables defined in the data processing configuration file 1014 using the code provided in transform code file(s) 1028. A transform variable is a derived variable based on a single measurement. Therefore, when each raw measurement is processed and the appropriate A/B value is updated in the IDS, any associated transform variables are also calculated and their A/B values are updated in the IDS.

Since the primary role of operation 1124 is to maintain the current value of measurements as they arrive in the real-time stream, those real-time events are not passed to the updateHistory window. Only the history and output trigger records discussed in operation 1118 are passed to the updateHistory window and other remaining windows.

In an operation 1126, an update history macro is executed to create update history code using an update history template dataset included in the templates dataset. The update history macro includes update history macro code to execute with the created configuration dataset and the created mapping dataset to define internal macros defined in the update history template dataset. Execution of the update history macro creates update history code included as code or as a reference to a code file between mas-module start and end tags in data processing model 714 for execution in a derived window having the calculate type by ESPE 400 as described further below. The updateHistory window updates an IDS that is shared across all of the threads to retain history about each measurement. Similar to how the IDS was updated in operation 1124 to reflect the most recent value for each measurement, a record is retained of what that measurement was over some prior period of time. The amount of history required is determined by the information provided in the data processing configuration file 1014 and depends on the time period specified for lag variables and temporal aggregation variables. For example, if an air handler's temperature one hour ago was requested in the data processing configuration file 1014, one hour of history would need to be retained for each air handler temperature measurement. The history maintained in the IDS is maintained either by keeping measurements at regular time intervals (for example, 1 minute ago, 2 minutes ago, 3 minutes ago, etc.) or by retaining each measurement as recorded (which would typically not be in equally spaced time intervals). The time interval to store, if applicable, is specified in the data processing configuration file 1014 or at the command line or macro call associated with model development application 1012 as the "historyInterval". Note that this step is completed just prior to operation 1128 to ensure that the measurements are stored into history prior to consolidating the inactive A/B status into the current value for each measurement.

In an operation 1128, a consolidate current value macro is executed to create consolidate current value code using a consolidate current value template dataset included in the templates dataset. The consolidate current value macro includes consolidate current value macro code to execute with the created configuration dataset and the created mapping dataset to define internal macros defined in the consolidate current value template dataset. Execution of the consolidate current value macro creates consolidate current value code included as code or as a reference to a code file between mas-module start and end tags in data processing model 714 for execution in a derived window having the calculate type by ESPE 400 as described further below. Storage of current values into A/B locations for each measurement in operation 1124 ensures that only one location (A or B) for each measurement is actively updated at a given time. As soon as the switch from A to B or vice versa occurs, the data from the inactive A/B location is consolidated into a single current value for each measurement. This current value is used in all data enrichment steps and is output if requested into processed data file 718 or to other endpoints. For illustrative purposes, if the outputInterval is set to once per minute and location A was being updated at 12:36 pm, as soon as 12:37 pm is reached, location B would begin to be updated and this step would consolidate the contents of location A into the current value for that measurement. This current value is used for all dependent computations while location B continues to be updated. At 12:38 pm, the opposite would occur—the active location would switch from B to A in operation 1124, and this step would consolidate the values from location B into the current value for that measurement. The IDS maintains three pairs of current values and timestamps for each measurement, 'value-A' with 'timestamp-A' and 'value-B' with 'timestamp-B' which are used based on whether status A or B is active, and 'value-consolidated' with 'timestamp-consolidated" which are updated by the consolidate current value code and used thereafter. The timestamps indicate the times that the respective value was last updated in the IDS. As soon as the switch is made from A to B, the A values are incorporated into the "value-consolidated' with 'timestamp-consolidated" for each measurement. As soon as the switch is made from B to A, the B values are incorporated into the "value-consolidated' with 'timestamp-consolidated" for each measurement.

In an operation 1130, an enrich data model macro is executed to create enrich data model code using an enrich data model template dataset included in the templates dataset. The enrich data model macro includes enrich data model macro code to execute with the created configuration dataset and the created mapping dataset to define internal macros defined in the enrich data model template dataset. In operation 1130, execution of the enrich data model macro creates enrich data model code included as code or as a reference to a code file between mas-module start and end tags in data processing model 714 for execution in a derived window having the calculate type by ESPE 400 as described further below. This macro acts to build the necessary ESP windows to create new derived measurements based on the raw measures in the event stream and other derived measurements and add them to the IDS.

An initial ESP window built by this enrich data model code (entichDataModelStart window 1412) acts as a gate to manage whether further data enrichment does or does not need to occur at this time period. In the data processing configuration file 1014 or in the model development application 1012, both a historyInterval (how often to update history) and an outputInterval (how often to output records) are specified. In some cases, these values may be the same (for example, when both updating history and outputting every minute). However, in cases where history is updated at one time interval and output occurs less frequently, further data enrichment is not needed. When only history needs to be updated and output will not occur, this window acts as a gate to prevent further data enrichment from occurring.

The main focus of the enrich data model macro is to build a connected series of ESP computation windows that calculate all derived measurements specified in the data processing configuration file 1014 and to update the IDS in such a way that:

Calculations are performed in parallel whenever possible.
    If a calculation is dependent on another calculation, those calculations are performed in the proper order.
    If a calculation is dependent on multiple prior calculations, those multiple calculations are performed prior to the calculation of the dependent variable Each target window created by the enrich data model macro performs a single computation having a measurement type selected from lag measurement, aggregation measurement, and calculation measurement. Each target window performs computations based on values contained in the IDS and each windows adds its computed measurements to the IDS.

Each target window of the enrich window may further have a target window. For illustration, referring to FIG. 14, a linkage is shown between windows created when data processing model 714, used to define ESPE 400 execution, is processing published data from event publishing system 102. A unionDataSources window 1400 may be created by execution of the created union data sources code that passes both raw measurements and history and output trigger records to an addContext window 1402 created by execution of the created add context code. As noted earlier, history and output trigger records are records generated at regular time intervals that are used to indicate when processing of history (issued at an interval equal to the historyInterval) or processing of output records (issued at an interval equal to the outputInterval) should occur. For example, SW 2 900*b* sends each of the history and output trigger records at the indicated periodic intervals, respectively. The addContext window 1402 passes both raw measurements and the history and output trigger records to a subset window 1404 created by execution of the created subset code. The subset window 1404 passes both the raw measurements and the history and output trigger records to an updateCurrentValue window 1406 created by execution of the created update current value code. Since updateCurrentValue window 1406 updates the IDS to reflect the current measurement, the updateCurrentValue window passes only the history and output trigger records to updateHistory window 1408.

UpdateCurrentValue window 1406 updates the current value A or current value B location in the data model for that deviceID/measurementID. When the output trigger is received by UpdateCurrentValue window 1406, the A/B status is flipped. When the history time trigger is received by updateHistory window 1408, the history parameters are updated. UpdateHistory window 1408 passes the history and output trigger records to consolidateCurrentValue window 1410. ConsolidateCurrentValue window 1410 passes the history and output trigger records to the enrichDataModelStart window 1412. If the trigger is an output trigger record, the output trigger record is passed to a set of enrichDataModel computation windows 1414 required to compute all of the lag, aggregation, and calculation derived values defined in the data processing configuration file 1014. If the trigger is a history trigger record, no additional data enrichment is required, and the history trigger record does not continue through to the set of enrichDataModel computation windows 1414.

The set of enrichDataModel computation windows 1414 define a directed graph of windows. The output trigger record is passed to child or target windows once a respective computation is complete and updated in the IDS. In the illustrative embodiment, the set of enrichDataModel computation windows 1414 includes a computeLagZoneTemp window 1416, a computeLagZoneSetpoint window 1418, a computeLagZoneTempDiff gate window 1420, a computeLagZoneTempDiff window 1422, a computeLagFanSpeed window 1424, a computeLagDuctPressure window 1426, a computeLagFanKW gate window 1428, a computeLagFanKW window 1430, and a generateOutput gate window 1432. ComputeLagZoneTemp window 1416, computeLagZoneSetpoint window 1418, computeLagFanSpeed window 1424, and computeLagDuctPressure window 1426 are each target windows of enrichDataModelStart window 1412.

The computeLagZoneTempDiff window 1422 is dependent on computeLagZoneTemp window 1416 having completed its calculation and computeLagZoneSetpoint window 1418 having completed its calculation. Therefore, there is a gate computeLagZoneTempDiff window that ensures that both calculations have occurred before computeLagZoneTempDiff window 1422 is executed. The computeLagFanKW window 1430 is dependent on computeLagFanSpeed window 1424 having completed its calculation and computeLagDuctPressure window 1426 having completed its calculation. Therefore, there is a gate computeLagFanKW window that ensures that both calculations have occurred before computeLagFanKW window 1430 is executed. A last generateOutput gate window 1432 acts as a final gate to prevent output until all of the set of enrichDataModel computation windows 1414 have completed execution. A generateOutput window 1434 is a target window of generateOutput gate window 1432.

For illustration, computeLagZoneTempDiff window 1422 is dependent on computeLagZoneTemp window 1416 having completed its calculation and computeLagZoneSetpoint window 1418 having completed its calculation. The code file for calculation variable lagZoneTempDiff may include the following where the code relies on the computation of lagZoneTemp and lagZoneSetpoint having been completed before it can execute.

```
/*********/
* VARNAME: lagZoneTempDiff;
* VARTYPE: NUM/8;
* REQUIRED MEASUREMENTS: lagZoneTemp lagZoneSetpoint;
/*********/
/* BEGIN CODE */
lagZoneTempDiff=lagZoneTemp-lagZoneSetpoint;
/* END CODE */
```

A gate window is defined when two or more windows update values that are needed by a dependent window. The gate window accepts the output trigger record that passes through each of the windows to it. While multiple output trigger records enter a gate window, the gate only allows the output trigger record through to the next computation when values have been received from all of the windows feeding that gate. For illustration, when the enrichDataModelStart window 1412 initiates the enrichment computations, an output trigger record is passed to each of computeLagZoneTemp window 1416, computeLagZoneSetpoint Window 1418, computeLagFanSpeed window 1424, and computeLagDuctPressure window 1426. When computeLagZoneTemp window 1416 completes its calculation, it passes the output trigger record to computeLagZoneTempDiff gate window 1420. Since computeLagZoneTempDiff gate window 1420 has not yet seen an output trigger record from computeLagZoneSetpoint Window 1418, the output trigger record from computeLagZoneTemp window 1416 does not advance past computeLagZoneTempDiff gate window 1420. When computeLagZoneSetpoint window 1418 completes its calculation, computeLagZoneSetpoint window 1418 passes the output trigger record to computeLagZoneTempDiff gate window 1420. Since computeLagZoneTempDiff gate window 1420 has now received output trigger records from both computeLagZoneTemp Window 1416 and computeLagZoneSetpoint Window 1418, the output trigger record is allowed to advance past computeLagZoneTempDiff gate window 1420 to computeLagZoneTempDiff window 1422, which causes the computeLagZoneTempDiff computation to be initiated with both received values.

Use of gate windows provides orchestration that enables a highly interdependent set of processes to occur on multiple different threads because the gate windows ensure that all tasks are completed in order, while not bogging ESPE 400 down with unnecessary 'wait' commands.

In an operation 1132, an output records macro is executed to create output records code using an output records template dataset included in the templates dataset. The output records macro includes output records macro code to execute with the created configuration dataset and the created mapping dataset to define internal macros defined in the output records template dataset for each modeling area. Execution of the output records macro creates output records code included as code or as a reference to a code file between mas-module start and end tags in data processing model 714 for execution in a derived window having the calculate type by ESPE 400 as described further below. The output records template dataset defines output records code, for example, written as a DS2 package with one or more methods, that is configured to create a transposed output record for each device for each modeling area when data processing model 714 is used to define ESPE 400 execution.

A distinct output records template dataset is created for each modeling area defined in data processing configuration file 1014. To create unique package names, a macro is used to name the package in the form "package ^$@MYDEVTYPE@$^_outputRecords" where the value for each modelAreaID replaces the macro ^$@MYDEVTYPE@$^. For illustration, generateOutput window 1432 is an instance where a single output dataset is generated from the IDS. A second illustration in FIG. 9 shows an instance where DW 17 902$q$, DW 18 902$r$, and DW 19 902$s$ are all outputRecords windows that output data focused on buildings, air handlers, and fan powered boxes, respectively. A trigger record leaving DW 16 902$p$ is sent to all three windows DW 17 902$q$, DW 18 902$r$, and DW 19 902$s$, enabling all three output datasets to be updated simultaneously based on the same IDS. If applicable, the records in the output datasets may be sent to processed data files 718 or to other windows, databases, or processes to have further processing done.

To support the collection and transpose of the streaming data, an IDS (IDS) is created that provides retention of current sensor measurements, historical sensor measurements, transformed sensor measurements, and derived measurements (lags/aggregations/calculations). In addition, the IDS provides methods for updating and extracting data to support processing tasks such as the computation of transform variable measurements, lag variable measurements, aggregation variable measurements, and calculation variable measurements, navigating between connected devices, and extracting measurements when outputting the device state vector to subsequent ESP derived windows or other processes. Th IDS is used throughout the process. For illustration, in FIG. 14, updateCurrentValue window 1406 updates current values for each measurement and transforms each measurement as defined in data processing configuration file 1014, updateHistory window 1408 updates history values to support calculation of lag variables and temporal aggregations, consolidateCurrentValuewindow 1410 consolidates values from the inactive A/B value and timestamp into a current value for each measurement, enrichDataModelStart window 1412 updates the A/B status as an output period is reached, the set of enrichDataModel computation windows 1414 produce new derived measures based on the raw/transform measures and other derived measures, and generateOutput window 1434 retrieves values from the IDS to populate processed data files 718 and to be utilized in other processing steps.

Reference data is loaded into the IDS to support the various lag computations, aggregation computations, and calculation computations. The IDS combines both the storage of sensor measurement data as well as leveraging of the hierarchical relationships among the connected devices to support advanced data manipulation and variable (measurement value) creation. The code for implementing the IDS may be stored in measurement template dataset, device template dataset, and hierarchical data store template dataset. For illustration, measurement template dataset, device template dataset, and hierarchical data store (HDS) template dataset are written using the DS2 language though other programming languages, scripting languages, assembly languages, etc. may be used. Unlike the other templates, none of measurement template dataset, device template dataset, or HDS template dataset include any macros or macro code. Measurement template dataset, device template dataset, and HDS template dataset are configured to instantiate an instance of the IDS in the derived window of the calculate type created when data processing model 714 is used to define ESPE 400 execution. Measurement template dataset, device template dataset, and HDS template dataset are further configured to initialize the IDS instance with the reference data and to interact with the IDS instance as streaming data is processed.

The IDS may include three files stored on disk that are nested in terms of how they are used: 1) a measurement data store, 2) a device data store, and 3) the HDS. The measurement data store includes the lowest level object definition, a measurement object. A measurement object is defined for each raw measurement. Each measurement object includes the measurement ID, the measurement data type, the measurement values (current value, value A, value B), timestamp values for each measurement value, and a list of historical measurements including their value and timestamp. A number of historical measurements included in each list of historical measurements is based on the value defined between the historicalMeasurementCount start and end tags for the raw measurement. As defined in the measurement template dataset, the measurement data store includes public methods for interacting with the measurements and for updating the historical value list as described further below.

Each unique raw sensor measurement has its own measurement package instance. For example, when a discharge air temperature sensor measurement for an air handler AH_1A is received, the IDS code determines if a measurement package instance has been created for that measurement. If the measurement package instance has not been created for that measurement, a new measurement package instance is instantiated for tracking the air handler AH_1A's discharge air temperature measurement and the newly created measurement package instance is initialized with the new record values. If the measurement package instance has been created for that measurement, the existing measurement object is updated with the new record values.

The following data elements may be defined for each measurement object in the measurement template dataset:

TABLE II

| Data Element | Type | Description |
| --- | --- | --- |
| measurementID | Character | The measurement id of the sensor measurement |
| measurementDataType | Character | The data type of the sensor measurement value |
| measurementDttmA | Numeric | The timestamp of the most recent sensor measurement update for value-A |
| measurementDttmB | Numeric | The timestamp of the most recent sensor measurement update for value-B |
| measurementDttm | Numeric | The timestamp of the most recent sensor measurement that is prior to the time |

TABLE II-continued

| Data Element | Type | Description |
| --- | --- | --- |
| | | trigger being processed. ConsolidateCurrentValue window 1410 keeps this variable up-to-date by consolidating the inactive measurementDttmA or measurementDttmB when a time trigger is processed. |
| measurementHistCount | Numeric | The number of historical measurements to retain for lag or temporal aggregation computations |
| measurementCharValueA | Character | The sensor measurement value-A, if it is a character-valued measurement |
| measurementDoubleValueA | Numeric | The sensor measurement value-A, if it is a double-valued measurement |
| measurementCharValueB | Character | The sensor measurement value-B, if it is a character-valued measurement |
| measurementDoubleValueB | Numeric | The sensor measurement value-B, if it is a double-valued measurement |
| measurementCharValue | Character | The most recent character sensor measurement that is prior to the time trigger being processed. ConsolidateCurrentValue window 1410 keeps this variable up-to-date by consolidating the inactive measurementCharValueA or measurementCharValueB when a time trigger is processed. |
| measurementDoubleValue | Numeric | The most recent double-valued sensor measurement that is prior to the time trigger being processed. ConsolidateCurrentValue window 1410 keeps this variable up-to-date by consolidating the inactive measurementDoubleValueA or measurementDoubleValueB when a time trigger is processed. |
| head | Numeric | The current head index pointer for the list of historical measurements being retained |
| measurementHistValues | Hash Package | Hash table used for retaining the historical measurements for the sensor measurement. |

The measurementHistValues hash table maintains a current index, the sensor measurement value, if it is a character-valued measurement, the sensor measurement value, if it is a double-valued measurement, and the timestamp for each historical measurement. The following methods may be defined in the measurement template dataset to facilitate interaction with the measurement object:

TABLE III

| Method List ID | Method Name | Description |
| --- | --- | --- |
| 1 | measurement | Constructor method for instantiating a new measurement package instance |
| 2 | updateValue | Method for updating the measurement instance with the current sensor measurement value and datetime |
| 3 | validateRecency | Method for determining if the most recent measurement update datetime is within a specified time window with respect to the specified reference datetime. If not, the measurement value is set to missing. |
| 4 | updateHistoricalValues | Method for adding the current measurement value to the list of historical measurements and removing the oldest measurement if necessary |
| 5 | getHistoricalValue | Method for retrieving the historical measurement value at the specified historical index |
| 6 | getHistoricalDttm | Method for retrieving the historical measurement datetime at the specified historical index |

TABLE III-continued

| Method List ID | Method Name | Description |
|---|---|---|
| 7 | getMeasurementID | Returns the measurement ID for the current measurement package instance |
| 8 | getDataType | Returns the measurement data type for the current measurement package instance |
| 9 | getValue | Returns the current sensor measurement value for the current measurement package instance |
| 10 | getDttm | Returns the current sensor measurement datetime for the current measurement package instance |
| 11 | getConfiguredMeasurementCount | Returns the configured number of historical measurements to be retained |
| 12 | getHistoricalMeasurementCount | Returns the current number of historical measurements that are present in the measurementHistValues hash package instance |

The Method List ID column is a number assigned to the package method listing to aid in referring to previous package methods in the method descriptions.

The device data store includes the next higher-level object definition, a device object. A device object is defined for each device. Each device object includes the device ID, the device type, the device label, and a list of one or more measurement objects that "belong" to the device because the device ID defined in measurements file 1016 for the measurement indicates that device ID. As defined in the device template dataset, the device data store includes methods for interacting with the device attributes as well as pass-through methods that act on the underlying measurement objects included in the measurement objects list of the device. Each device defined in devices file 1018 has its own device package instance created when the IDS is initialized at ESP project startup.

The following data elements may be defined for each device object in the device template dataset:

TABLE IV

| Data Element | Type | Description |
|---|---|---|
| deviceID | Character | The unique device ID of the device |
| deviceType | Character | The type of device |
| deviceLabel | Character | A label for naming the device |
| measurements | Hash Package | Hash table used to collect references to the measurement package instances for sensor measurements coming from the device |

The following methods may be defined in the device template dataset to facilitate interaction with the device object:

TABLE V

| Method List ID | Method Name | Description |
|---|---|---|
| 13 | device | Constructor method for instantiating a new device package instance |
| 14 | getID | Returns device id value |
| 15 | getType | Returns device type value |
| 16 | setType | Sets device type value |
| 17 | getLabel | Returns device label value |
| 18 | setLabel | Sets device label value |

TABLE V-continued

| Method List ID | Method Name | Description |
|---|---|---|
| 19 | addMeasurement | Determines if the current device already has a measurement package instance for the current measurement and creates one if not |
| 20 | updateMeasurement | Pass-through to method (2) for updating the sensor measurement value and timestamp |
| 21 | updateMeasurementHistory | Pass-through to method (4) for updating sensor measurement historical values |
| 22 | validateMeasurementRecency | Pass-through to method (3) for validating the recency of the sensor measurement |
| 23 | getMeasurementValue | Pass-through to method (9) for getting the sensor measurement value |
| 24 | getHistoricalMeasurementValue | Pass-through to method (5) for getting historical measurement value |
| 25 | getHistoricalMeasurementCount | Pass-through to method (12) for getting the number of historical measurements in the measurementHistValues hash package instance |
| 26 | getConfiguredMeasurementCount | Pass-through to method (11) for getting the configured number of historical measurements to be retained |
| 27 | getMeasurementCount | Returns the number of measurements in the current device's measurements hash package instance |
| 28 | hasMeasurement | Determines if the current device contains a measurement in the measurements hash package instance |
| 29 | updateLagMeasurement | Method for updating the value of a lag measurement from the source measurement |

The HDS is the highest-level object definition and is the main data store of the IDS. The HDS includes a list of all the devices identified from devices file 1018 and a definition of the connectivity between devices (links) defined from links files 1020 and the hierarchies specified in data processing configuration file 1014. Multiple hierarchies can be defined to characterize interconnections in multiple ways, and the hierarchy name is specified when used to perform calculations. The data elements for the links includes the hierarchy name, the parent device ID, and the child device ID. As defined in the HDS template dataset, the HDS includes methods for interacting with the devices, the links, and the measurements, to compute aggregations, to traverse the hierarchies, etc.

The following data elements may be defined for the HDS object in the HDS template dataset:

TABLE VI

| Data Element | Type | Description |
| --- | --- | --- |
| devices | Hash Package | Hash table used to collect references to the device package instances |

TABLE VI-continued

| Data Element | Type | Description |
| --- | --- | --- |
| downlinks | Hash Package | Hash table containing directional parent to child hierarchy links between devices |
| uplinks | Hash Package | Hash table containing directional child to parent hierarchy links between devices |

The following methods may be defined in the HDS template dataset to facilitate interaction with the HDS object:

TABLE VII

| Method List ID | Method Name | Description |
| --- | --- | --- |
| 30 | hierarchicalDataStore | Constructor method for instantiating a new HDS package instance |
| 31 | addDevice | Method for creating new device package instances and adding it to the device's hash package instance |
| 32 | addUpLink | Method for adding links to the uplinks hash package instance |
| 33 | addDownLink | Method for adding links to the downlinks hash package instance |
| 34 | addLink | Method for adding add up and down links simultaneously to the uplinks hash package instance and to the downlinks hash package instance, respectively |
| 35 | updateDeviceAggMeasurement | Method for calculating aggregation measurements using the specified hierarchy and aggregation definition. |
| 36 | hasDevice | Method for determining if the device's hash package instance contains a device instance for the specified deviceID |
| 37 | getDeviceCount | Returns the current number of device package instance references in the device's hash package instance |
| 38 | getParentDeviceID | Method for identifying the parent device of the current device with respect to the specified hierarchy |
| 39 | getUpLinkCount | Returns the number of links in the uplinks hash package instance |
| 40 | getDownLinkCount | Returns the number of links in the downlinks hash package instance |
| 41 | setDeviceType | Pass-through to method (16) for setting device type |
| 42 | getDeviceType | Pass-through to method (15) for getting device type |
| 43 | setDeviceLabel | Pass-through to method (18) for setting device label |
| 44 | getDeviceLabel | Pass-through to method (17) for getting device label |
| 45 | updateDeviceMeasurementHistory | Pass-through to method (21) for updating sensor measurement historical values |
| 46 | updateDeviceLagMeasurement | Pass-through to method (29) for updating lag measurement value |
| 47 | hasDeviceMeasurement | Pass-through to method (28) for determining if the current device contains the specified measurement in its measurements hash package instance |
| 48 | getDeviceMeasurementValue | Pass-through to method (23) for getting sensor measurement value |
| 49 | addDeviceMeasurement | Pass-through to method (19) for adding a sensor measurement to the device's measurements hash package instance |
| 50 | updateDeviceMeasurement | Pass-through to method (20) for updating a sensor measurement's value and timestamp |

TABLE VII-continued

| Method List ID | Method Name | Description |
|---|---|---|
| 51 | validateDeviceMeasurementRecency | Pass-through to method (22) for validating recency of the sensor measurement |

Measurement template dataset, device template dataset, and HDS template dataset are configured to instantiate an instance of the IDS in the derived window of the calculate type created when data processing model 714 is used to define ESPE 400 execution. Measurement template dataset, device template dataset, and HDS template dataset are further configured to load reference data, create instances of the device package for each device in the reference data, and create instances of the measurement package for each sensor measurement that is tracked as defined by data processing model 714. Measurement template dataset, device template dataset, and HDS template dataset are further configured to create, read, update, and manipulate data for data retention. The methods contained in these templates are used by enrichDataModelStart window 1412 and the set of enrichDataModel computation windows 1414 to compute any transform computation, lag computation, aggregation computation, and calculation computation as well as to retrieve and to output device-level state vectors for subsequent output and/or processing.

In an operation 1136, the created code and project data is written to data processing model 714. In an alternative embodiment, the created code may be compiled and executed to create data processing model 714. Adapters and/or connectors may be identified and written to data processing model 714 to output results from the ESP windows to a variety of data storage destinations. The output destinations may be read from data processing configuration file 1014.

For illustration, data processing model 714 may have the form below based on FIG. 9:

```
<project name="" pubsub="" threads="">
    <mas-modules>
        +<mas-module language-"" func-names="" module="">
            <code>
                <![CDATA[
                    module code
                ]]>[
            </code>
        </mas-module>
    </mas-modules>
    <contqueries>
        +<contquery name="" index="">
            <windows>
                +<window-type name=""> </window-type>
            </windows>
            <edges>
                +<edge source="" target="" role="">
            </edge>
            </edges >
        </contquery>
    </contqueries>
</project>
```

In the illustrative embodiment, connectors are used to output results though other output mechanisms can be used such as adapters and/or connectivity to event subscribing device 500.

Figure 14:
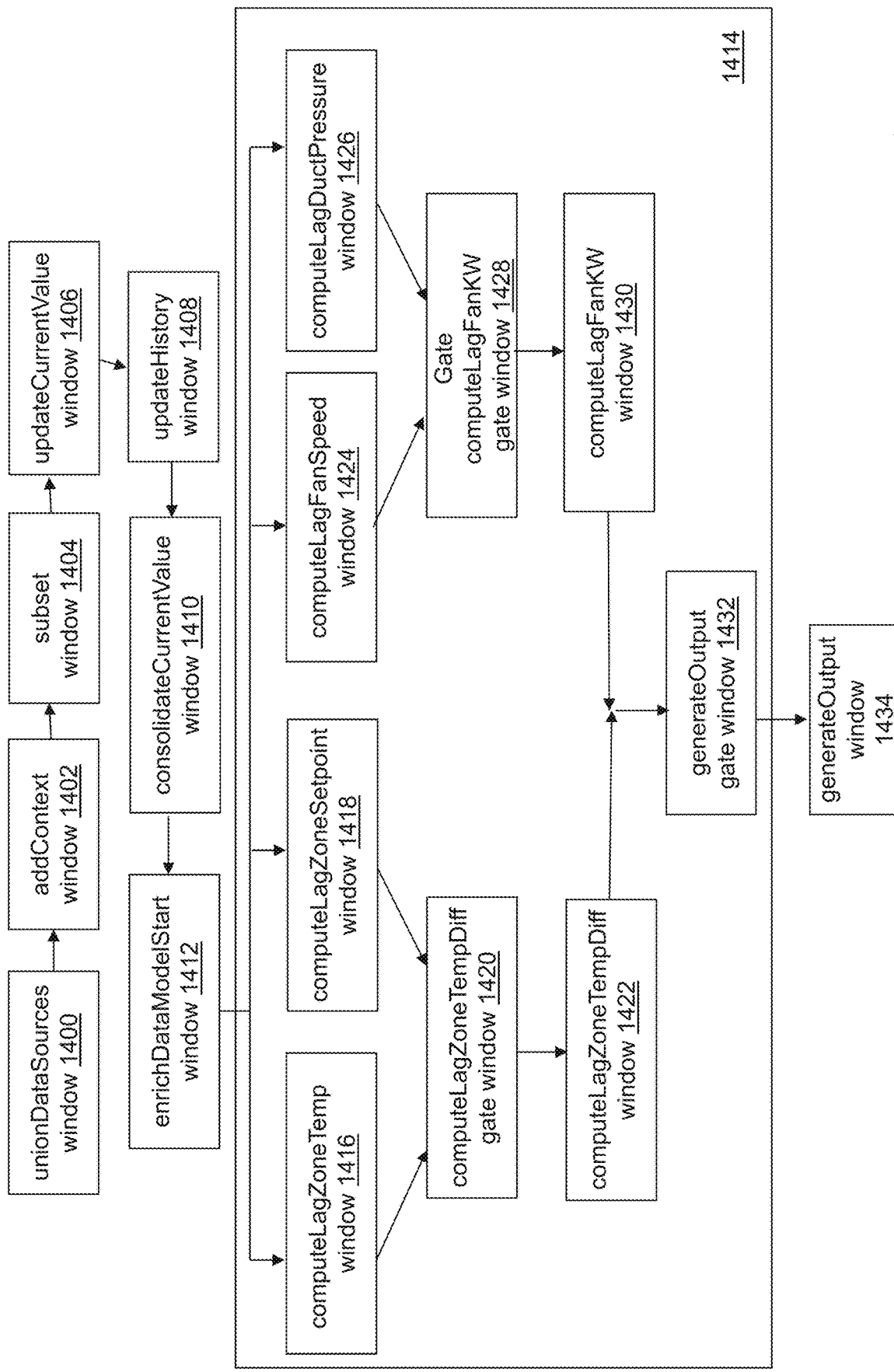
FIG. 14 depicts a linkage between windows created when data processing model 714 is executed to transpose measurement data in accordance with an illustrative embodiment.

Data processing model 714 includes the code to create the IDS and receive the events from event publishing system 102 into source windows. In the provided example, raw data sources include sensor data from HVAC equipment as well as weather data. As a result, the illustrative continuous query includes two source windows for events, a weather source window that sends weather events to a weather update window and an HVAC source window that sends HVAC events to an HVAC update window. Both the weather update window and the HVAC update window send their events to unionDataSources window 1400 that combines the events. In addition, the history and output triggers are generated and sent to unionDataSources window 1400. The combined events are sent to the remaining windows as indicated in FIG. 14 using the defined connectors and a copy window type.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:
    read an event stream processing (ESP) model, wherein the ESP model describes computational processes to be performed on measurements included in a stream of event block objects;
    instantiate an ESP project based on the read ESP model;
    (A) receive an event block object from a second computing device remote from the first computing device;
    (B) extract a new measurement value, a timestamp value, and a sensor identifier from the received event block object, wherein a sensor associated with the sensor identifier captured the new measurement value at a time indicated by the timestamp value;

(C) update an in-memory data store with the new measurement value, the timestamp value, and the sensor identifier;
(D) repeat (A) through (C) until an output update time is reached based on a computer clock, wherein each new measurement value is generated by one of a plurality of sensors;
(E) when the output update time is reached, process and update data stored in the in-memory data store using a plurality of data enrichment windows to define a plurality of enriched data values, wherein the plurality of data enrichment windows include a gate window before each window of the plurality of data enrichment windows that uses values computed by more than one window of the plurality of data enrichment windows, wherein the gate window sends a trigger to a next window of the plurality of data enrichment windows when each value of the more than one window of the plurality of data enrichment windows has been computed, wherein the plurality of data enrichment windows are included in the read ESP model; and
(F) output one or more data values of the plurality of enriched data values.

2. The non-transitory computer-readable medium of claim 1, further comprising repeating (A) through (F) until processing is stopped.

3. The non-transitory computer-readable medium of claim 1, wherein the sensor identifier uniquely identifies a sensor and a device to which the sensor is associated.

4. The non-transitory computer-readable medium of claim 1, wherein the sensor identifier and a device identifier in combination uniquely identify a sensor and a device to which the sensor is associated.

5. The non-transitory computer-readable medium of claim 1, wherein the one or more data values are output to a subscribing device.

6. The non-transitory computer-readable medium of claim 1, wherein a plurality of new measurement values, timestamp values, and sensor identifiers are extracted from each received event block object, wherein the in-memory data store is updated with the plurality of new measurement values, timestamp values, and sensor identifiers.

7. The non-transitory computer-readable medium of claim 1, wherein, in (A), event block objects are received from a plurality of computing devices, wherein the second computing device is one of the plurality of computing devices.

8. The non-transitory computer-readable medium of claim 7, wherein the update of the in-memory data store is described by a directed graph of windows defined in the read ESP model.

9. The non-transitory computer-readable medium of claim 8, wherein the directed graph of windows includes a source window configured to create an output trigger record periodically based on a predefined output interval, wherein the output trigger record is sent to a next window of the directed graph of windows.

10. The non-transitory computer-readable medium of claim 9, wherein the trigger is the created output trigger record.

11. The non-transitory computer-readable medium of claim 9, wherein the directed graph of windows further includes an update current value window that updates a current value for each new measurement when the output trigger record is received by the update current value window.

12. The non-transitory computer-readable medium of claim 11, wherein the new measurement value is stored in an A measurement column of the updated in-memory data store that is associated with the sensor identifier and the timestamp value is stored in an A timestamp column of the updated in-memory data store that is associated with the sensor identifier.

13. The non-transitory computer-readable medium of claim 12, wherein, when updating the in-memory data store with the new measurement value, the timestamp value, and the sensor identifier, each new measurement value replaces any previous measurement value associated with the sensor identifier in the A measurement column and each timestamp value replaces any previous timestamp value associated with the sensor identifier in the A timestamp column.

14. The non-transitory computer-readable medium of claim 12, wherein, after (D) and before (E) and when the output update time is reached, the computer-readable instructions further cause the first computing device to select a B measurement column and a B timestamp column of the updated in-memory data store that is associated with the sensor identifier.

15. The non-transitory computer-readable medium of claim 14, wherein, while performing (E) and (F), the computer-readable instructions further cause the first computing device to repeat (A) through (D), wherein the new measurement value is stored in the B measurement column of the updated in-memory data store that is associated with the sensor identifier and the timestamp value is stored in the B timestamp column of the updated in-memory data store that is associated with the sensor identifier.

16. The non-transitory computer-readable medium of claim 15, wherein, when updating the in-memory data store with the new measurement value, the timestamp value, and the sensor identifier, each new measurement value replaces any previous measurement value associated with the sensor identifier in the B measurement column and each timestamp value replaces any previous timestamp value associated with the sensor identifier in the B timestamp column.

17. The non-transitory computer-readable medium of claim 15, wherein, after repeating (A) through (D) and when the output update time is reached, the computer-readable instructions further cause the first computing device to select the A measurement column and the A timestamp column of the updated in-memory data store that is associated with the sensor identifier, wherein, while performing (E) and (F) again, the computer-readable instructions further cause the first computing device to again repeat (A) through (D), wherein the new measurement value is stored in the A measurement column of the updated in-memory data store that is associated with the sensor identifier and the timestamp value is stored in the A timestamp column of the updated in-memory data store that is associated with the sensor identifier.

18. The non-transitory computer-readable medium of claim 15, wherein the directed graph of windows further includes a consolidate current value window that defines a current value for each sensor measurement by selecting a most recent measurement from the A measurement column or the B measurement column that is prior to the output update time based on the timestamp stored in a respective A measurement column or B measurement column, wherein the defined current value for each sensor measurement is stored in the in-memory data store.

19. The non-transitory computer-readable medium of claim 18, wherein the data stored in the in-memory data store that is processed and updated by the plurality of data enrichment windows is the defined current value for each sensor measurement.

20. The non-transitory computer-readable medium of claim 9, wherein the source window is further configured to create a history trigger record periodically based on a predefined history interval, wherein the history trigger record is sent to a next window of the directed graph of windows.

21. The non-transitory computer-readable medium of claim 20, wherein the directed graph of windows further includes an update history window that updates a history value for the sensor identifier when the history trigger record is received by the update history window.

22. The non-transitory computer-readable medium of claim 1, wherein the processing of the new measurements is described by a directed graph of windows.

23. The non-transitory computer-readable medium of claim 22, wherein the plurality of data enrichment windows includes a measurement type window that computes a measurement value based on the new measurement value stored in the updated in-memory data store based on the directed graph of windows.

24. The non-transitory computer-readable medium of claim 23, wherein the measurement type window is selected from the group consisting of a transform measurement type window, a lag measurement type window, a relational aggregation measurement type window, a temporal aggregation measurement type window, and a calculation measurement type window.

25. The non-transitory computer-readable medium of claim 24, wherein any measurement type window can be connected to any other measurement type window.

26. The non-transitory computer-readable medium of claim 1, wherein each window of the plurality of data enrichment windows sends the trigger to the next window of the plurality of data enrichment windows when processing by each respective window is complete.

27. The non-transitory computer-readable medium of claim 26, wherein (F) is performed when the trigger is received from a last window of the plurality of data enrichment windows.

28. The non-transitory computer-readable medium of claim 1, wherein the plurality of enriched data values is updated in the in-memory data store.

29. A computing device comprising:
a processor; and
a computer-readable medium operably coupled to the processor, the computer-readable medium having computer-readable instructions stored thereon that, when executed by the processor, cause the computing device to
read an event stream processing (ESP) model, wherein the ESP model describes computational processes to be performed on measurements included in a stream of event block objects;
instantiate an ESP project based on the read ESP model;
(A) receive an event block object from a second computing device remote from the computing device;
(B) extract a new measurement value, a timestamp value, and a sensor identifier from the received event block object, wherein a sensor associated with the sensor identifier captured the new measurement value at a time indicated by the timestamp value;
(C) update an in-memory data store with the new measurement value, the timestamp value, and the sensor identifier;
(D) repeat (A) through (C) until an output update time is reached based on a computer clock, wherein each new measurement value is generated by one of a plurality of sensors;
(E) when the output update time is reached, process and update data stored in the in-memory data store using a plurality of data enrichment windows to define a plurality of enriched data values, wherein the plurality of data enrichment windows include a gate window before each window of the plurality of data enrichment windows that uses values computed by more than one window of the plurality of data enrichment windows, wherein the gate window sends a trigger to a next window of the plurality of data enrichment windows when each value of the more than one window of the plurality of data enrichment windows has been computed, wherein the plurality of data enrichment windows are included in the read ESP model; and
(F) output one or more data values of the plurality of enriched data values.

30. A method of processing events, the method comprising:
reading, by a computing device, an event stream processing (ESP) model, wherein the ESP model describes computational processes to be performed on measurements included in a stream of event block objects;
instantiating, by the computing device, an ESP project based on the read ESP model;
(A) receiving, by the computing device, an event block object from a second computing device remote from the computing device;
(B) extracting, by the computing device, a new measurement value, a timestamp value, and a sensor identifier from the received event block object, wherein a sensor associated with the sensor identifier captured the new measurement value at a time indicated by the timestamp value;
(C) updating, by the computing device, an in-memory data store with the new measurement value, the timestamp value, and the sensor identifier;
(D) repeating, by the computing device, (A) through (C) until an output update time is reached based on a computer clock, wherein each new measurement value is generated by one of a plurality of sensors;
(E) when the output update time is reached, processing and updating, by the computing device, data stored in the in-memory data store using a plurality of data enrichment windows to define a plurality of enriched data values, wherein the plurality of data enrichment windows include a gate window before each window of the plurality of data enrichment windows that uses values computed by more than one window of the plurality of data enrichment windows, wherein the gate window sends a trigger to a next window of the plurality of data enrichment windows when each value of the more than one window of the plurality of data enrichment windows has been computed, wherein the plurality of data enrichment windows are included in the read ESP model; and
(F) outputting, by the computing device, one or more data values of the plurality of enriched data values.

\* \* \* \* \*

UNITED STATES PATENT AND TRADEMARK OFFICE
CERTIFICATE OF CORRECTION

PATENT NO. : 11,550,643 B1
APPLICATION NO. : 17/879893
DATED : January 10, 2023
INVENTOR(S) : Steven William Enck et al.

Page 1 of 2

It is certified that error appears in the above-identified patent and that said Letters Patent is hereby corrected as shown below:

In the Specification

Column 17, Line 23:
Delete the phrase "<code-file><*Mename*>[</code-file>." and replace with
--<code-file><*filename*>[</code-file>.--.

Column 35, Line 66:
Delete the phrase "NUM/8|CHR/insert_length," and replace with --NUM/8|CHR/insert_length;--.

Column 36, Line 41:
Delete the phrase "CHR/5," and replace with --CHR/5;--.

Column 45, Lines 13-14:
Delete the phrase "insert_calculated_measurement_measurementID," and replace with
--insert_calculated_measurement_measurementID;--.

Column 45, Line 17:
Delete the phrase "insert_measurement_required_for_calculation," and replace with
--insert_measurement_required_for_calculation;--.

Column 46, Line 34:
Delete the phrase "CHR/15," and replace with --CHR/15;--.

Column 46, Line 35:
Delete the phrase "REQUIRED MEASUREMENTS:" and replace with --REQUIRED MEASUREMENTS : ;--.

Column 51, Line 31:
Delete the phrase "method ink( );" and replace with --method init();--.

Signed and Sealed this
Sixth Day of June, 2023

Katherine Kelly Vidal
*Director of the United States Patent and Trademark Office*

CERTIFICATE OF CORRECTION (continued)
U.S. Pat. No. 11,550,643 B1

Column 51, Line 47:
Delete the phrase "_measurementID_='wth_humidity'," and replace with --_measurementID_='wth_humidity';--.

Column 52, Line 56:
Delete the phrase "method ink( );" and replace with --method init();--.

Column 53, Line 34:
Delete the phrase "_lowerLimit_," and replace with --_lowerLimit_;--.

Column 54, Line 16:
Delete the phrase "status of '13' when" and replace with --status of 'B' when--.